(12) United States Patent
Kwon et al.

(10) Patent No.: US 10,061,391 B2
(45) Date of Patent: Aug. 28, 2018

(54) EYEWEAR-TYPE TERMINAL AND METHOD FOR CONTROLLING THE SAME

(71) Applicant: LG ELECTRONICS INC., Seoul (KR)

(72) Inventors: Chohee Kwon, Seoul (KR); Dongsu Han, Seoul (KR); Gukchan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 268 days.

(21) Appl. No.: 14/951,318

(22) Filed: Nov. 24, 2015

(65) Prior Publication Data

US 2016/0349849 A1 Dec. 1, 2016

(30) Foreign Application Priority Data

May 26, 2015 (KR) ........................ 10-2015-0073139

(51) Int. Cl.
*G06F 3/01* (2006.01)
*G06T 19/00* (2011.01)
*G02B 27/01* (2006.01)
*B64D 47/08* (2006.01)
(Continued)

(52) U.S. Cl.
CPC ............ *G06F 3/017* (2013.01); *B64C 39/024* (2013.01); *B64D 47/08* (2013.01); *G02B 27/0172* (2013.01); *G02B 27/0179* (2013.01); *G06F 3/011* (2013.01); *G06T 19/006* (2013.01); *H04N 5/23216* (2013.01); *H04N 5/23293* (2013.01); *B64C 2201/146* (2013.01); *G02B 2027/014* (2013.01); *G02B 2027/0138* (2013.01);
(Continued)

(58) Field of Classification Search
CPC ....... G06F 3/017; G06F 3/011; B64C 39/024; B64C 2201/146; B64D 47/08; G02B 27/0172; G02B 27/0179; G02B 2027/0178; G02B 2027/0187; G02B 2027/0138; G02B 2027/014; H04N 5/23293; H04N 5/23216; G06T 19/006
See application file for complete search history.

(56) References Cited

U.S. PATENT DOCUMENTS 5,844,547 A * 12/1998 Minakuchi ............ G06F 3/0481
345/156
6,297,838 B1 * 10/2001 Chang ........................ G06F 1/16
345/156

(Continued)

OTHER PUBLICATIONS

European Patent Application No. 16000093.1, Search Report dated Oct. 7, 2016, 9 pages.

*Primary Examiner* — Mihir K Rayan
(74) *Attorney, Agent, or Firm* — Lee, Hong, Degerman, Kang & Waimey

(57) ABSTRACT

Provided is a eyewear-type terminal capable of communicating with a drone. The eyewear-type terminal includes a communication unit configured to communicate with a drone, a display configured to output visual information received from the drone, an optical unit comprising at least one lens and configured to form an image of the visual information in an external virtual region such that the image is visible only to a user wearing the terminal, a sensor configured to sense a user gesture applied with respect to the image and a controller configured to control the drone based on the sensed user gesture.

19 Claims, 36 Drawing Sheets

(51) Int. Cl.
*B64C 39/02* (2006.01)
*H04N 5/232* (2006.01)
(52) U.S. Cl.
CPC ........... *G02B 2027/0141* (2013.01); *G02B 2027/0178* (2013.01); *G02B 2027/0187* (2013.01)

(56) References Cited

U.S. PATENT DOCUMENTS

| | | | | |
|---|---|---|---|---|
| 2004/0193413 | A1* | 9/2004 | Wilson | G06F 3/017 704/243 |
| 2007/0077541 | A1* | 4/2007 | Champagne | G09B 9/04 434/62 |
| 2008/0168403 | A1* | 7/2008 | Westerman | G06F 3/04883 715/863 |
| 2008/0309632 | A1* | 12/2008 | Westerman | G06F 3/038 345/173 |
| 2010/0199232 | A1* | 8/2010 | Mistry | G06F 1/163 715/863 |
| 2011/0115887 | A1* | 5/2011 | Yoo | G06F 3/017 348/51 |
| 2011/0221692 | A1* | 9/2011 | Seydoux | A63H 27/12 345/173 |
| 2012/0242698 | A1* | 9/2012 | Haddick | G02B 27/0093 345/633 |
| 2012/0249797 | A1 | 10/2012 | Haddick et al. | |
| 2013/0002802 | A1* | 1/2013 | Mock | H04L 12/1827 348/14.03 |
| 2013/0050069 | A1* | 2/2013 | Ota | G06F 3/011 345/156 |
| 2013/0335303 | A1* | 12/2013 | Maciocci | G06F 3/011 345/8 |
| 2014/0059461 | A1* | 2/2014 | Kim | G06T 5/50 715/769 |
| 2014/0139453 | A1* | 5/2014 | Yu | G06F 3/011 345/173 |
| 2014/0361956 | A1* | 12/2014 | Mikhailov | A63F 13/00 345/8 |
| 2015/0002391 | A1* | 1/2015 | Chen | G06F 3/017 345/156 |
| 2015/0316927 | A1* | 11/2015 | Kim | G03B 15/006 701/2 |
| 2016/0335981 | A1* | 11/2016 | Koo | G09G 5/003 |
| 2017/0102699 | A1* | 4/2017 | Anderson | G05D 1/0038 |
| 2018/0129284 | A1* | 5/2018 | Davis | G06F 3/014 |

* cited by examiner

[ NOT CAPTURED ]

[ CAPTURED ]

EYEWEAR-TYPE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2015-0073139, filed on May 26, 2015, the contents of which is incorporated by reference herein in its entirety.

BACKGROUND OF THE INVENTION

1. Field of the Invention

The present disclosure relates to a eyewear-type terminal that may be able to communicate with a drone.

2. Background of the Invention

Terminals may generally be classified as a eyewear-type terminals (mobile (portable) terminals) and stationary terminals according to a moveable state. The eyewear-type terminals may be also classified as handheld terminals and vehicle mount terminals according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. In order to support and increase functions of terminals, improvement of structural parts and/or software parts of terminals may be taken into consideration.

Recently, wearable eyewear-type terminals configured to be wearable on part of a human being have been developed. A eyewear-type terminal mounted on a user's head may be a head-mounted display (HMD). A display provided in a eyewear-type terminal such as an HMD may be combined with augmented reality techniques, N screen techniques, and the like, beyond a simple image output function, to provide various convenience to users.

Also, recently, unmanned aerial vehicles (hereinafter, referred to as "drone") have been actively developed. A drone is a vehicle not using a runway, and various functions, such as transportation of objects, image capturing, and low altitude reconnaissance may be installed in a relatively light small body thereof.

Drones have been applied to various fields. Drones may be remotely controlled and may be controlled to execute a function in a desired section.

As eyewear-type terminals and drones have been actively developed, a method of controlling a drone using a eyewear-type terminal has also been actively developed.

SUMMARY OF THE INVENTION

Therefore, an aspect of the detailed description is to provide a eyewear-type terminal capable of controlling a drone in an optimized manner, and a method for controlling the same. Another aspect of the detailed description is to provide a eyewear-type terminal capable of controlling a drone by using a virtual image of visual information transmitted from the drone, and a method for controlling the same. Another aspect of the detailed description is to provide a eyewear-type terminal capable of capturing visual information transmitted from a drone and a preview image received through a camera of the eyewear-type terminal in an optimized manner, and a method for controlling the same.

To achieve these and other advantages and in accordance with the purpose of this specification, as embodied and broadly described herein, an eyewear-type terminal comprising: a communication unit configured to communicate with a drone; a display configured to output visual information received from the drone; an optical unit comprising at least one lens and configured to form an image of the visual information in an external virtual region such that the image is visible only to a user wearing the terminal; a sensor configured to sense a user gesture applied with respect to the image; and a controller configured to control the drone based on the sensed user gesture.

In an exemplary embodiment of the present disclosure, the controller is further configured to control at least one of a movement of the drone or a camera of the drone in response to a preset user gesture applied with respect to the image.

In an exemplary embodiment of the present disclosure, the controller is further configured to: control the movement of the drone when the preset user gesture is a first user gesture; and control the camera when the preset user gesture is a second user gesture.

In an exemplary embodiment of the present disclosure, the first user gesture is a gesture that is applied subsequently to a gesture of grabbing the image; and the controller is further configured to cause the drone to move in response to the subsequently applied gesture.

In an exemplary embodiment of the present disclosure, the drone is moved in a different manner according to a manner of the gesture of grabbing the image.

In an exemplary embodiment of the present disclosure, the controller is further configured to move the drone when the manner of the gesture is a first manner; and the controller is further configured to rotate the drone when the manner of the gesture is a second manner.

In an exemplary embodiment of the present disclosure, when the first user gesture is applied in a state in which the image is displayed in a first display manner, the image is displayed in a second display manner.

In an exemplary embodiment of the present disclosure, the image displayed in the second display manner is restored to be displayed in the first display manner when the first user gesture is released.

In an exemplary embodiment of the present disclosure, the second user gesture comprises a pinch-in gesture or a pinch-out gesture applied with respect to the image; and the controller is further configured to control the camera to execute a zoom-out function or a zoom-in function in response to the pinch-in gesture or the pinch-out gesture.

In an exemplary embodiment of the present disclosure, the controller is further configured to cause the drone to move when the pinch-out gesture is applied to be moved out of the image.

In an exemplary embodiment of the present disclosure, the eyewear-type terminal may further include a camera, and the controller is further configured to cause the display to display a preview image received via the camera; and the optical unit is further configured to form an image of the preview image in addition to the image of the visual information.

In an exemplary embodiment of the present disclosure, the image of the preview image and the image of the visual information are formed to be spaced apart from one another.

In an exemplary embodiment of the present disclosure, when a preset type of gesture is applied to at least one of the image of the preview image or the image of the visual information, the controller is further configured to cause the at least one of the image of the preview image or the image of the visual information to move.

In an exemplary embodiment of the present disclosure, when the image of the preview image and the image of the visual information come into contact with each other due to the movement, the controller is further configured to capture the image of the preview image and the image of the visual information.

To achieve these and other advantages and in accordance with the purpose of this specification, as embodied and broadly described herein, a method for controlling an eyewear-type terminal, the method comprising: forming an image of visual information received from a drone; and controlling the drone based on a user gesture applied with respect to the image, wherein: the image is formed in an external virtual region such that the image is visible only to a user wearing the terminal; and the controlling of the drone comprises controlling at least one of a movement of the drone or a camera of the drone in response to a preset user gesture applied with respect to the image.

In an exemplary embodiment of the present disclosure, the movement of the drone is controlled when the preset user gesture is a first user gesture; and the camera is controlled when the preset user gesture is a second user gesture.

In an exemplary embodiment of the present disclosure, the first user gesture is a gesture that is applied subsequently to a gesture of grabbing the image; and the controller is further configured to cause the drone to move in response to the subsequently applied gesture.

In an exemplary embodiment of the present disclosure, the second user gesture comprises a pinch-in gesture or a pinch-out gesture applied with respect to the image; and the controller is further configured to control the camera to execute a zoom-out function or a zoom-in function in response to the pinch-in gesture or the pinch-out gesture.

In an exemplary embodiment of the present disclosure, the method may further include: forming an image of a preview image received via a camera of the terminal in addition to the image of the visual information, wherein at least one of the image of the preview image or the image of the visual information is moved in response to a preset type of gesture applied to the at least one of the image of the preview image or the image of the visual information.

In an exemplary embodiment of the present disclosure, the method may further include: capturing the image of preview image and the image of the visual information when the image of the preview image and the image of the visual information come into contact with each other due to the movement.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
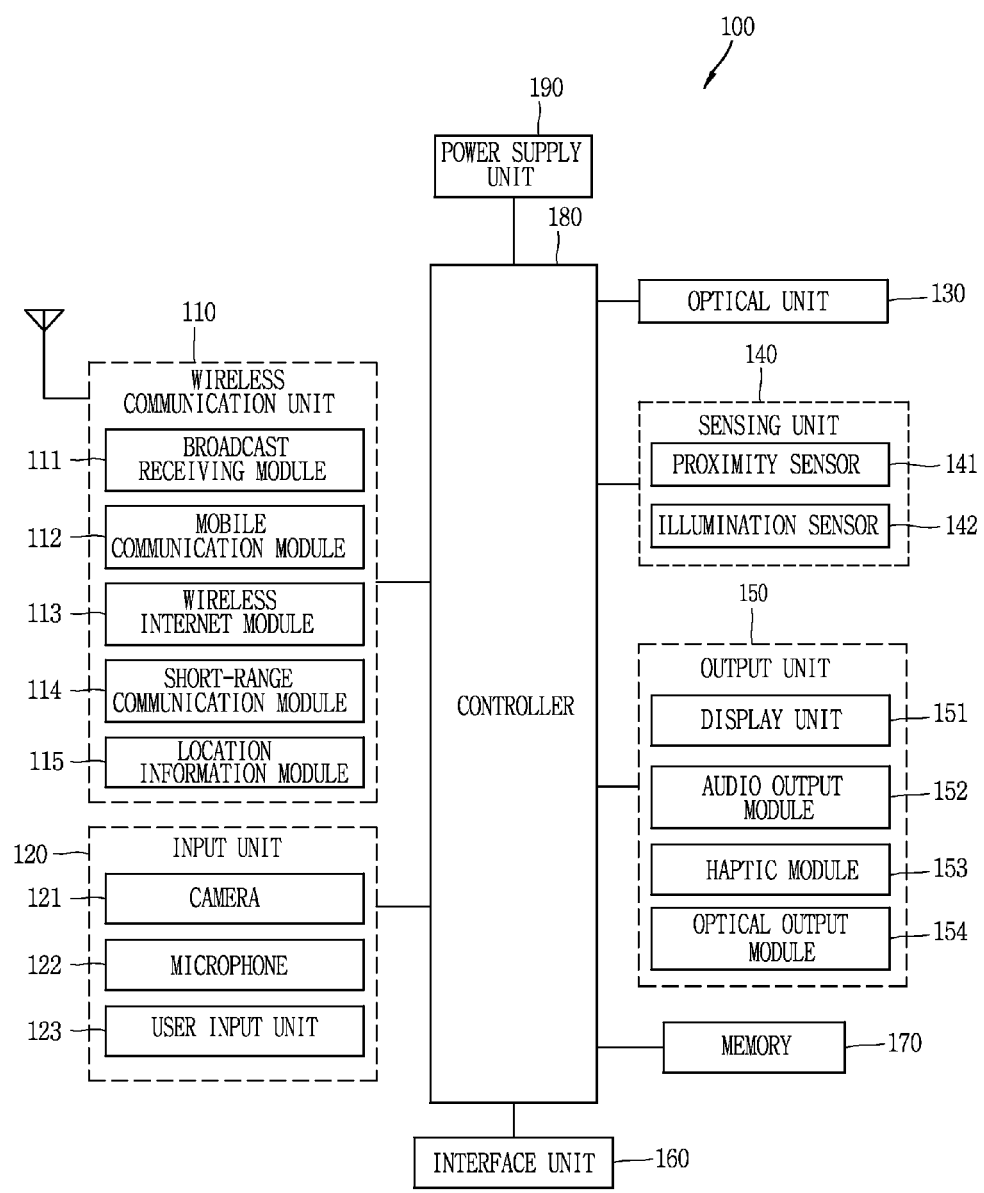
FIG. 1 is a block diagram illustrating a eyewear-type terminal related to an embodiment of the present disclosure.

FIG. 1 is a block diagram of a eyewear-type terminal according to an embodiment of the present invention. The eyewear-type terminal 100 may include a wireless communication unit 110, a input unit 120, an optical unit 130, a sensing unit 140, an output unit 150, an interface unit 160, a memory 170, a controller 180, and a power supply unit 190, etc. FIG. 1 shows the eyewear-type terminal as having various components, but it should be understood that implementing all of the illustrated components is not a requirement. Greater or fewer components may alternatively be implemented.

Figure 4:
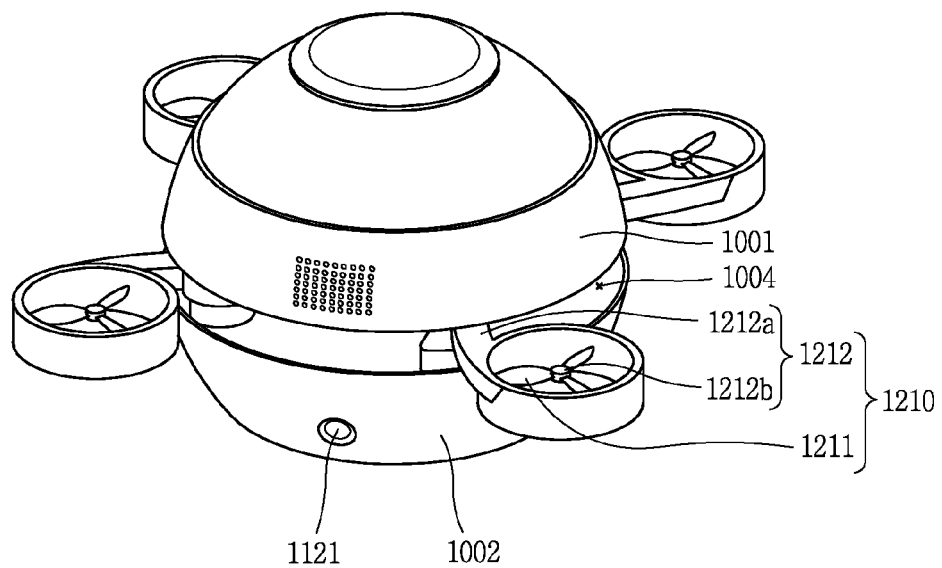
FIG. 4 is a view illustrating a drone related to the present invention viewed in one direction.

In detail, the wireless communication unit 110 typically includes one or more modules which permit communications such as wireless communications between the eyewear-type terminal 100 and a wireless communication system, communications between the eyewear-type terminal 100 and another eyewear-type terminal, communications between the eyewear-type terminal 100 and an external server, and communications between the eyewear-type terminal 100 and a drone 1000 (please refer to FIG. 4). Further, the wireless communication unit 110 typically includes one or more modules which connect the eyewear-type terminal 100 to one or more networks.

The wireless communication unit 110 includes one or more of a broadcast receiving module 111, a mobile communication module 112, a wireless Internet module 113, a short-range communication module 114, and a location information module 115.

In detail, in the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external eyewear-type terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the eyewear-type terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the eyewear-type terminal 100 and a wireless communication system, communications between the eyewear-type terminal 100 and a mobile terminal 100, communications between the eyewear-type terminal 100 with a fixed terminal, communications between the eyewear-type terminal 100 and a network in which a mobile terminal (or an external server) exists, or communications between the eyewear-type terminal 100 and an eternal device (for example, a drone 1000), via wireless area networks. One example of the wireless area networks is a wireless personal area networks.

The mobile terminal described in the present disclosure may include a cellular phone, a smartphone, a notebook computer (or a laptop computer), a digital broadcasting terminal, a personal digital assistant (PDA), a portable multimedia player (PMP), a navigation device, a slate PC, a tablet PC, an ultrabook, a wearable device (e.g., a watch-type terminal such as smartwatch, a glass-type terminal such as smart glass, a head mounted display (HMD), and the like, that can be exchange data with the eyewear-type terminal 100.

However, it will be obvious to those skilled in the art that the present disclosure may also be applicable to a fixed terminal such as a digital TV, a desktop computer and a digital signage, except for specific configurations for mobility.

The short-range communication module 114 may sense or recognize the wearable device, and permit communication between the wearable device and the eyewear-type terminal 100. In addition, when the sensed wearable device is a device which is authenticated to communicate with the eyewear-type terminal 100, the controller 180, for example, may cause transmission of data processed in the eyewear-type terminal 100 to the wearable device via the short-range communication module 114. Hence, a user of the wearable device may use the data processed in the eyewear-type terminal 100 on the wearable device. For example, when a call is received in the eyewear-type terminal 100, the user may answer the call using the wearable device. Also, when a message is received in the eyewear-type terminal 100, the user can check the received message using the wearable device.

The location information module 115 is generally configured to detect, calculate, derive or otherwise identify a position of the eyewear-type terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the eyewear-type terminal. As one example, when the eyewear-type terminal uses a GPS module, a position of the eyewear-type terminal may be acquired using a signal sent from a GPS satellite. As another example, when the eyewear-type terminal uses the Wi-Fi module, a position of the eyewear-type terminal can be acquired based on information related to a wireless access point (AP) which transmits or receives a wireless signal to or from the Wi-Fi module. If necessary, the location information module 115 may perform any one function of a different module of the wireless communication unit 110 in order to obtain data regarding a location of the eyewear-type terminal substitutively or additionally. The location information module 115 is used to obtain a location (or a current location) of the eyewear-type terminal, which is not limited to a module directly calculating or obtaining a location of the eyewear-type terminal.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the eyewear-type terminal, the surrounding environment of the eyewear-type terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The eyewear-type terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the eyewear-type terminal 100 and a user, as well as function as the user input unit 123 which provides an input interface between the eyewear-type terminal 100 and the user.

The interface unit 160 serves as an interface with various types of external devices that can be coupled to the eyewear-type terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the eyewear-type terminal 100 may perform assorted control functions associated with a connected external device, in response to the external device being connected to the interface unit 160.

The memory 170 is typically implemented to store data to support various functions or features of the eyewear-type terminal 100. For instance, the memory 170 may be configured to store application programs executed in the eyewear-type terminal 100, data or instructions for operations of the eyewear-type terminal 100, and the like. Some of these application programs may be downloaded from an external server via wireless communication. Other application programs may be installed within the eyewear-type terminal 100 at time of manufacturing or shipping, which is typically the case for basic functions of the eyewear-type terminal 100 (for example, receiving a call, placing a call, receiving a message, sending a message, and the like). It is common for application programs to be stored in the memory 170, installed in the eyewear-type terminal 100, and executed by the controller 180 to perform an operation (or function) for the eyewear-type terminal 100.

The controller 180 typically functions to control overall operation of the eyewear-type terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the eyewear-type terminal 100. The power supply unit 190 may include a battery, and the battery may be configured to be embedded in the terminal body, or configured to be detachable from the terminal body.

Also, the eyewear-type terminal 100 according to an embodiment of the present invention may include an optical unit 130 forming a virtual image of visual information, and may display the virtual image having various sizes in various positions on the basis of the optical unit 130.

At least a portion of the components may cooperatively operate to implement an operation, controlling, or control method of the eyewear-type terminal according to various embodiments described hereinafter. Also, the operation, controlling, or the control method of the eyewear-type terminal may be implemented in the eyewear-type terminal by driving at least one application program stored in the memory 170.

Figure 2A:
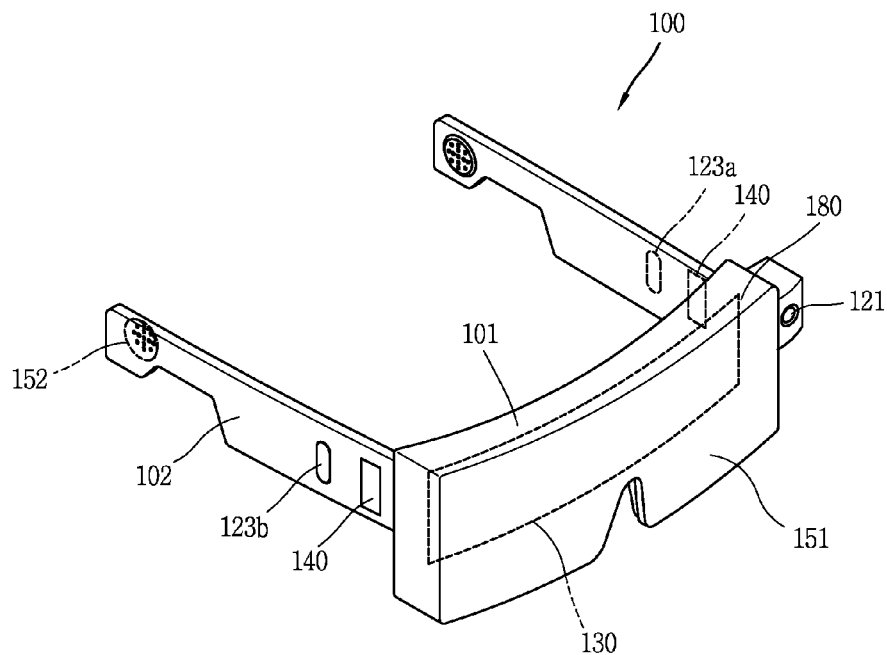
FIG. 2A is a view illustrating a eyewear-type terminal viewed in one direction according to an embodiment of the present disclosure.
Figure 2B:
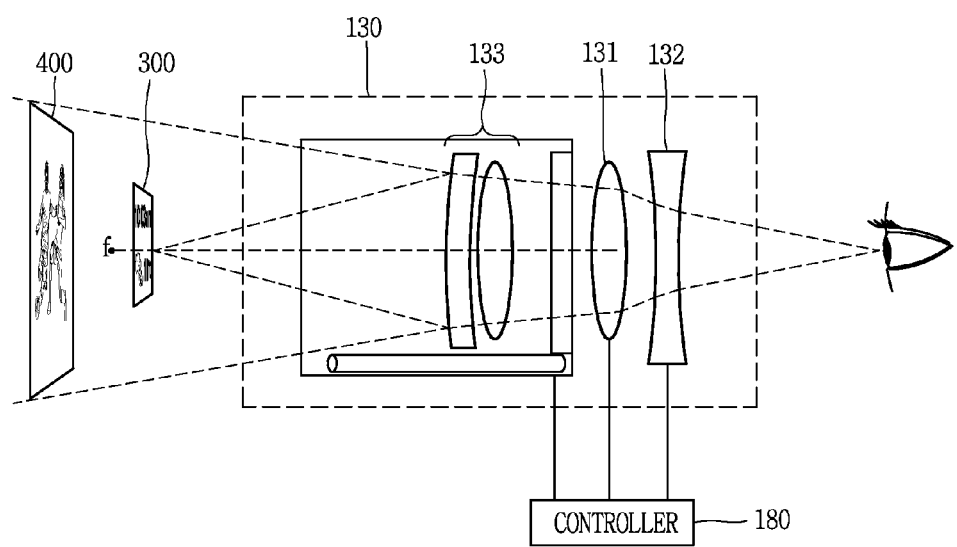
FIG. 2B is a conceptual view illustrating an optical unit included in the eyewear-type terminal of FIG. 2A.
Figure 2C:
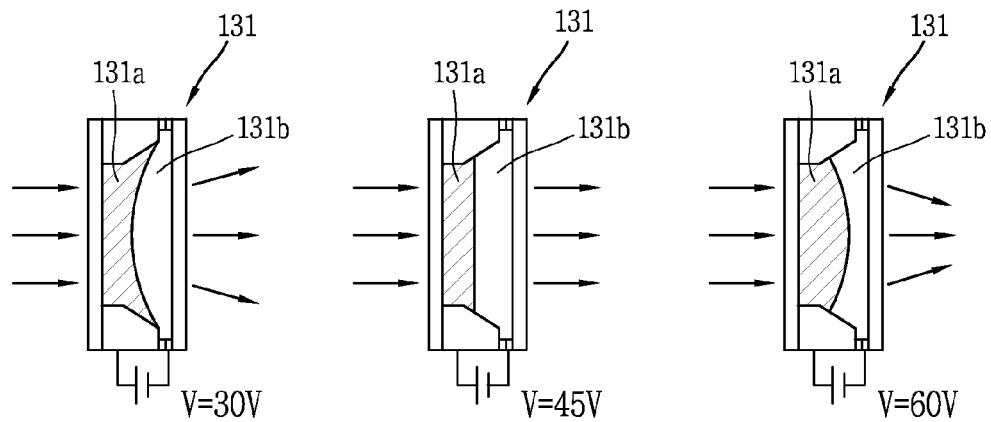
FIG. 2C is a conceptual view illustrating a shape deformation lens.

FIG. 2A is a view illustrating a eyewear-type terminal viewed in one direction according to an embodiment of the present disclosure. FIG. 2B is a conceptual view illustrating an optical unit included in the eyewear-type terminal of FIG. 2A. FIG. 2C is a conceptual view illustrating a shape deformation lens.

The eyewear-type terminal 100 illustrated in FIG. 2A may be a head mounted display (HMD) type terminal. The eyewear-type terminal 100 may include a frame unit 101 or 102, an input unit 123, a sensing unit 140, a display unit 151, an optical unit 130, an audio output unit 152, a control unit 180, a wireless communication unit 110, an interface unit 160, a memory 170, and a power supply unit 190. The head mounted display described in the present disclosure may have components greater or less than those mentioned above.

In detail, the eyewear-type terminal 100 may be wearable on a user's head, for which the eyewear-type terminal 100 may include the frame unit (case, housing, and the like). The frame unit may be formed of a flexible material to facilitate wearing of the eyewear-type terminal 100. In this drawing, the frame unit includes a first frame 101 and a second frame 102 formed of different materials. The frame unit may be referred to as a main body or a body.

The frame unit is supported by a head and provides a space in which various components are installed. As illustrated, in the frame unit, electronic compounds such as the control unit 180, the sensing unit 140, the user input unit 123, the audio output unit 152, and an optical unit 130 may be installed.

Also, the display unit 151 covering at least one of a left eye and a right eye may be detachably installed in the frame unit. The display unit 151 may be formed to prevent ambient light cannot from passing therethrough such that a virtual reality (VR) may be implemented, or may be formed to allow ambient light to pass therethrough such that augmented reality (AR) may be implemented.

Also, the display unit 151 may be a display unit of an external mobile terminal. That is, the frame unit may be formed to allow an external mobile terminal to be detachably attached thereto, and may be electrically connected to the external mobile terminal. In a case in which the display unit of the external mobile terminal is installed to face the left eye and the right eye of the user, the display unit 151 may be the display unit of the external mobile terminal.

The control unit 180 is configured to control various electronic components provided in the eyewear-type terminal 100. The control unit 180 may be understood as a component corresponding to the control unit 180 described above. In this drawing, it is illustrated that the control unit 180 is installed in the frame unit on one side of the head part. However, a position of the control unit 180 is not limited thereto.

The camera 121 is disposed to be adjacent to at least one of the left eye and the right eye to capture an image of a front side. Since the camera 121 is positioned to be adjacent to the eyes, the camera 121 may obtain an image of a scene that the user views.

In the drawing, it is illustrated that the camera 121 is provided in the control unit 180, but the present invention is not limited thereto. The camera unit 121 may also be installed in the frame unit, and a plurality of cameras may be provided to obtain a stereoscopic image.

The eyewear-type terminal 100 may include user input units 123a and 123b manipulated to receive a control command. The user input units 123a and 123b may employ any scheme as long as it allows the user to perform manipulation in a tactile manner, such as touch, push, or the like. In the drawing, it is illustrated that the touch and touch input type user input units 123a and 123b are provided in the frame unit and the control unit 180.

The sensing unit 140 (or a detecting unit 140) provided in the eyewear-type terminal 100 may include one or more sensors for sensing at least one of information within the eyewear-type terminal, a state of the eyewear-type terminal, information regarding an environment surrounding the eyewear-type terminal, and user information (user's posture).

Also, the eyewear-type terminal 100 may include a microphone (not shown) receiving a sound and processing the received sound as electrical audio data and the audio output unit 152 outputting a sound. The audio output unit 152 may be configured to transfer a sound according to a general sound output scheme or a bone conduction scheme. In a case in which the audio output unit 152 is implemented according to the bone conduction scheme, when the user wears the eyewear-type terminal 100, the audio output unit 152 may be tightly attached to the user's head and vibrate a skull to transfer a sound.

The interface unit may serves as a passage with various types of external devices connected to the eyewear-type terminal 100. Also, the memory stores data supporting various functions of the eyewear-type terminal 100.

In addition to the operation related to the application program, the control unit 180 controls general operations of the eyewear-type terminal 100. That is, the control unit 180 may provide or process information or functions appropriate for the user by processing a signal, data, or information input or output through the components described above or driving an application program stored in the memory.

Also, the control unit 180 may control at least a portion of the components described above with reference to FIG. 1 in order to drive the application program stored in the memory. In addition, in order to drive the application program, the control unit 180 may combine at least two or more of the components included in the eyewear-type terminal 100 to operate the same.

Under the control of the control unit 180, the power supply unit may receive external power or internal power and supply the power to the components included in the eyewear-type terminal 100. The power supply unit may include a battery, and the battery may be an internal battery or a replaceable battery.

The display unit 151 may be mounted on the user's head part and directly shows an image to the user's eyes. When the user wears the head mounted display 100, the display unit 151 may be disposed to correspond to at least one of the left eye and the right eye to directly provide an image to the user's eyes. In the drawing, it is illustrated that the display unit 151 is positioned to cover both the left eye and the right eye such that an image may be output toward both the user's left eye and right eye.

Also, screen information (or visual information) output by the display unit 151 may project screen information (or visual information output by the display unit 151, as a virtual image 400 formed through the optical unit 130 including a plurality of lenses, to the user's eyes.

Referring to FIG. 2B, the optical unit 130 includes first and second lenses 131 and 132 and a zoom lens unit 133. The first and second lenses 131 and 132 are shape deformation lenses whose focal length may be deformed.

Referring to FIG. 2C, the first lens 131 may include two types of first and second liquid layers 131*a* and 131*b* provided in a pair of substrates. The first and second liquid layers 131*a* and 131*b* have different refractive indices and are not mixed. The first liquid layer 131*a* may be oil having insulating properties and non-polarity, and the second liquid layer 131*b* is formed as a conductive aqueous solution. The pair of substrates may include an electrode to which electricity (or power) may be applied and an insulator coated on the electrode.

When an electrode having an opposite polarity is installed on a substrate adjacent to the second liquid layer 131*b* and the first liquid layer 131*a* and the electrode of the pair of substrates are connected, the first lens 131 may have a structure such as a capacitor. When a voltage is applied to the first lens 131, surface tension of the second liquid layer 131*b* is changed to change curvature between the two liquid layers 131*a* and 131*b*. Accordingly, a focal length of the first lens 131 is changed. As illustrated in the drawing, the control unit 180 may apply a voltage to the first lens to adjust the focal length.

The display unit 151 outputting visual information 300 may be disposed between a focal point f of the first lens 131 and the first lens 131. Accordingly, the image 400 may be formed as a magnified virtual image of the visual information 300.

Here, the image 400 (or the virtual image 400) corresponding to the magnified virtual image of the visual information 300 may be formed in a virtual region outside of the main body. In detail, the image 400 may be formed on the display unit 151 or may be formed in a virtual region (for example, in the air) outside of the display unit 151.

Here, the image 400 may be visible only to the user who wears the eyewear-type terminal 100. In detail, the image 400 may not be visible to an outsider user (that is, a person other than the user who wears the eyewear-type terminal 100).

Data regarding a position and a size of the virtual image 400 of the visual information visible to the user who wears the eyewear-type terminal may be stored in the eyewear-type terminal 100 according to an embodiment of the present invention according to at least one of a structure (for example, a refractive index of the first lens 131, a focal length, and the like) of the optical unit 130, a position of visual information output from the display unit 151, and a size of the visual information.

Also, the eyewear-type terminal 100 according to an embodiment of the present invention may control at least one of the structure of the optical unit 130, the position of visual information output from the display unit 151, and the size of the visual information, such that a position and a size of the virtual image 400 may be changed on the basis of a user request.

For example, the control unit 180 may control a size of the image 400 and a display position of the image 400 by adjusting a focal length of the first lens 131 provided in the optical unit 130. On the basis of the focal length, the image 400 may be magnified to become distant from (or become away from) the user's eye (or lens) or the image 400 may be reduced to become closer to the user's eye (or lens).

However, the present invention is not limited thereto and the control unit 180 may perform control such that the size of the image 400 is magnified to become closer or the size of the image 400 is reduced to become distant, or the control unit 180 may perform control such that the image 400 becomes distant or closer, while maintaining the size of the image 400. To this end, the optical unit 130 may further include an actuator for moving at least one of the first lens 131 and the second lens 132.

The first lens 131 may be controlled to have a refractive index changing as having a convex lens structure, and the second lens 132 may have a refractive index changing as having a concave lens structure. The second lens 132 is disposed between the user's eyes and the first lens 131. The second lens 132 adjusts a position in which the image 400 is formed. Thus, a size of the image 400 and a position in which the image 400 is formed may be adjusted by the first and second lenses 131 and 132.

Accordingly, on the basis of a vision (or eyesight) state of the user's eyes, image 400 may be formed in (or output to) different positions. Thus, the user may be provided with a clear image 400 by the first and second lenses 131 and 132 even without a separate vision correction device.

Since an output position of the image 400 is adjusted by the second lens 132, the small optical unit 130 may be implemented in a state in which a distance between the optical unit 130 and the user's eyes is fixed.

The optical unit 130 may further include a zoom lens unit 133 controlled to magnify and reduce the visual information 300 to magnify or reduce the image 400 to output the same. The zoom lens unit 133 includes a plurality of lenses and an actuator moving the plurality of lens along an optical axis. The zoom lens unit 133 may magnify or reduce a portion of the image 400 or the entirety of the image 400 on the basis of a user's control command.

The control unit 180 may independently control the first and second lenses 131 and 132 and the zoom lens unit 133. The user may input an independent control signal to independently control the first and second lenses 131 and 132 and the zoom lens unit 133 to arbitrarily change a size of the image and a position to which the image is output.

The second lens 132 and the zoom lens unit 133 of the optical unit 130 are not essential in implementing the eyewear-type terminal, and thus, the second lens 132 and the zoom lens unit 133 of the optical unit 130 may be selectively included or excluded according to a design of the eyewear-type terminal.

Figure 3A:
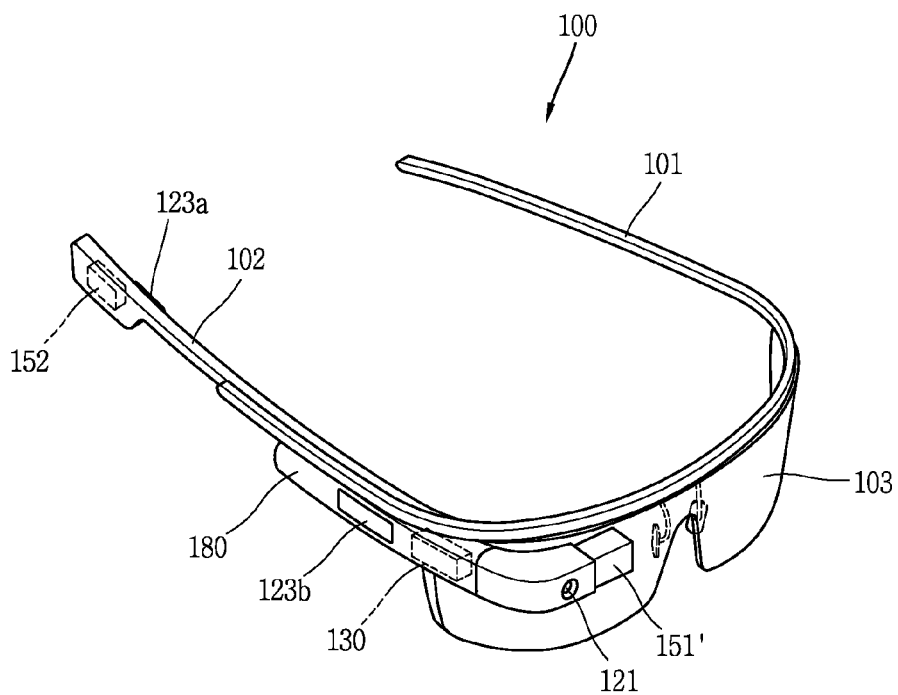
FIG. 3A is a view illustrating a eyewear-type terminal viewed in one direction according to another embodiment of the present disclosure.
Figure 3B:
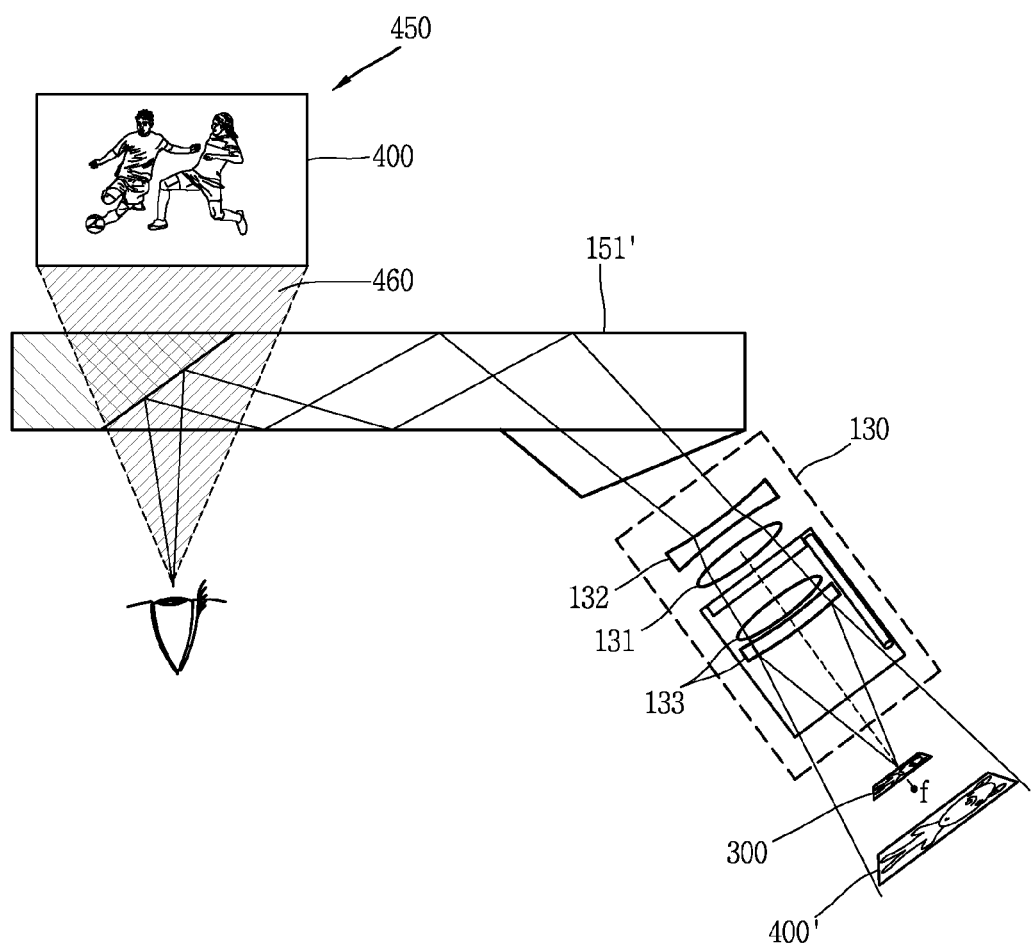
FIG. 3B is a conceptual view illustrating an optical unit included in the eyewear-type terminal of FIG. 3A.

FIG. 3A is a view illustrating a eyewear-type terminal viewed in one direction according to another embodiment of the present disclosure, and FIG. 3B is a conceptual view illustrating an optical unit included in the eyewear-type terminal of FIG. 3A.

Referring to FIG. 3A, the eyewear-type terminal 100 is configured to be worn on a human being's head part, and to this end, the eyewear-type terminal 100 may include frame unit (case, housing, etc.). The frame unit may be formed of a plastic material facilitating wearing. In the drawing, it is illustrated that the frame unit includes the first frame 101 and the second frame 102 formed of different materials. In general, the eyewear-type terminal 100 may have characteristics the same as or similar to those of the eyewear-type terminal 100 of FIGS. 1 through 2C.

The frame unit is supported by a head part, and provides a space in which various components are installed. As illustrated, a control module 280 or an audio output module 252 may be installed in the frame unit. Also, a prism 151' may be installed and disposed to be adjacent to at least one of a left eye and a right eye. The prism 151' is detachable.

The control module 180 controls various electronic components provided in the eyewear-type terminal 100. The control module 180 may be understood as a component corresponding to the control unit 180 described above. In the drawing, it is illustrated that the control module 180 is installed in the frame on a head part of one side. However, the position of the control module 180 is not limited thereto.

The camera 121 is disposed to be adjacent to at least one of a left eye and a right eye to capture a front image. Since the camera 121 is positioned to be adjacent to an eye, the camera 121 may obtain an image of a scene viewed by the user.

The eyewear-type terminal 100 may include input units 123a and 123b manipulated to receive a control command. The user input units 123a and 123b may employ any scheme as long as user manipulates it in a tactile manner such as a touch or a push. In the drawing, it is illustrated that the user input units 123a and 123b respectively based on push and touch input schemes are provided in the frame unit and the control module 180.

Hereinafter, the user input unit 123b based on a touch input scheme will be largely described and reference numeral 123 will be used therefor.

Also, the eyewear-type terminal 100 may include a microphone (not shown) receiving a sound and processing the received sound to electrical voice data, and an audio output module 152 outputting a sound.

The visual information 300 output through the display unit may be visible as the virtual image 400 through the optical unit 130 and the prism 151', which overlaps a general visual field through the optical unit 130 and the prism 151'. Using such characteristics of the display, the eyewear-type terminal 100 may provide an augmented reality (AR) by superposing the virtual image 400 onto an image (or a scene, a background, a general visual field of the user) of the reality to display a single image. The optical unit 130 may be embedded in the frame 101. That is, the optical unit 130 is not positioned in the visual field of the user.

In FIG. 3B, the structure in which a virtual image 400' of the visual information 300 is output through the optical unit 130 is substantially the same as the structure described above with reference to FIG. 2B, except for the prism 151'. The optical unit 130 includes the first and second lenses 131 and 132, and the zoom lens unit 133. The virtual image 400' formed by the optical unit 130 may be reflected by the prism 151' and provided to the user's eyes.

However, the structure of the optical unit and the display unit of the eyewear-type terminal is not limited thereto. The control unit 180 may form a virtual image 400 having various sizes on the basis of a user's control command, and control the optical unit 130 in order to output the virtual image 400 in various positions.

The display unit may output the visual information 300 between the focal point f of the first lens 131 of the optical unit 130 and the first lens 131. Accordingly, the virtual image 400' of the visual information 300 may be magnified and formed in a position opposing a position in which the visual information 300 is output with reference to the focal point f of the first lens 131.

The virtual image 400' may be visible to the user through the optical unit 130 and the prism 151'. In this case, in the position of the user, the virtual image 400' may be visible in a virtual region 450 (a space or a virtual space) positioned at the front side in which the user's eyes are oriented). This may mean that the virtual image 400 of the visual information 300 is formed in a virtual region 450 outside the main body (for example, a virtual region positioned at the front side in which the user's eyes are oriented (or the user gazes at)). That is, the optical unit 130 may form the image 400 (virtual image) of the visual information 300 output from the display unit in the virtual region 450 outside of the main body of the eyewear-type terminal (for example, the virtual region 450 (or space) positioned at the front side in which the user's eyes are oriented).

The eyewear-type terminal 100 according to an embodiment of the present invention may store data related to a display position (distance) and a display size of the virtual image 400 visible in the virtual region 450 positioned at the front side in which the user's eyes are oriented.

Also, the sensing unit 140 may sense a user gesture made in the eyewear-type terminal 100 or in a space (or the vicinity of the eyewear-type terminal 100) within a preset distance from the eyewear-type terminal 100. For example, on the basis of the data related to the display position (distance) and the display size of the virtual image 400, the sensing unit 140 may sense a user gesture (motion) applied to the virtual image 400 (hereinafter, referred to as an "image 400"). Here, the user gesture may refer to a motion made by part of the user's body (for example, finger, hand, arm, leg, and the like) or a subject (an object, a rod, or the like).

The sensing unit 140 may sense a user gesture made in a space present within a preset distance from the eyewear-type terminal 100 using various sensors.

For example, the sensing unit 140 may sense a user gesture applied in the vicinity of the eyewear-type terminal 100 by using at least one of a proximity sensor 141, an illumination sensor 142, a magnetic sensor, a motion sensor, an RGB sensor, an infrared (IR) sensor, an ultrasonic sensor, an optical sensor (for example, please refer to the camera 121), an environmental sensor (for example, a radioactivity sensor, a thermal sensor, and the like) or by combining two or more of the sensors.

The control unit 180 may extract (determine) a position to which the user gesture is applied (coordinates, a distance between the user gesture (specifically, user's hand motion) and a point of the eyewear-type terminal, or a direction in which the user gesture is applied), a motion (or an action), and the like, by using the sensing unit 140.

Also, the control unit 180 may sense a user gesture applied to the image 400 through the sensing unit 180.

When the user gesture applied to the image 400 is sensed, it should be understood to mean sensing a user gesture made on the image 400 (that is, in a display position in which the image 400 is formed), sensing a user gesture made in a space 460 between the user's eyes (or a point (for example, the prism 151') of the eyewear-type terminal 100 and the image 400, and sensing a user gesture made in a space around the image 400 (for example, a space within a preset distance from the image 400).

Also, when a user gesture is sensed in the image 400, it may mean that a user gesture is applied to the image 400.

For example, on the basis of the data related to a display position in which the image 400 is formed (distance, direction, coordinates, and the like) and a display size, the control unit 180 may determine (define) the space 460 between the eyewear-type terminal 100 and the image 400. Also, although not shown, on the basis of the data related to the display position in which the image 400 is formed and the display size, the control unit 180 may determine a space around the image 400 (for example, a space within a preset distance from the image 400).

Also, when a user gesture is sensed through the sensing unit 140, the control unit 180 may determine a position (coordinates, distance, and direction) of the sensed user gesture, a motion, or the like.

When it is determined that the determined position of the user gesture is within the space 460 (or an adjacent space), the control unit 180 may determine that the user gesture has been applied to the image 400.

Also, when it is determined that the position of the user gesture is within the space 460 (or an adjacent space) and when a preset condition is met, the control unit 180 may determine that the user gesture has been applied to the image 400.

For example, the preset condition may include a condition in which a subject forming the user gesture does not move for a predetermined period of time in a state of being positioned within the space 460 (hovering), a condition in which the subject makes a specific motion within the space 460, and the like. The space 460 may include a space in which the image 400 is formed in the virtual space, and a space present within a preset distance, and the like.

The control unit 180 may execute various functions on the basis of a user gesture sensed on the image 400. For example, in a case in which the image 400 is an image 400 (virtual image 400) of the visual information 300 transmitted from a drone, the control unit 180 may control the drone, which has transmitted the visual information 300, in various manners on the basis of various types of user gestures applied to the image 400.

Hereinafter, a drone related to the present invention will be described in detail with reference to the accompanying drawings. FIG. 4 is a view illustrating a drone related to the present invention viewed in one direction.

A drone 1000 (or an unmanned aerial vehicle) may include at least one of the components described above with reference to FIG. 1.

For example, the drone 1000 may include a wireless communication unit. The wireless communication unit of the drone 1000 may exchange data with the wireless communication unit 110 provided in the eyewear-type terminal 100.

Also, the drone 1000 may include an upper case 1001, a lower case 1002, a receiving unit 1004, a wing part 1210, a camera 1121, and a control unit.

The upper case 1001 and the lower case 1002 provide a space in which various components for implementing the drone 1000 are installed. At least one of the components described above with reference to FIG. 1, for example, electronic components such as the control unit, the sensing unit, the user input unit, the audio output unit, and the microphone may be installed in the upper case 1001 and the lower case 1002. The upper case 1001 and the lower case 1002 may be referred to as a body part of the drone 1000.

The receiving unit 1004 is formed between the upper case 1001 and the lower case 1002, and the wing part 1210 is received in the receiving unit 1004. The wing part 1210 may include at least one wing unit. In the drawing, the wing part 1210 is illustrated to include four wing units, but the number of the wing units is not limited thereto.

The wing part 1210 may include a propeller 1211 and a main body 1212 including the propeller 1211. The main body 1212 may include at least one of a connection portion 1212a connected to the body part and a fixed portion 1212b fixed such that the propeller 1211 is rotatable. Also, the wing part 1210 includes a moving shaft (not shown) rotatably connecting the connection portion 1212a included in the main body 1212.

A region of the main body 1212 forms a curved surface so as to be continuously formed with outer surfaces of the upper case 1001 and the lower case 1002 in a receiving mode. When the receiving mode is switched to a flying mode, the moving shaft rotatably moves the connection portion 1212a such that the wing unit may protrude to the outside of the body part and the fixed portion 1212b is disposed outwardly. In the flying mode, when the propeller 1211 rotates, the body part flies.

On the basis of a request from the eyewear-type terminal 100, the control unit of the drone 1000 may control the wing part 1210. In detail, when a signal for requesting movement in one direction is received from the eyewear-type terminal 100, the control unit of the drone 1000 may control the wing part 1210 such that the drone 1000 may move in the one direction on the basis of the signal.

Also, the drone 1000 related to the present invention may include a camera 1121. At least one camera 1121 may be provided.

The control unit may transmit a preview image received through the camera 1121 to an external device through the wireless communication unit. For example, the external device may be the eyewear-type terminal 100 related to the present invention.

Here, the preview image refers to an image received through the camera and continuously output with the passage of time.

In response to a request from the eyewear-type terminal 100, the control unit of the drone 1000 may transmit the preview image received through the camera 1121 to the eyewear-type terminal 100 through the wireless communication unit. Accordingly, the preview image received through the camera 1121 of the drone may be displayed on the eyewear-type terminal 100.

Hereinafter, the preview image transmitted from the drone 1000 will be referred to as visual information 300. That is, in the eyewear-type terminal 100, a virtual image 400 of the visual information 300 (preview image) transmitted from the drone 1000 may be formed in the virtual region 450.

Also, the control unit of the drone may control the camera 1121 on the basis of a request from the eyewear-type terminal 100. For example, when a request for performing a zoom-in function of the camera is received from the eyewear-type terminal 100, the control unit of the drone 1000 may control the camera 1121 to perform a zoom-in function, and transmit a preview image (visual information) changed by the zoom-in function to the eyewear-type terminal 100.

Here, obviously, the drone 1000 may be controlled by a remote controller, a mobile terminal, or a fixed terminal capable of controlling the drone 1000, as well as being controlled on the basis of a request from the eyewear-type terminal 100.

Meanwhile, the eyewear-type terminal 100 may control the drone 1000 described above with reference to FIG. 4 in various manners. Hereinafter, a method for controlling the drone 1000 using the eyewear-type terminal 100 described above with reference to FIGS. 1 through 3B will be described in detail with reference to the accompanying drawings.

Figure 5:
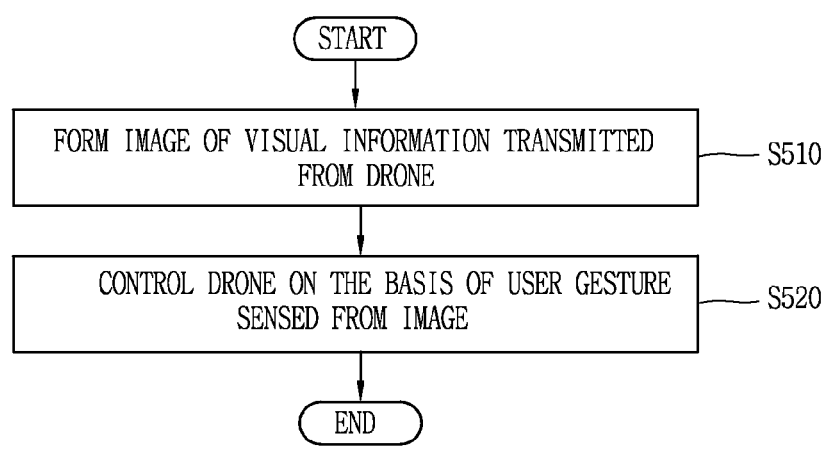
FIG. 5 is a flow chart illustrating a control method of the present invention.
Figure 6:
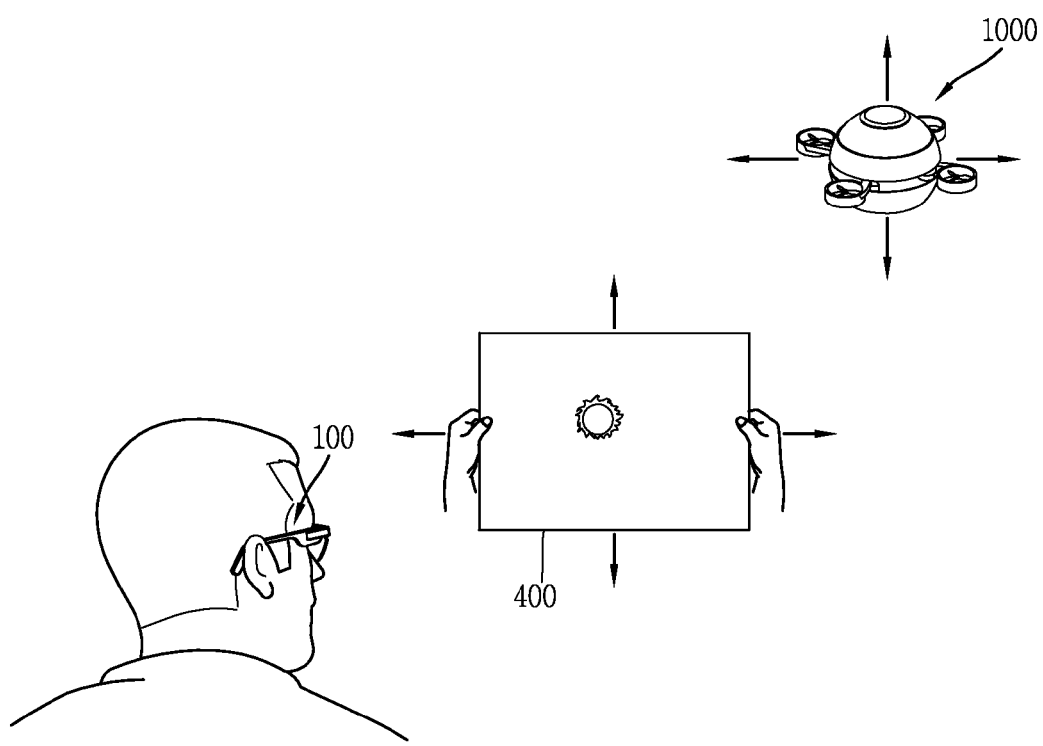
FIG. 6 is a conceptual view illustrating the control method of FIG. 5.

FIG. 5 is a flow chart illustrating a control method of the present invention, and FIG. 6 is a conceptual view illustrating the control method of FIG. 5.

First, the eyewear-type terminal 100 related to the present invention may be connected to the drone 1000 for communication on the basis of a user request. The user request may be made in various manners. For example, the user request may be made by executing an application associated with a function for controlling the drone 1000 installed in the eyewear-type terminal 100.

For example, when the application installed in the eyewear-type terminal 100 is executed, the control unit 180 of the eyewear-type terminal 100 may output a signal for requesting communication connection through the wireless communication unit 110.

In a case in which the drone 1000 is present in a space within a preset distance from the eyewear-type terminal 100, the drone 1000 may receive the output signal and connected to the eyewear-type terminal 100 for communication using the received signal.

In addition, the eyewear-type terminal 100 related to the present invention may be connected to the drone 1000 for communication in various manners, and details thereof will be described with reference to FIGS. 7 and 8.

The drone 1000 connected with the eyewear-type terminal 100 may control the wing part 1210 to start flying. Also, the drone 1000 may turn on the camera 1121 on the basis of the connection.

Thereafter, the drone 1000 may transmit a preview image, that is, visual information, received through the camera 1121 to the eyewear-type terminal 100.

In the eyewear-type terminal 100 related to the present invention, an image of the visual information transmitted from the drone 1000 is formed in step S510. In detail, when the visual information 300 (please refer to FIG. 2B) is received from the drone 1000, the control unit 180 of the eyewear-type terminal 100 may control the display unit 151 to output the visual information 300. The visual information 300 may be output between the focal point f of the first lens 131 included in the optical unit 130 of the eyewear-type terminal 100 and the first lens 131.

The optical unit 130 may form the image 400 (virtual image) of the visual information 300 in a virtual region outside of the main body of the eyewear-type terminal 100. As described above, the virtual region outside of the main body may be a space (or a virtual region or a virtual space) positioned at the front side in which the user's eyes are oriented).

The image 400 of the visual information 300 may be a magnified virtual image of the visual information 300 when the visual information 300 is regarded as a real image. That is, the image 400 corresponding to the virtual image may be a magnified image, compared with the real image. This is because, the visual information 300 corresponding to the real image is positioned between the first lens 131 and the focal point f of the first lens 131.

Here, the image 400 may be changed when the visual information 300 is changed. That is, display contents of the image 400 corresponding to a virtual image may be changed dependently according to a change in display contents of the virtual information 300 corresponding to a real image.

The visual information 300 may be output to be included in a visual field of the user, or may be output such that it is not included in the visual field of the user.

As illustrated in FIGS. 3A and 3B, when the optical unit 130 is not positioned in the visual field of the user, the visual information 300 may not be included in the visual field of the user. The image 400 of the visual information 300 may be formed to be positioned in a virtual region outside of the main body of the eyewear-type terminal 100, that is, in a space viewed by the user (or in a space included in a visual field of the user), through the prism 151'.

The visual information 300 may include any type of screen information that can be output in the eyewear-type terminal 100. The image 400 of the visual information 300 may be the same screen information as the visual information 300, may be screen information excluding at least a portion of the visual information 300, or may be screen information including additional information added to the visual information 300.

For example, the image 400 of the visual information 300 may include screen information, an image, text, an icon, a graphic object, and notification information corresponding to the visual information 300 (for example, preview image) received through the camera 1121 provided in the drone 1000.

Thereafter, the drone 1000 is controlled on the basis of a user gesture sensed in the image 400 in the eyewear-type terminal 100 related to the present invention in step S520.

In the eyewear-type terminal 100, data related to a distance between a point (display position) at which the image 400 of the visual information 300 is viewed in the user position and the eyewear-type terminal 100 and a display size of the image 400 of the visual information 300 may be stored in the memory 170.

The sensing unit 140 may sense a user gesture applied to the image 400 of the visual information 300 on the basis of the data. For example, the sensing unit 140 may sense the user gesture applied to the image 400 of the visual information by using the proximity sensor 141, a magnetic sensor, a motion sensor, an infrared (IR) sensor, an ultrasonic sensor, an optical sensor (for example, the camera 121).

As described above, the user gesture refers to a motion made by a part (for example, a finger, a hand, an arm, or a leg) of the user body or a subject (an object or a stick (or a rod)).

Also, when the user gesture applied to the image 400 is sensed, it should be understood to mean sensing a user gesture made on the image 400 (that is, in a display position (point) in which the image 400 is formed), sensing a user gesture made in a space 460 (please refer to FIG. 3B) between the user's eyes and the image 400, and sensing a user gesture made in a space around the image 400 (for example, a space within a preset distance from the image 400).

That is, the control unit 180 may sense a user gesture with respect to the image 400 of the visual information 300 transmitted from the drone 1000 formed in a virtual region outside of the main body through the sensing unit 140.

On the basis of the user gesture sensed in the image 400 formed in the virtual region outside of the main body, the control unit 180 may control the drone 1000. In detail, when a preset user gesture is applied to the image 400 formed in the virtual region, the control unit 180 may control at least one of a movement of the drone 1000 and the camera 1121 provided in the drone 1000.

For example, when a first user gesture is applied to the image 400, the control unit 180 may control a movement of the drone 1000, and when a second user gesture different from the first user gesture is applied to the image 400, the control unit 180 may control the camera 1121 provided in the drone 1000.

For example, as illustrated in FIG. 6, the control unit 180 may sense a users' gesture applied to the image 400 of visual information formed in a virtual region outside of the main body of the eyewear-type terminal 100. On the basis of various types of gestures applied to the image 400, the control unit 180 may control the wireless communication unit 110 to control the drone 1000.

For example, as illustrated in FIG. 6, when a gesture moving in one direction is sensed in continuation to (following or is subsequent to) a gesture of grabbing the image 400 of the virtual information formed in the virtual region outside of the main body, the control unit 180 may control the drone 1000, which has transmitted the visual information, to be moved in the one direction.

Here, controlling of the drone 1000 includes controlling the wireless communication unit 110 to transmit a control signal to the drone 1000.

Through the configuration, in the present invention, the drone 1000 may be controlled by using a user gesture with respect to the image 400 formed in the virtual region outside of the main body, thereby providing a UX/UI capable of controlling the drone 1000 more conveniently and by intuition, without having to move the user's head wearing the eyewear-type terminal 100 or without using a separate remote controller.

Hereinafter, a method for controlling a drone using an image of visual information formed by the eyewear-type terminal 100 according to various embodiments of the present invention will be described.

Also, hereinafter, in describing with reference to the accompanying drawings, in a case in which at least two images are illustrated 2 by 2 in a single drawing (FIG. N), an image illustrated in a left upper portion will be referred to as a "first drawing", an image illustrated in a right upper portion will be referred to as a "second drawing", an image illustrated in a right lower portion will be referred to as a "third drawing", and an image illustrated in a left lower portion will be referred to as a "fourth drawing".

Also, in a case in which at least two images are illustrated in a row in a vertical direction (from an upper side to a lower side) in a single drawing (FIG. N), images, sequentially starting from one present in the uppermost portion will be referred to as a "first drawing", a "second drawing, . . . ."

Also, in a case in which at least two images are illustrated in a row in a horizontal direction (from the left to the right) in a single drawing (FIG. N), images, sequentially starting from one present in the leftmost portion will be referred to as a "first drawing", a "second drawing, . . . ."

Figure 7:
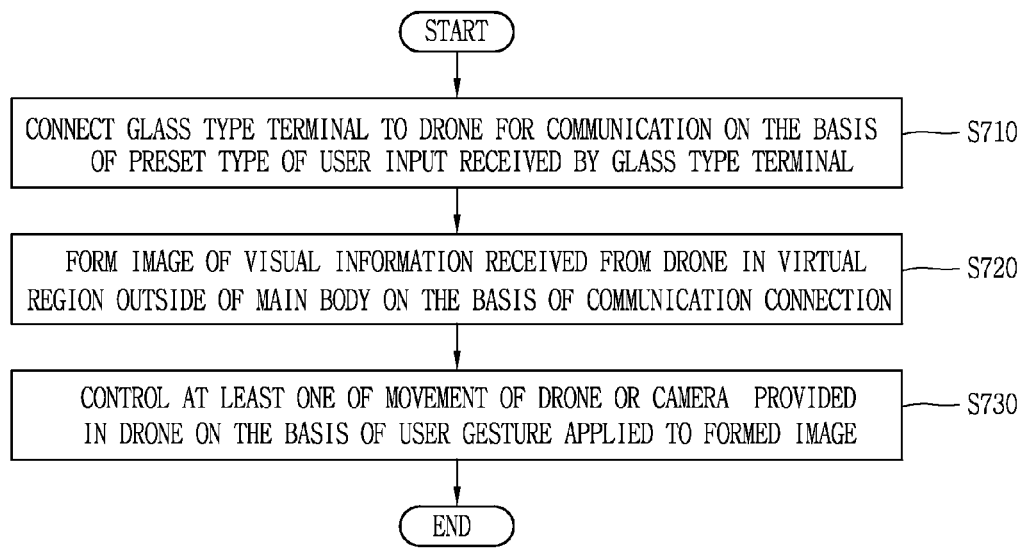
FIG. 7 is a flow chart illustrating a control method of a eyewear-type terminal and a drone according to an embodiment of the present disclosure.
Figure 8:
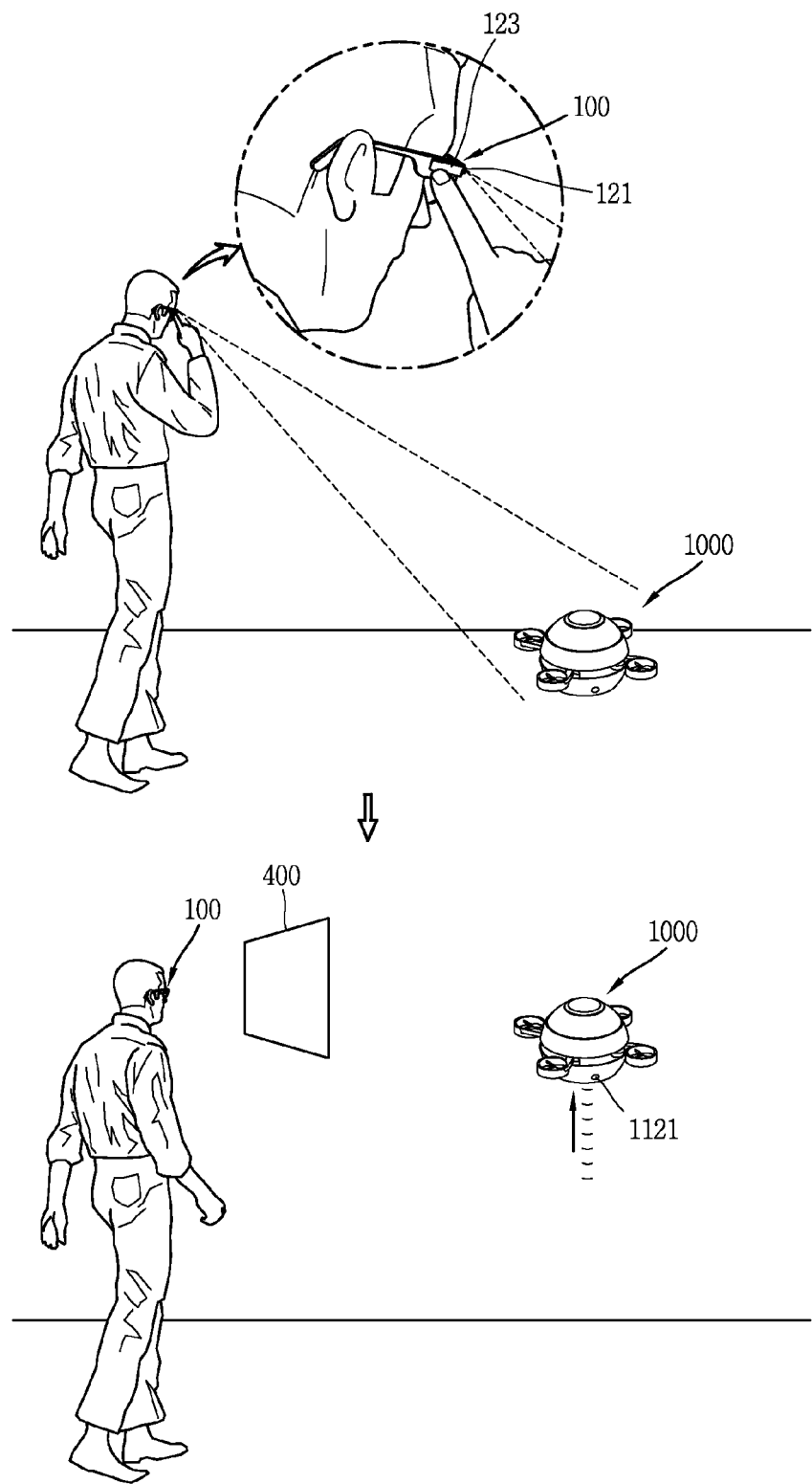
FIG. 8 is a conceptual view illustrating a method for connecting a eyewear-type terminal and a drone for communication according to an embodiment of the present disclosure.

FIG. 7 is a flow chart illustrating a control method of a eyewear-type terminal and a drone according to an embodiment of the present disclosure, and FIG. 8 is a conceptual view illustrating a method for connecting a eyewear-type terminal and a drone for communication according to an embodiment of the present disclosure.

Referring to FIG. 7, in the present invention, when a preset type of user input is received in the eyewear-type terminal 100, the eyewear-type terminal 100 and the drone 1000 are connected for communication in step S710.

For example, as illustrated in the first drawing of FIG. 8, the drone 1000 related to the present invention may not fly in an ON state. Unless a control signal is received, the drone 1000 may be in a non-fly state.

The drone 1000 in a non-fly state may receive a signal from the eyewear-type terminal 100. In detail, in a state in which the eyewear-type terminal 100 is in an ON state, when a preset type of user input is received by the eyewear-type terminal 100 (or when the eyewear-type terminal 100 satisfies a preset condition), the control unit 180 may transmit a signal to the drone 1000.

Here, the signal may be a signal for connecting the eyewear-type terminal 100 and the drone 1000 for communication.

For example, on the basis of a user request, the control unit 180 may activate the camera 121 provided in the eyewear-type terminal 100. The user request may include various types of input inputs, and for example, the user request may be a preset touch (for example, a long touch) applied to the user input unit 123 of the eyewear-type terminal 100.

The control unit 180 may analyze a preview image received through the activated camera 121 and determine whether an image corresponding to the drone 1000 may be included in the preview image.

When an image corresponding to the drone 1000 is included in the preview image, the control unit 180 may transmit a signal for connection to the drone 1000, to the drone 1000 through the wireless communication unit 110.

In another example, in a state in which a touch applied to the user input unit 123 is maintained, when the image corresponding to the drone 1000 is present in the preview image, the control unit 180 may transmit a signal for connection to the drone 1000, to the drone 1000.

In another example, although not shown, when the camera 121 is activated, the control unit 180 may control the display unit 151 to output a preview image received through the camera 121 and control the optical unit 130 to form a virtual image of the preview image in a region outside of the main body. In a state in which the virtual image of the preview image is formed, when a gesture to select the image of the drone 1000 included in the virtual image is sensed, the control unit 180 may transmit a signal for connection to the drone 1000, to the drone 1000.

Thereafter, in the present invention, on the basis of the communication connection, an image of visual information received from the drone 1000 is formed in the virtual region outside of the main body of the eyewear-type terminal 100 in step S720.

For example, when the drone 1000 receives the signal for communication connection from the eyewear-type terminal 100, the eyewear-type terminal 100 and the drone 1000 may be connected for communication.

Also, when the drone 1000 receives a signal from the eyewear-type terminal 100 (that is, when the drone 1000 is connected to the eyewear-type terminal 100 for communication, as illustrated in the second drawing of FIG. 8, the drone 100 may start flying. In detail, when drone 1000 is connected to the eyewear-type terminal 100 on the basis of the signal, the control unit of the drone 1000 may control the wing part 1210 of the drone 1000 to reach a preset height.

Here, the preset height may be determined according to user setting, and for example, the preset height may be equal to a height of the eyewear-type terminal, which has transmitted the signal, from the ground.

When the drone 1000 starts flying (or when a signal for communication connection is received from the eyewear-type terminal 100 or when connected for communication), the control unit of the drone 1000 may switch the camera 1121 provided in the drone 1000 from a deactivated state to an activated state. The camera 1121 may be activated in various manners. For example, the camera 1121 may be activated when the drone 1000 is connected to the eyewear-type terminal 100 (that is, when the drone 1000 receives a signal from the eyewear-type terminal 100), when the drone 1000 starts flying, and when a control signal for controlling activation of the camera is received from the eyewear-type terminal 100.

When the camera 1121 is activated, the control unit 180 of the drone 1000 may transmit a preview image received through the activated camera 1121 to the eyewear-type terminal 100 through the wireless communication unit of the drone 1000. Here, the preview image transmitted from the drone 1000 may correspond to visual information 300 output by the display unit 151 of the eyewear-type terminal 100.

When the visual information 300 (preview image) is transmitted from the drone 1000, the control unit 180 of the eyewear-type terminal 100 may form an image 400 corresponding to the visual information, that is, the image 400 of the visual information 300, in a virtual region outside of the main body of the eyewear-type terminal 100. The image 400 of the visual information 300 may be formed in a space (virtual region outside of the main body) positioned in front of the user, and may include screen information corresponding to the preview image received through the camera 1121 of the drone 1000.

However, the method for connecting the eyewear-type terminal 100 and the drone 1000 for communication is not limited to the example described above with reference to FIGS. 5 and 8.

Thereafter, in the present invention, at least one of a movement of the drone 1000 and the camera provided in the drone 1000 is controlled on the basis of a user gesture applied to the formed image 400 in step S730.

The eyewear-type terminal 100 related to the present invention may control the drone 1000 on the basis of the user gesture applied to the image 400 of the visual information 300. For example, when a specific user gesture is sensed in the image 400 of the visual information 300, the eyewear-type terminal 100 may transmit a control signal associated with the specific user gesture to the drone 1000. When the control signal associated with the specific user gesture is received, the drone 1000 may perform an operation corresponding to the control signal.

As described above, when the first user gesture is applied to the image 400 formed in the virtual region, the control unit 180 of the eyewear-type terminal 100 related to the present invention may control a movement of the drone 1000, and when the second user gesture different from the first user gesture is applied to the image 400, the control unit 180 may control the camera 1121 provided in the drone 1000.

Hereinafter, a method for controlling at least one of a movement of the drone 1000 and the camera 1121 provided in the drone 1000 on the basis of the first and second user gestures will be described in detail with reference to the accompanying drawings.

Figure 9:
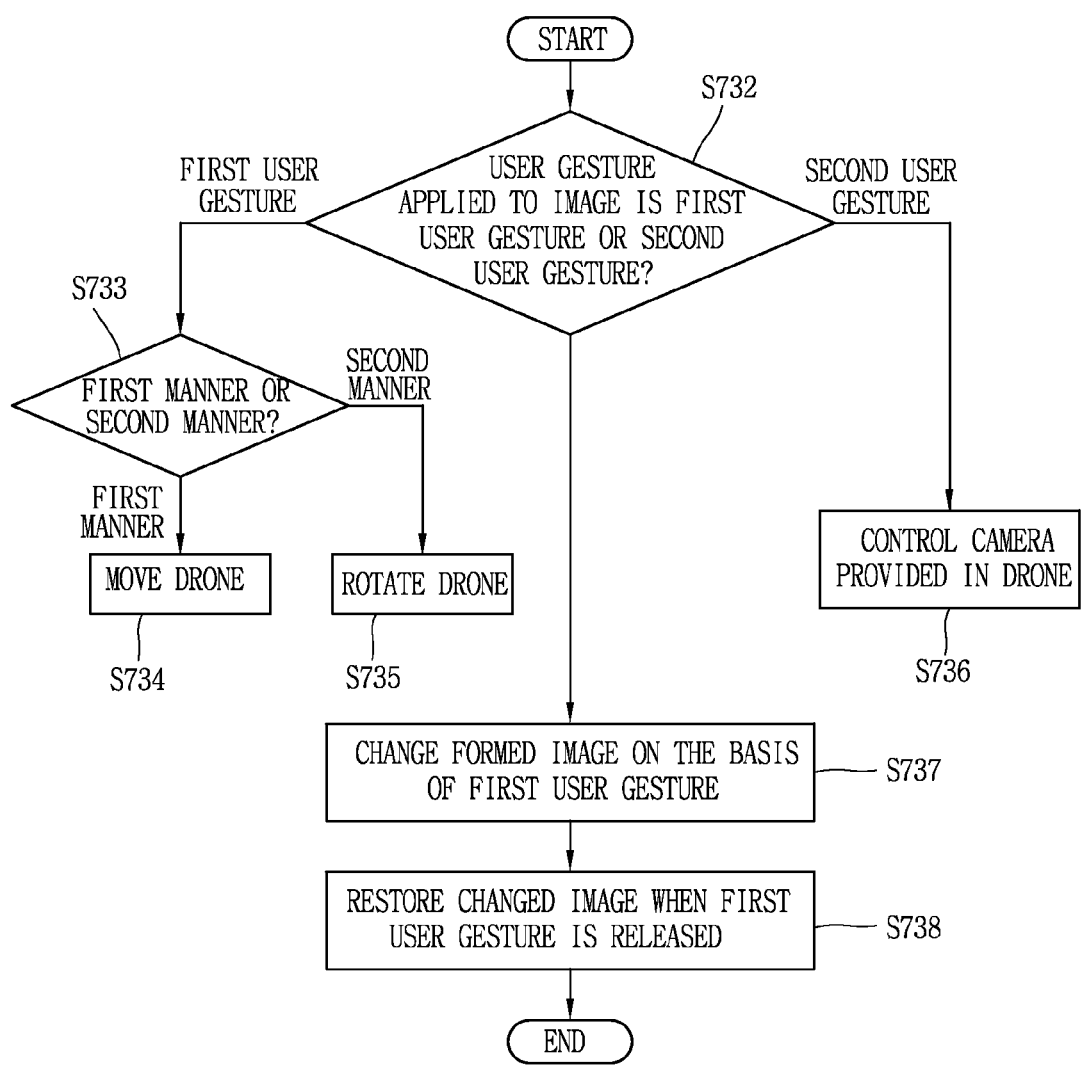
FIG. 9 is a flow chart illustrating a method for controlling a drone on the basis of a user gesture applied to a virtual image according to an embodiment of the present disclosure.

FIG. 9 is a flow chart illustrating a method for controlling a drone on the basis of a user gesture applied to a virtual image according to an embodiment of the present disclosure.

The flow chart illustrated in FIG. 9 may be understood as a flow chart specifically illustrating step S730 of FIG. 7.

Referring to FIG. 9, in a state in which an image is formed in a virtual region outside of the main body of the eyewear-type terminal 100, when a user gesture is sensed in the image, it is determined whether the user gesture is the first user gesture or the second user gesture in step S732.

In detail, the control unit 180 may determine through the sensing unit 140 whether the user gesture sensed in the image is the first user gesture or the second user gesture.

The first user gesture and the second user gesture may be preset gestures formed by the object (for example, user's hand) sensed in the image.

Also, the first user gesture may be a gesture associated with a function for controlling a movement of the drone 1000 and the second user gesture may be a gesture associated with a function for controlling the camera 1121 provided in the drone 1000.

In a case in which the user gesture sensed in step S732 is the first user gesture, the control unit 180 may control a movement of the drone 1000. Here, the control unit 180 may determine whether the first user gesture has been applied in a first manner or in a second manner in step S733.

Thereafter, in a case in which the first user gesture has been applied in the first manner, the control unit 180 may control the drone 1000 to be moved in step S734. Also, in a case in which the first user gesture has been applied in the second manner different from the first manner, the control unit 180 may control the drone 1000 to be rotated in step S735.

Meanwhile, in a case in which the user gesture sensed in step S732 is the second user gesture, the control unit 180 may control the camera provided in the drone in step S736. Here, the second user gesture may refer to a gesture applied in a manner different from that of the first user gesture.

Meanwhile when the user gesture is applied to the image, the control unit 180 may change (deform) the image in step S737. Changing (deforming) of the image may include changing of a display position (distance, coordinates, direction) where the image is formed, and a display scheme.

In detail, when a user gesture (first user gesture) is applied to the image formed in the virtual region outside of the eyewear-type terminal, the control unit 180 may change at least one of a display position where the image is formed and the display scheme of the image.

Thereafter, when the user gesture sensed in the image is released, the control unit 180 may restore the changed image to the state before the user gesture was applied in step S738.

Steps S732 to S738 are not limited in time series.

Hereinafter, a method for controlling a movement of a drone according to an embodiment of the present invention, a method for controlling a drone, and a method for changing an image will be described in detail with reference to the accompanying drawings.

Figure 10A:
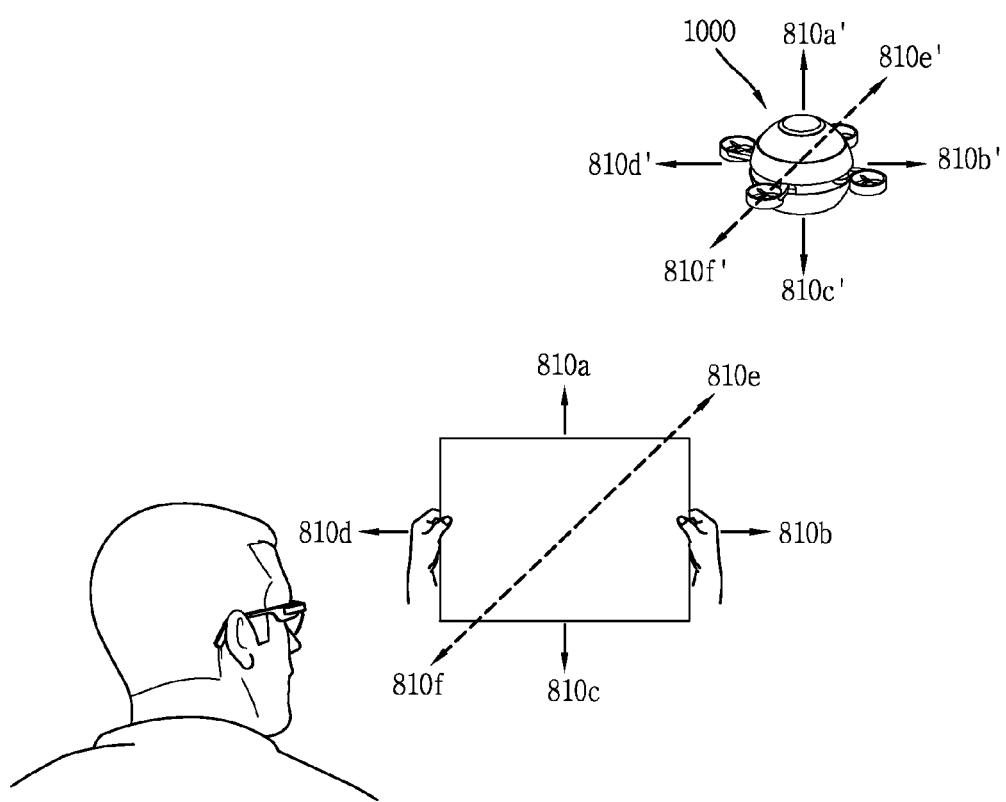
FIGS. 10A, 10B, 10C, and 11 are conceptual views illustrating a method for controlling a movement of a drone using an image of visual information transmitted from the drone according to an embodiment of the present disclosure.
Figure 10B:
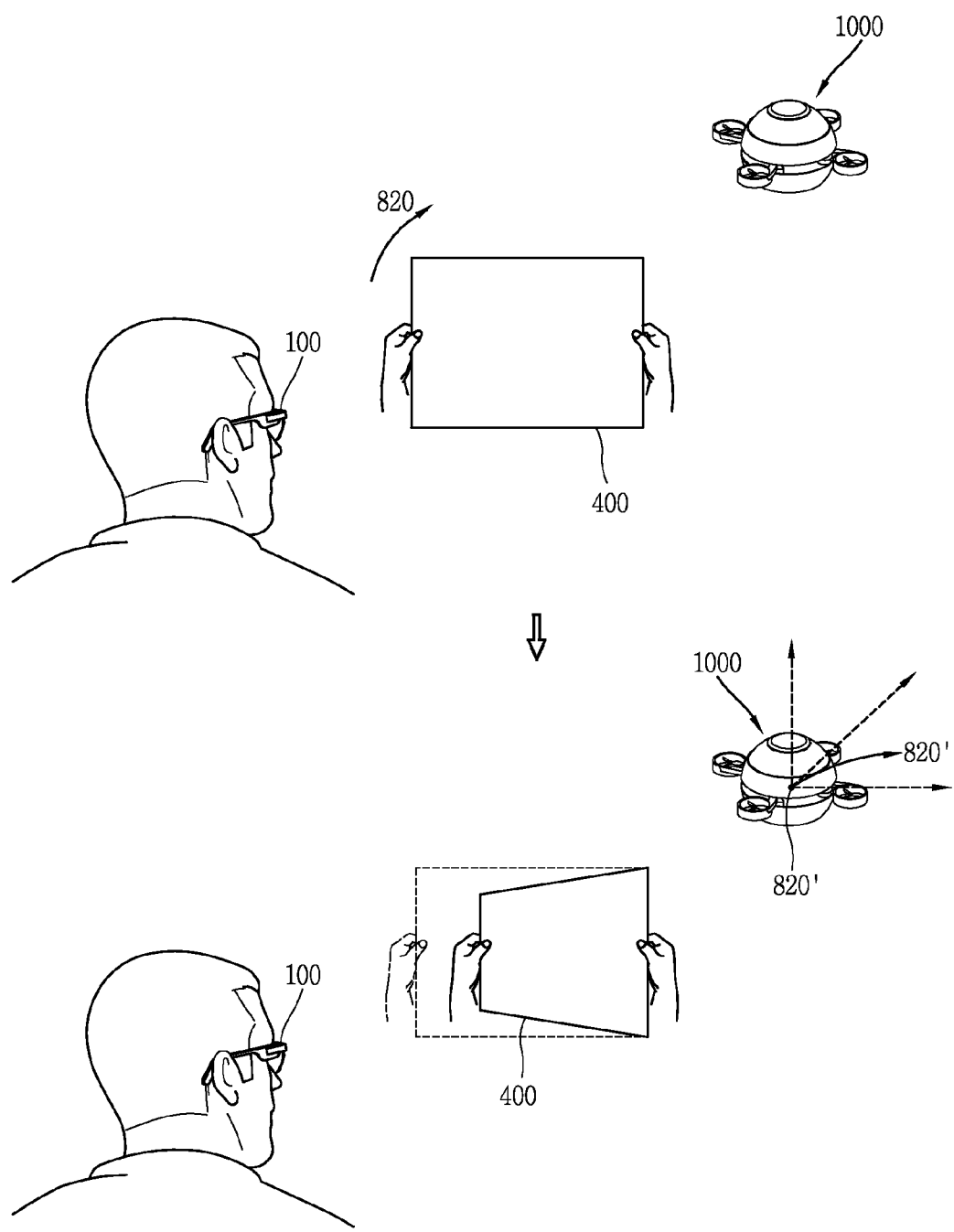
Figure 10C:
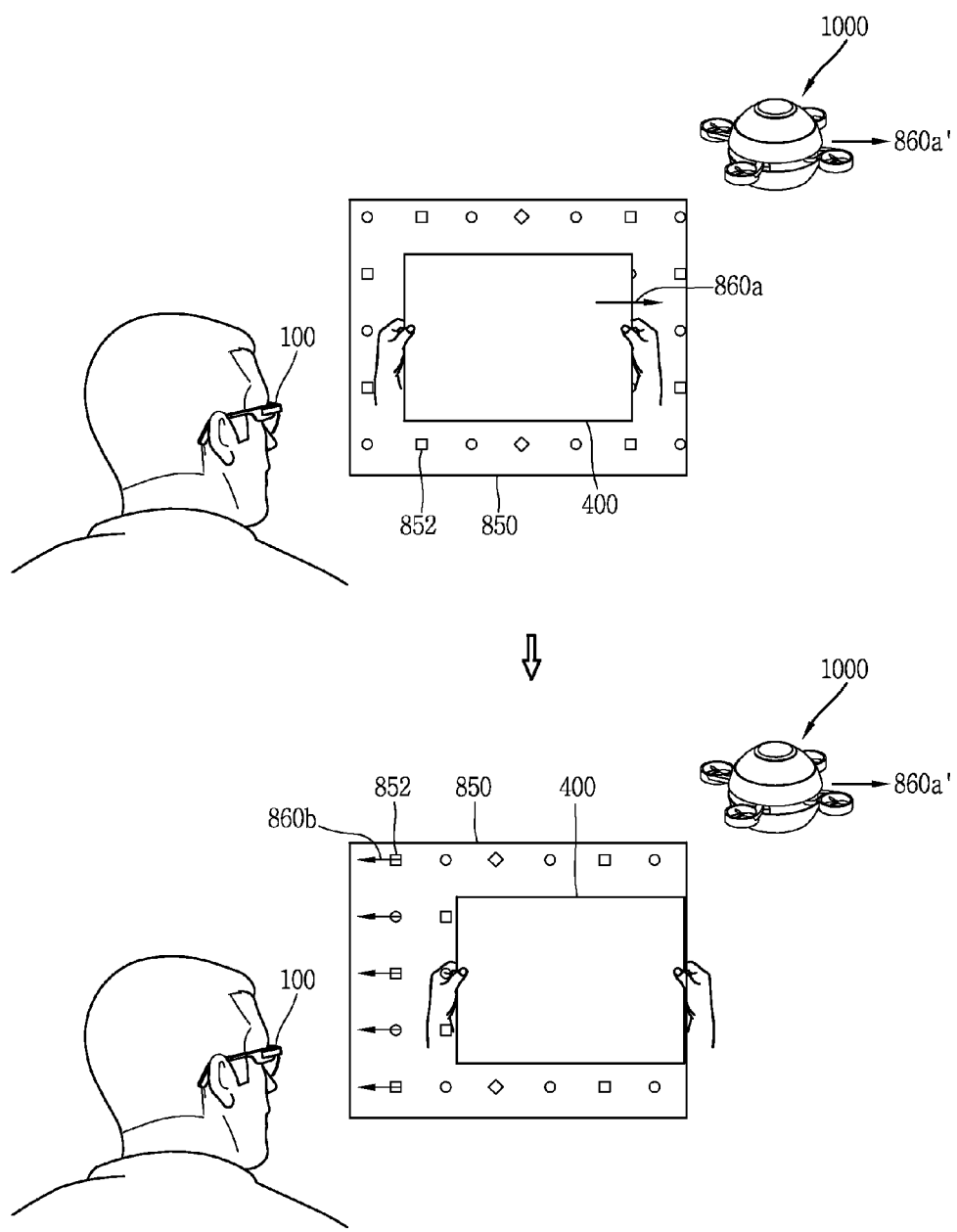
Figure 11:
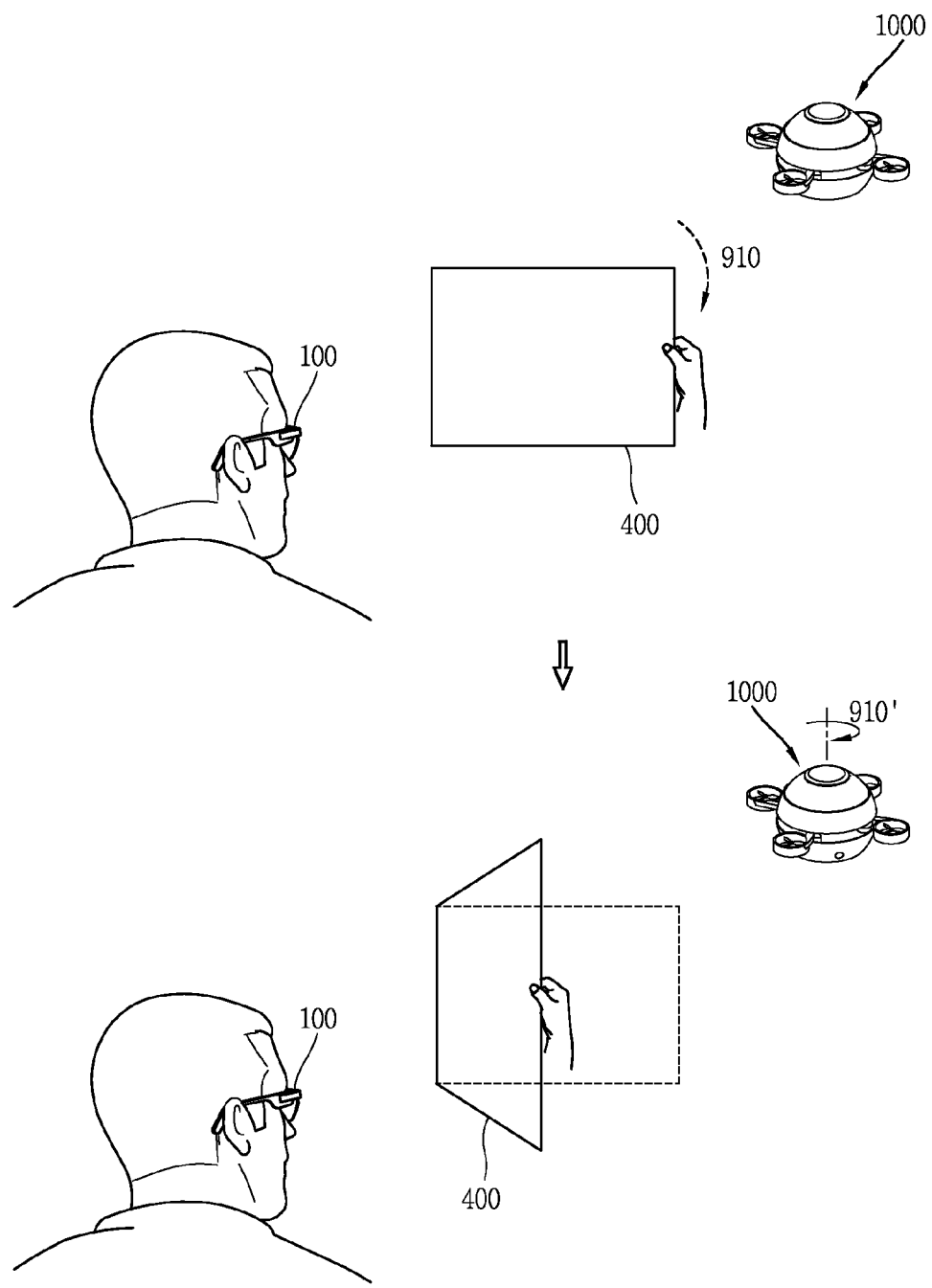
Figure 12:
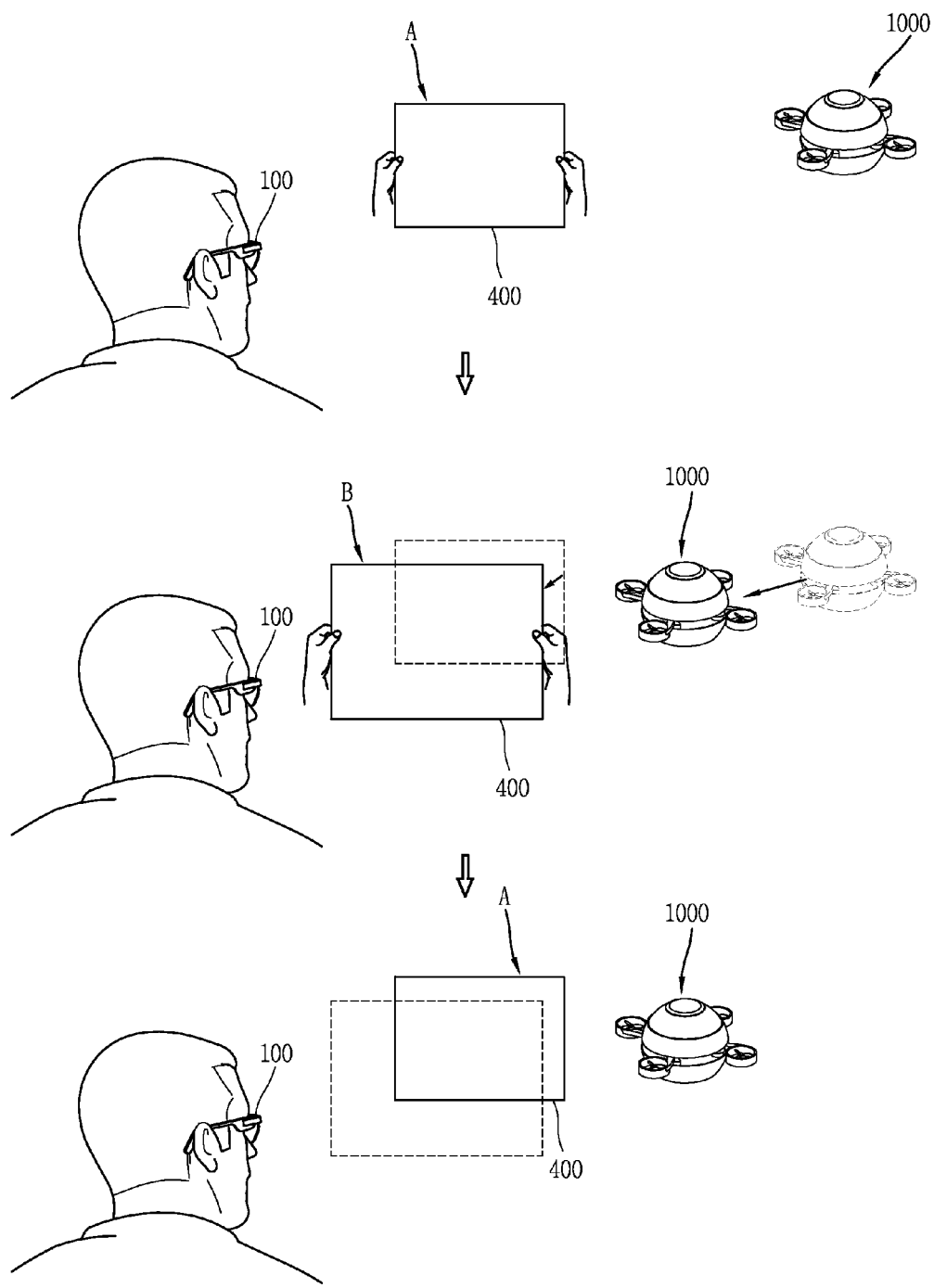
FIG. 12 is a conceptual view illustrating changing of a display scheme of an image of visual information according to an embodiment of the present disclosure.

FIGS. 10A, 10B, 10C, and 11 are conceptual views illustrating a method for controlling a movement of a drone using an image of visual information transmitted from the drone according to an embodiment of the present disclosure, and FIG. 12 is a conceptual view illustrating changing of a display scheme of an image of visual information according to an embodiment of the present disclosure.

The eyewear-type terminal 100 related to the present invention may control a movement of the drone 1000 by using the image 400 of visual information received from the drone 1000 formed in a virtual region outside of the main body of the eyewear-type terminal 100.

When a preset type of user gesture is sensed in the image 400 of the visual information, the control unit 180 may transmit a control signal to the drone 1000 through the wireless communication unit 110 on the basis of the user gesture.

For example, when the first user gesture is applied to the image 400, the control unit 180 may transmit a control signal for controlling a movement of the drone 1000, and when the second user gesture different from the first user gesture is applied to the image 400, the control unit 180 may transmit a control signal for controlling the camera 1121 provided in the drone 1000.

Here, the first user gesture may be a gesture continuously applied in continuation to a gesture of grabbing the image 400, for example.

The control unit 180 may sense the gesture of grabbing the image 400 of the visual information transmitted from the drone 1000 formed in the virtual region outside of the main body of the eyewear-type terminal 100. In detail, on the basis of a position in which the image 400 of the visual information is formed, the control unit 180 may sense a user gesture applied to the image 400 of the visual information. Also, in a case in which the user gesture corresponds to a motion of grabbing the image 400 of the visual information, the control unit 180 may determine that the motion is the gesture of grabbing the image 400.

Thereafter, on the basis of the gesture applied in continuation to the gesture of grabbing the image 400, the control unit 180 may transmit a control signal to the drone 1000 to move the drone 1000. The gesture applied in continuation to the gesture of grabbing the image 400 refers to a motion additionally generated in a state in which the grabbing motion is maintained after the motion of grabbing the image 400 is applied.

Here, when the gesture of grabbing the image 400 is sensed, the control unit 180 may output notification information indicating that the gesture grabbing the image 400 has been sensed. The notification information may be generating a sound or vibration or outputting an indicator on the image 400.

Meanwhile, the control unit 180 may control the drone 1000 to be moved in different manners according to types of gestures of grabbing the image. In detail, when a gesture is applied in continuation to a gesture of grabbing the image in the first manner, the control unit 180 may move the drone 1000. Also, when a gesture is applied in continuation to a gesture of grabbing the image in the second manner different from the first manner, the control unit 180 may rotate the drone 1000.

For example, the gesture of grabbing the image in the first manner may be a user gesture of grabbing the image 400 with both hands, and the gesture of grabbing the image in the second manner may be a user gesture of grabbing the image 400 with one hand.

At least one of a display position, a display form, a display mode, and a display size of the image 400 may be changed on the basis of at least one of a gesture of grabbing the image 400 and a gesture applied in continuation to the gesture of grabbing the image 400.

First, a method of moving the drone 1000 on the basis of a gesture applied in continuation to the gesture of grabbing the image in the first manner will be described.

Referring to FIG. 10A, when a gesture of moving in one direction 810*a* is applied in continuation to the gesture of grabbing the image 400 in the first manner, the control unit 180 may control the drone 1000 to be moved in a direction 810*a*' corresponding to the one direction 810*a*.

Here, the direction of the drone 1000 may be defined with respect to the camera 1121 provided in the drone 1000. For example, a front direction of the drone 1000 may be a direction in which the side on which the camera 1121 is oriented, and a left side, a right side, a rear side, an upper side, and a lower side of the drone 1000 may be defined with respect to the front side.

For example, when a gesture of moving the image 400 in an upward direction 810*a* or a downward direction 810*c* is applied in continuation to the gesture of grabbing the image 400 in the first manner, the control unit 180 may control the drone 1000 to be moved in the direction 810*a*' corresponding to the upward direction or in the direction 1000*c*' corresponding to the downward direction.

In another example, when a gesture of moving the image 400 in the forward direction 810*e* (for example, in a direction away from the user) or in a backward direction 810*f* (for example, in a direction toward the user) is applied in continuation to the gesture of grabbing the image 400 in the first manner, the control unit 180 may control the drone 1000 to be moved in the direction 810*e*' in which the side on which the camera 1121 of the drone 1000 is provided is oriented or in a direction 810*f*' in which the side opposing the side on which the camera 1121 of the drone 1000 is provided is oriented.

In another example, when a gesture of moving the image 400 in a leftward direction 810*d* or in a rightward direction 810*b* is applied in continuation to the gesture of grabbing the image 400 in the first manner, the control unit 180 may control the drone 1000 to be moved in a direction 810*d* in which the left side is oriented or in a direction 810*b*' in which the right side is oriented with respect to the side on which the camera 1121 of the drone 1000 is provided.

A speed at which the drone 1000 moves may be in proportion to a distance of the gesture of moving the image 400 in continuation to the gesture of grabbing the image 400 in the first manner. In detail, when a gesture of moving the image 400 by a first distance in one direction in consideration of the gesture of grabbing the image 400 in the first manner is sensed, the control unit 180 may control the drone 1000 to be moved at a first speed corresponding to the first distance in the one direction. Also, when a gesture of moving the image 400 by a second distance different to the first distance in the one direction in continuation to the gesture of grabbing the image 400 in the first manner is sensed, the control unit 180 may control the drone 1000 to be moved at a second speed corresponding to the second distance in the one direction.

Meanwhile, when a gesture of moving the image 400 between any two directions is applied in continuation to the gesture of grabbing the image 400 in the first manner, the control unit 180 may control the drone 1000 to be moved on the basis of the any two directions.

For example, when a gesture moving the image 400 in the direction 810e in which the front side is oriented and the direction 810b in which the right side is oriented is applied in continuation to the gesture of grabbing the image 400 in the first manner, the control unit 180 may control the drone 1000 to be moved between the direction 810e' corresponding to the direction in which the front side of the drone 1000 on which the camera is provided is oriented and the direction 80b' in which the right side with respect to the front side is oriented. The direction in which the drone 1000 is moved may correspond to a direction of a vector of the gesture moving in the direction 810e in which the front side is oriented and in the direction 810b in which the right side is oriented, and the speed at which the drone 1000 is moved may be in proportion to the distance (size, value) of the vector.

Meanwhile, when a gesture of rotating the image 400 with respect to any one axis is applied in continuation to the gesture of grabbing the image 400 in the first manner, the control unit 180 may move the drone 1000 to a path corresponding to the rotation direction.

For example, as illustrated in the first drawing of FIG. 10B, when a gesture 820 of moving the left portion of the image 400 in a direction away from the user with respect to the left side of the image 400 is applied in continuation to the gesture of grabbing the image 400 in the first manner, the control unit 180 may control the drone 1000 to be moved between a direction in which the front side of the drone 1000 on which the camera is provided is oriented and a direction in which the right side is oriented.

Here, the drone 1000 may be moved to have a specific radius of curvature. That is, when a gesture of rotating the image 400 is applied in continuation to the gesture of grabbing the image 400 in the first manner, the control unit 180 may control the drone 1000 to be moved to have a specific radius of curvature, rather than being moved in a straight line.

Here, the radius of curvature may be in inverse proportion to a degree to which the image 400 is rotated according to a user gesture.

Meanwhile, the eyewear-type terminal 100 related to the present invention may further output guide information for guiding a movement of the image 400 by a user gesture. In detail, the control unit 180 may control the display unit 151 to output the guide information and control the optical unit 130 to form a virtual image 850 of the guide information.

The virtual image 850 of the guide information may be formed together with the image 400 of the visual information transmitted from the drone 1000. In detail, the image 400 of the visual information may b formed in a virtual region outside of the main body of the eyewear-type terminal 100 such that it is included in the virtual image 850 of the guide information. The virtual image 850 of the guide information may be a background image (or a background interface). Even though a user gesture is applied to the virtual image 850, at least one of a display position, a display size, and a display form of the virtual image 850 of the guide information may not be changed.

Graphic objects 852 formed to have a preset pattern may be included in the virtual image 850 of the guide information. For example, the graphic objects 852 may be disposed to be spaced apart from each other by a preset distance. Shapes of the graphic objects 852 are not limited to the shapes illustrated in FIG. 10C and may include a grid shape, or the like.

The image 400 of the visual information transmitted from the drone 1000 may be moved within the virtual image 850 of the guide information by a user gesture. That is, a range in which the image 400 of the visual information is moved by a user gesture may be limited to be within the virtual image 850 of the guide information.

As illustrated in the first drawing of FIG. 10C, when a gesture of moving the image 400 in one direction 860a (for example, in a rightward direction) is applied in continuation to the gesture of grabbing the image 400 of the visual information in the first manner, the control unit 180 may move the image 400 according to the gesture of moving the image 400. Also, on the basis of the gesture moving the image 400 of the visual information in the one direction 860a in continuation to the gesture of grabbing the image 400 of the visual information in the first manner, the control unit 180 may control the drone 1000 to be moved in a direction 860a' (for example, in a direction in which the right side is oriented with respect to the front side of the drone 1000 on which the camera is provided) corresponding to the one direction.

Meanwhile, as illustrated in a second drawing of FIG. 10C, on the basis of the gesture moving the image 400 of the visual information in the one direction 860a (for example, in the rightward direction) in continuation to the gesture of grabbing the image 400 of the visual information in the first manner, the image 400 of the visual information may come into contact with at least a portion of the virtual image 850 of the guide information. In this state, when the gesture of moving the image 400 of the visual information in the one direction 860a is continuously applied, the control unit 180 may limit the movement of the image 400 of the visual information. Also, when the gesture of moving the image 400 of the visual information in the one direction 860a is continuously applied in the foregoing state, the control unit 180 may move the graphic object(s) 852 included in the virtual image 850 of the guide information in a direction 860b opposite to the one direction 860a. A speed at which the graphic object 852 moves may be in proportion to a degree to which the gesture of moving the image 400 in the one direction 860a is continuously applied.

This is to inform that the gesture of moving the image 400 of the visual information in the one direction 850a is being applied in continuation to the gesture of grabbing the image 400 of the visual information in the first manner.

Here, the drone 1000 moves in the direction 860a' corresponding to the one direction 850a, and in this case, the drone 1000 may move at a speed proportional to an absolute value speed corresponding to the distance by which the image 400 of the visual information has been moved and an absolute value speed at which the graphic object 852 is moved.

As described above, according to the present invention, on the basis of a gesture applied in continuation to the gesture of grabbing the image 400 in the first manner (for example, the gesture of grabbing the image with both hands), the drone 1000 may be moved. However, in the above, the case in which the first manner is the gesture made with both hands and the drone 1000 is moved on the basis of the gesture applied in continuation to the gesture of grabbing the image has been described as an example, but the preset invention is not limited thereto. In another example, the first manner may be a gesture made by one hand. Also, the movement of the drone 1000 may be made on the basis of a gesture applied in continuation to a gesture made in various manners as well as the gesture applied in continuation to the gesture of grabbing the image.

The gesture in the various manners may be a gesture that the user's hand is maintained in a point (or a region or a portion) of the image 400 for a preset period of time or longer. That is, when the gesture of moving the image 400 in one direction in continuation to the gesture that the user's hand is maintained in a point for a preset period of time is sensed, the control unit 180 may control the drone 1000 to be moved in the one direction.

Also, when only the gesture of grabbing the image 400 in the first manner (user's both hands) is applied, the eyewear-type terminal 100 related to the present invention may move the drone 1000. Here, on the basis of a position in which the user grabs the image 400 with his or her both hands, the control unit 180 may move the drone 1000 in different directions.

For example, when a gesture of grabbing left and right sides of the image 400 is applied, the control unit 180 may move the drone 1000 in a direction in which the front side of the drone 1000 on which the camera is provided is oriented, and when a gesture of grabbing upper and lower sides of the image 400 is applied, the control unit 180 may move the drone 1000 in a direction in which the rear side opposing the front side is oriented.

Meanwhile, the eyewear-type terminal 100 related to the present invention may rotate the drone 1000 on the basis of a gesture applied in continuation to the gesture of grabbing the image 400 in the second manner different from the first manner. Here, rotating the drone 1000 refers to rotating the drone 1000 with respect to a central axis of the drone in a position of the drone 1000.

For example, the second manner may be a manner performed by user's one hand, rather than user's both hands. In detail, the gesture of grabbing the image 400 in the second manner may refer to a gesture of grabbing the image 400 with user's one hand.

When the gesture of grabbing the image 400 in the second manner is sensed, the control unit 180 may output notification information indicating that the gesture of grabbing the image 400 has been sensed. The notification information may be generation of a sound or vibration or outputting an indicator to the image 400.

Here, as described above with reference to FIGS. 10A through 10C, the notification information output when the gesture of grabbing the image 400 in the first manner is sensed and the notification information output when the gesture of grabbing the image 400 in the second manner is sensed may be differently formed. For example, in a case in which first notification information is displayed when the gesture of grabbing the image 400 in the first manner is sensed, when the gesture of grabbing the image 400 in the second manner is sensed, second notification information different from the first notification may be displayed.

Thereafter, on the basis of the gesture applied in continuation to the gesture of grabbing the image 400 in the second manner, the control unit 180 may rotate the drone 1000.

For example, as illustrated in a first drawing of FIG. 11, when a gesture of rotating the image 400 in one direction 910 is sensed in continuation to a gesture of grabbing the image 400 in the second manner (for example, the user grabs the image 400 with one hand), the control unit 180 may control the drone 1000 to be rotated in a direction 910' corresponding to the one direction 910 with respect to a central axis of the drone 1000.

For example, when a gesture of pulling the right side of the image 400 in a direction toward the user is applied in continuation to a gesture of grabbing the right side of the image 400, the control unit 180 may control the drone 1000 to be rotated in a rightward direction with respect to a central axis of the drone 1000.

Meanwhile, as well as rotating the drone 1000 on the basis of the gesture applied in continuation to the gesture of grabbing the image 400 in the second manner, the eyewear-type terminal 100 related to the present invention may also rotate the drone 1000 on the basis of the gesture of grabbing the image 400 in the second manner. Here, a direction in which the drone 1000 rotates may be varied on the basis of a position to which the gesture of grabbing the image 400 in the second manner is applied.

For example, when a gesture of grabbing the right side of the image 400 in the second manner (the user grabs the right side of the image 400 with one hand) is applied, the control unit 180 may control the drone 1000 to be rotated in the rightward direction with respect to the central axis of the drone 1000.

Also, when a gesture of grabbing the left side of the image 400 in the second manner is applied, the control unit 180 may control the drone 1000 to be rotated in the leftward direction with respect to the central axis of the drone 1000.

Meanwhile, when the first user gesture (the gesture of grabbing the image in the first or second manner or the gesture applied in continuation to the gesture of grabbing the image) described above with reference to FIGS. 10A to 11 is released, the control unit 180 may control the drone 1000 not to be moved. That is, when the gesture of grabbing the image 400 is released, the control unit 180 may control the drone 1000 to maintain flying in the current position (the point in which the drone 1000 is positioned at the point in time at which the gesture is released).

Meanwhile, in a state in which the image 400 is displayed (formed) in a first display manner, when the first user gesture is applied, the eyewear-type terminal 100 may display the image 400 in a second display manner different from the first display manner in response to the applied gesture.

Here, the display manner should be understood as a concept including a display position in which the image 400 is formed, a display form of the image 400, and a display size of the image 400.

For example, in a state in which the image 400 of visual information is formed in the first display manner (A) in a virtual region outside of the main body of the eyewear-type terminal 100 as illustrated in a first drawing of FIG. 12, when a gesture of moving the image 400 in a direction toward the user is applied in continuation to the gesture of grabbing the image 400 in the first manner as illustrated in a second drawing of FIG. 12, the control unit 180 may change the image 400 of visual information from the first display manner to a second display manner (B). For example, the second display manner may include displaying the image 400 formed in the first display manner (A) in a position closer to the user and changing a size of the image 400.

Also, on the basis of the gesture of moving the image 400 in a direction toward the user, the drone 1000 may be moved in a direction in which the rear side of the drone 1000 opposing the front side of the drone 1000 is oriented.

Thereafter, as illustrated in a third drawing of FIG. 12, when the gesture of grabbing the image 400 is released, the control unit 180 may restore the image 400 displayed in the second display manner (B) to the first display manner (A). Here, the first display manner (A) may be a manner in which the image is displayed before the gesture of grabbing the image is applied, namely, a default display manner.

Also, the drone 1000 may maintain flying in a point at which the drone 1000 is positioned at a point in time at which the gesture of grabbing the image 400 is released.

Through the configuration, in the present invention, an optimized UI/UX capable of controlling a movement of the drone 1000 on the basis of a user gesture (for example, a first user gesture) applied to the image of visual information formed in a region outside of the main body of the eyewear-type terminal may be provided.

Hereinafter, a method for controlling the camera provided in the drone on the basis of a second user gesture applied to be different from the first user gesture will be described in detail with reference to the accompanying drawings.

Figure 13A:
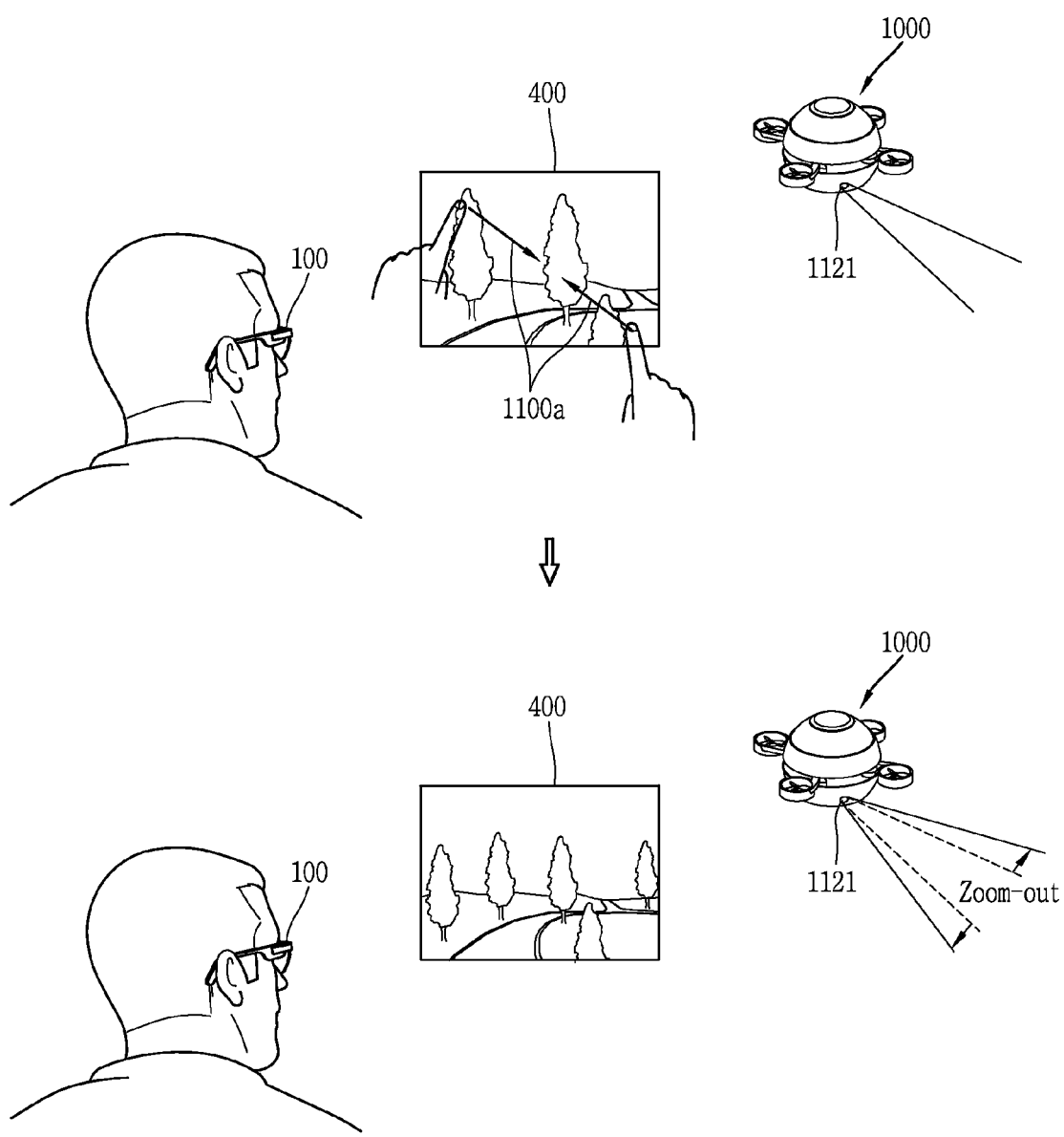
FIGS. 13A and 13B are conceptual views illustrating a method for controlling a camera provided in a drone using an image of visual information transmitted from the drone according to an embodiment of the present disclosure.
Figure 13B:
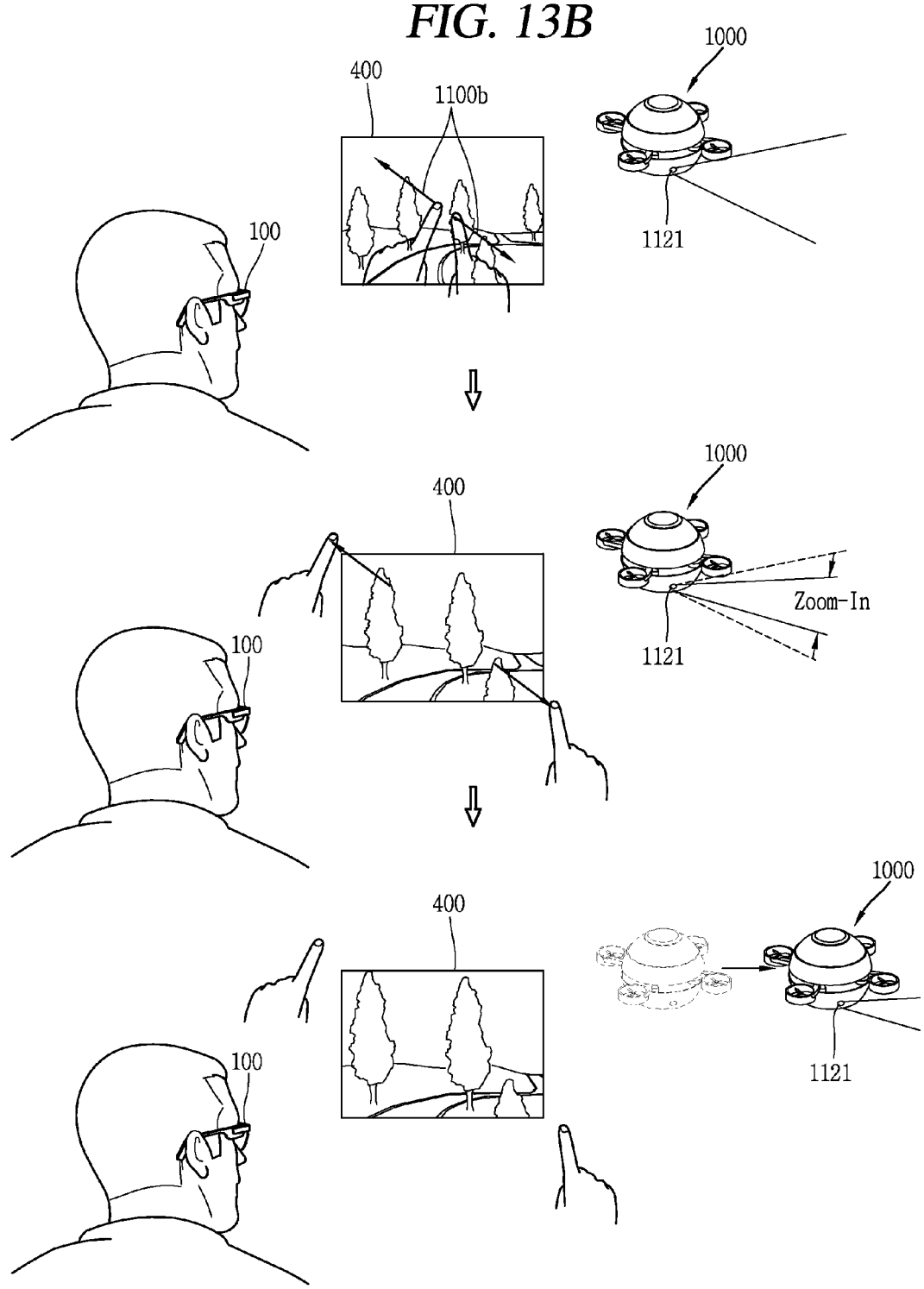
Figure 14A:
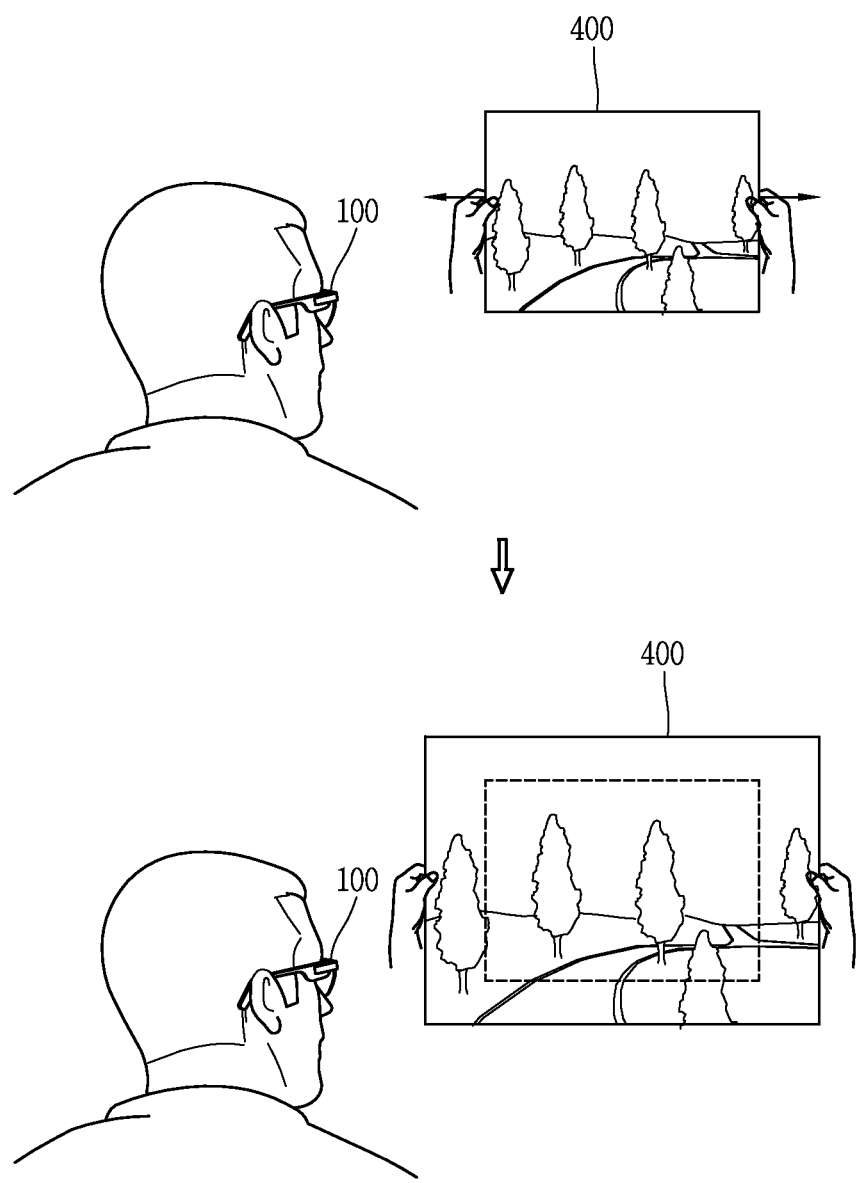
FIGS. 14A and 14B are conceptual views illustrating a method for changing a display size of an image of visual information transmitted from a drone according to an embodiment of the present disclosure.
Figure 14B:
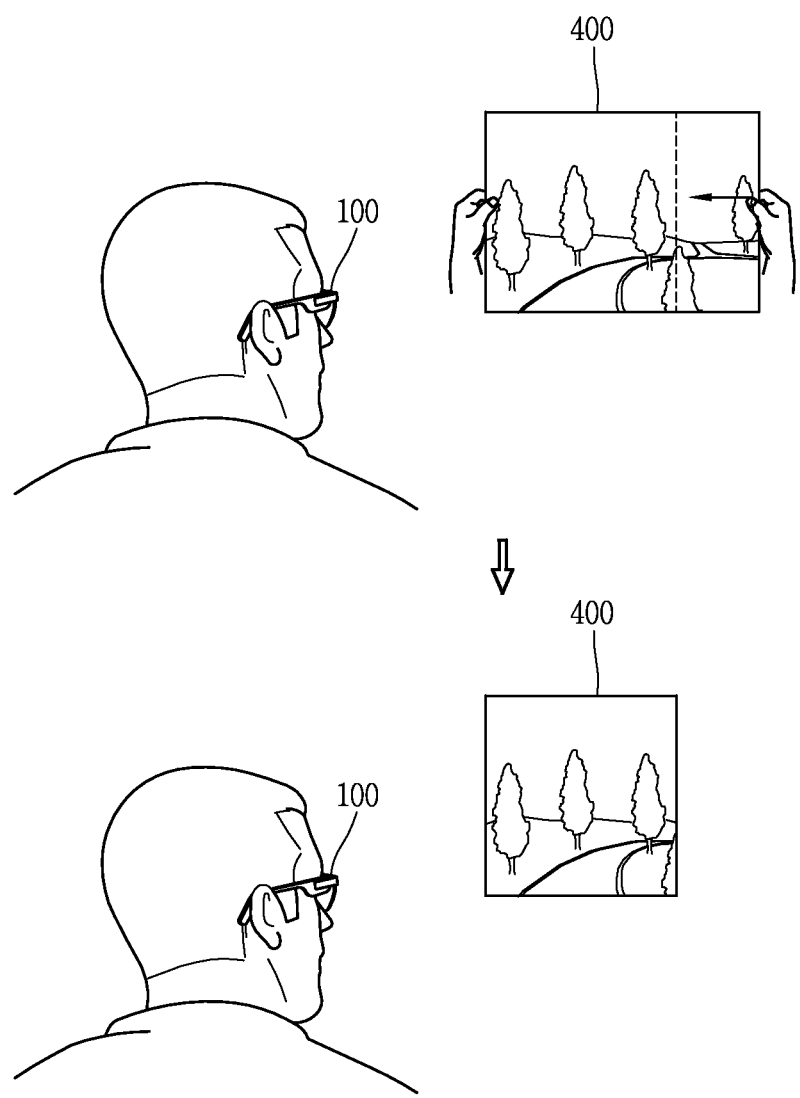

FIGS. 13A and 13B are conceptual views illustrating a method for controlling a camera provided in a drone using an image of visual information transmitted from the drone according to an embodiment of the present disclosure, and FIGS. 14A and 14B are conceptual views illustrating a method for changing a display size of an image of visual information transmitted from the drone according to an embodiment of the present disclosure.

The eyewear-type terminal 100 related to the present invention may transmit a control signal for controlling the camera 1121 provided in the drone 1000 on the basis of a preset type of gesture applied to the image 400 of visual information formed in a virtual region outside of the main body of the eyewear-type terminal 100.

Here, the preset type of gesture may be the second user gesture different from the first user gesture described above with reference to FIGS. 10A through 12. Here, the second user gesture may be at least one of a pinch-in gesture and a pinch-out gesture applied to the image 400.

The pinch-in gesture refers to a gesture of moving at least one of user's both hands (or two fingers) positioned in two different points in a direction toward each other.

The pinch-out gesture refers to a gesture of moving at least one of user's both hands (or two fingers) positioned in two different points in a direction away from each other.

When any one of the pinch-in gesture and the pinch-out gesture is applied, the control unit 180 may control the camera 1121 provided in the drone 1000 to perform any one of a zoom-out function and a zoom-in function.

For example, when a pinch-in gesture 1100a is applied to the image 400 as illustrated in a first drawing of FIG. 13A, the control unit 180 may control the camera 1121 provided in the drone 1000 (or the drone 1000) to perform a zoom-out function as illustrated in a second drawing of FIG. 13A.

When the camera 1121 provided in the drone performs the zoom-out function, a preview image received through the camera 1121 is changed. Thus, visual information corresponding to the preview image transmitted from the drone 1000 is also changed. Also, the image 400 of the visual information is changed according to the change in the visual information.

In another example, when a pinch-out gesture 1100b is applied to the image 400 as illustrated in a first drawing of FIG. 13B, the control unit 180 may control the camera 1121 provided in the drone 1000 to perform a zoom-in function (or control the drone 1000 to perform a zoom-in function) as illustrated in a second drawing of FIG. 13B.

Meanwhile, in a case in which the pinch-out gesture is applied to move out of the image 400 as illustrated in a second drawing of FIG. 13B, the control unit 180 may move the drone 1000 in a direction in which the front side of the drone 1000 on which the camera 1121 is provided is oriented as illustrated in a third drawing of FIG. 13B.

For example, after the user's both hands applying the pinch-out gesture are applied to two different points on the image 400, when at least one of the user's both hands moves in a direction away from each other and a gesture of moving out of the image 400 is subsequently applied, the control unit 180 may move the drone 1000 in a direction in which the front side of the drone 1000 on which the camera 1121 is provided is oriented. Here, the drone 1000 may move while the user's both hands are maintained in the region outside of the image 400 in continuation to the pinch-out gesture.

Meanwhile, when the pinch-in gesture or the pinch-out gesture is applied, the control unit 180 may move the drone 1000 on the basis of various conditions.

For example, in a state in which the camera 1121 of the drone 1000 is zoomed in to the maximum, when the pinch-out gesture is applied, even though the pinch-out gesture does not move out of the image, the control unit 180 may move the drone 1000 in a direction in which the front side of the drone 1000 on which the camera 1121 is provided is oriented.

In another example, in a state in which the camera 1121 of the drone 1000 is zoomed out to the maximum, when the pinch-in gesture is applied the control unit 180 may move the drone 1000 in a direction in which the rear side of the drone 1000 opposing the front side of the drone 1000 on which the camera 1121 is provided is oriented.

The second user gesture (for example, the pinch-in gesture or the pinch-out gesture) applied to the image 400 is released, the control unit 180 may control the drone 1000 to maintain flying at a point at which the drone 1000 is positioned at a point in time at which the second user gesture is released.

Here, when the user gesture is released, it may bean that the user's hand applying the user gesture has been moved out of a sensing region of the sensing unit 140 of the eyewear-type terminal 100. For example, in a case in which the user's hand present in a viewing angle of the camera of the eyewear-type terminal 100 to apply the user gesture moves out of the viewing angle of the camera, the control unit 180 may determine that the user gesture has been released.

Meanwhile, the pinch-in gesture and the pinch-out gesture may be formed in various manners. For example, the pinch-in gesture and the pinch-out gesture may include a gesture of maintaining user's both hands in two different points for more than a reference period of time and subsequently moving at least one of the both hands in a direction toward each other or in a direction away from each other. Also, the pinch-in gesture and the pinch-out gesture may include a gesture of grabbing the image 400 with both hands and subsequently moving at least one of the both hands in a direction toward each other or in a direction away from each other.

Through this configuration, in the present invention, the camera 1121 of the drone 1000 may be controlled using an image of visual information corresponding to a preview image received through the camera 1121 of the drone 1000.

Thus, the user may control the camera 1121 of the drone 1000, while viewing an image captured by the drone 1000 more conveniently by intuition.

Meanwhile, the eyewear-type terminal 100 related to the present invention may change a display size of the image 400 or change the image 400 on the basis of a preset type of gesture applied to the image 400 of the visual information transmitted from the drone 1000.

The preset type of gesture may be a gesture of moving at leas tone of both hands in continuation to the gesture of grabbing the image 400 with both hands. For example, as illustrated in FIG. 14A, when a gesture of moving both hands in a direction away from each other is applied in continuation to the gesture of grabbing the image 400 with both hands, the control unit 180 may magnify (increase) a display size of the image 400.

In another example, although not shown, when a gesture of moving both hands in a direction toward each other is applied in continuation to the gesture of grabbing the image 400 with both hands, the control unit 180 may reduce the display size of the image 400.

Meanwhile, on the basis of a gesture of moving any one of both hands applied in continuation to the gesture of grabbing the image 400 with both hands, the control unit 180 may change the image 400.

For example, as illustrated in FIG. 14B, in continuation to the gesture of grabbing the image 400 with both hands, when a gesture of moving the other hand in a direction toward the one hand is sensed in a state in which one of both hands is fixed, the control unit 180 may change the image 400 on the basis of the gesture of the other hand. Here, the change in the image 400 may be a function of cutting the image 400.

In another example, although not shown, in continuation to the gesture of grabbing the image 400 with both hands, when a gesture of moving the other hand in a direction away from one hand is sensed in a state in which one of both hands is fixed, the control unit 180 may zoom out the camera 1121 of the drone 1000 or may control the drone 1000 to be moved in a direction in which the rear side opposing the front side of the drone on which the camera 1121 is provided is oriented.

Hereinafter, a method of capturing visual information (or an mage of the visual information) using the image of the visual information transmitted from the drone according to an embodiment of the present invention will be described in detail with reference to the accompanying drawings.

Figure 15A:
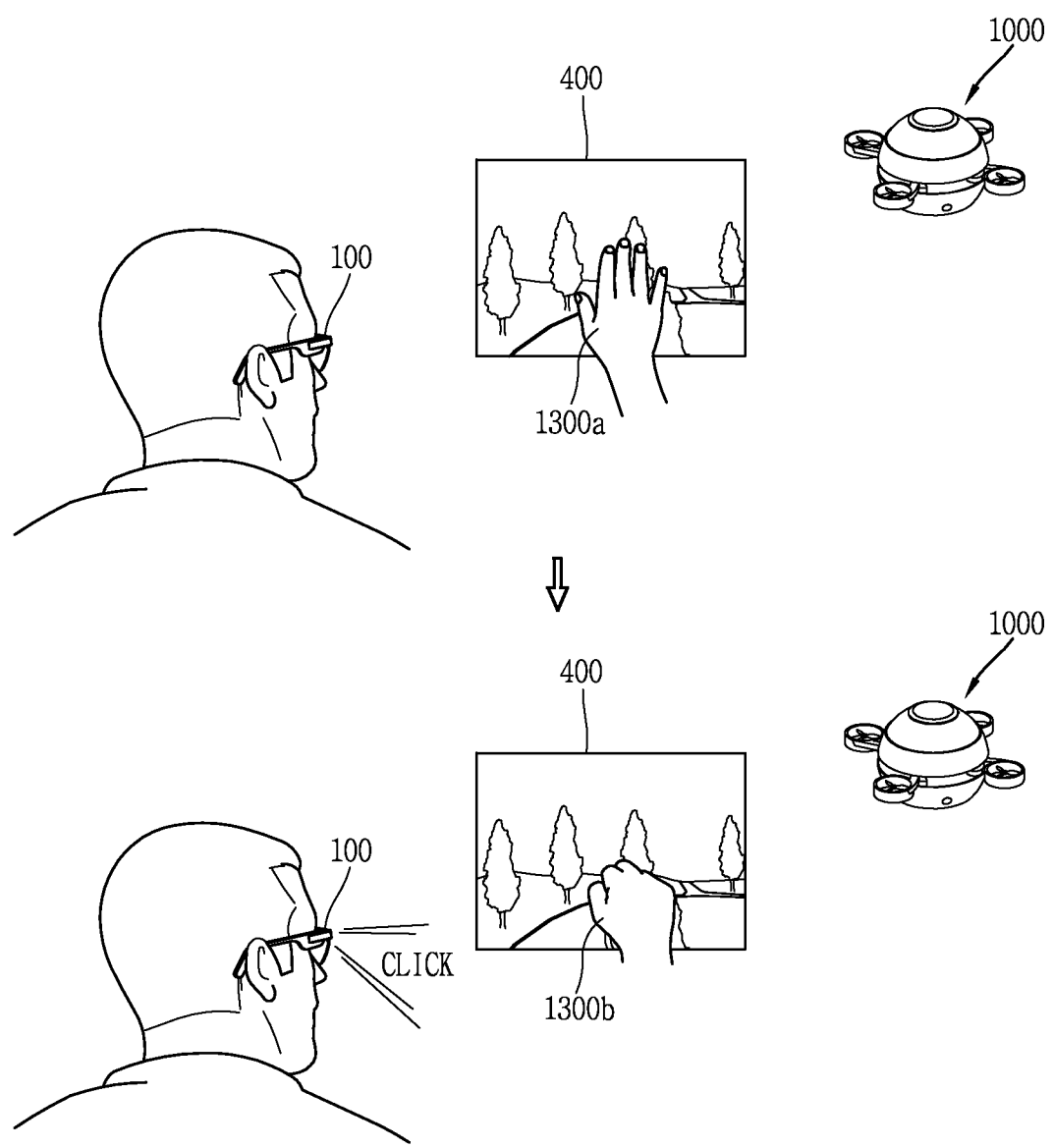
FIGS. 15A, 15B, and 15C are conceptual views illustrating a method for capturing visual information transmitted from a drone by using an image of the visual information according to an embodiment of the present disclosure.
Figure 15B:
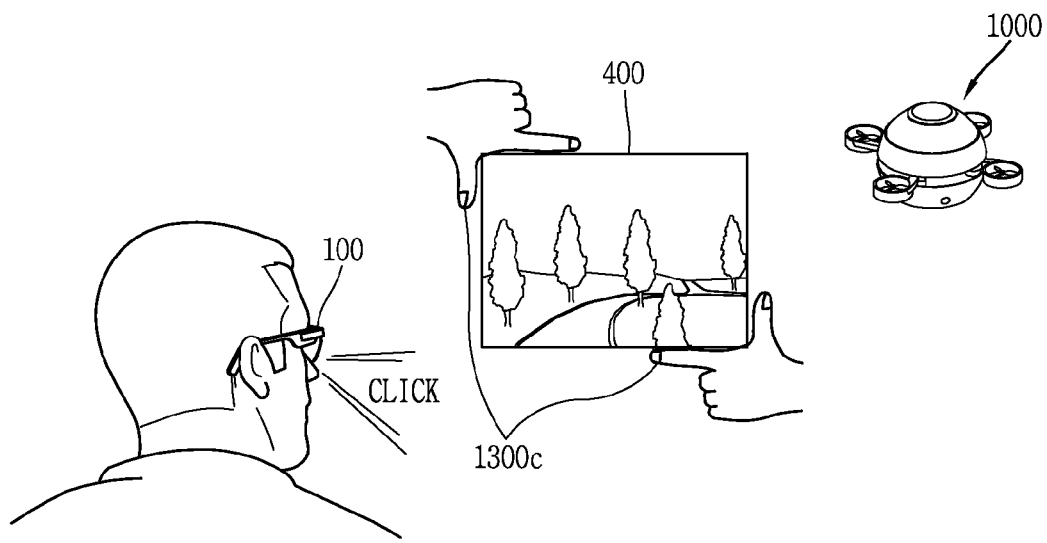
Figure 15C:
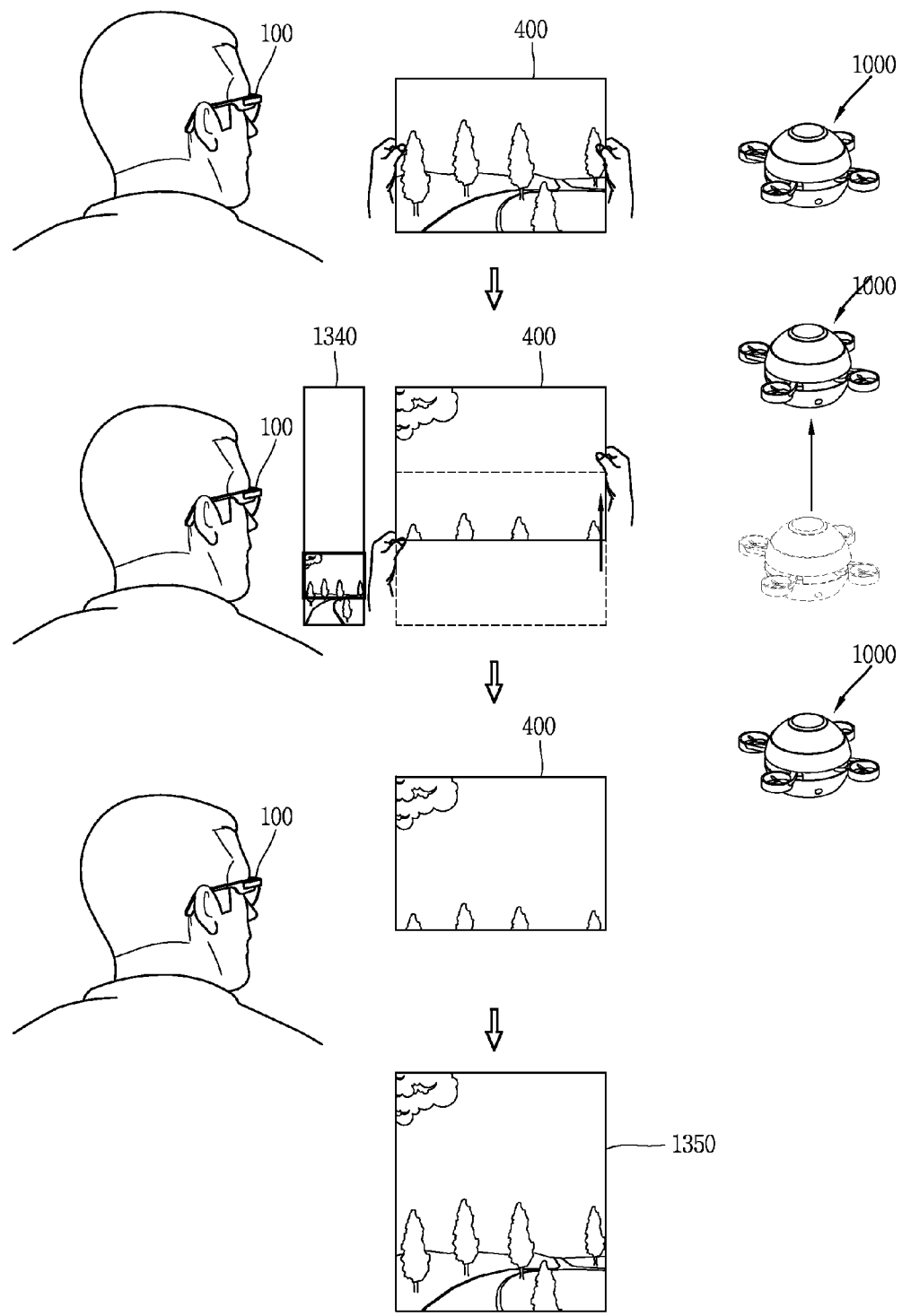

FIGS. 15A, 15B, and 15C are conceptual views illustrating a method for capturing visual information transmitted from a drone by using an image of the visual information according to an embodiment of the present disclosure.

The eyewear-type terminal 100 related to the present invention may perform a capturing function in various manners. The capturing function refers to a function of capturing a preview image received through the camera, as a still image or video. Hereinafter, a case in which the capturing function is a function of capturing the preview image as a still image will be described as an example.

The eyewear-type terminal 100 related to the present invention may capture the image 400 or the visual information on the basis of a preset type of gesture applied to the image 400 of the visual information. Here, the capturing of the image 400 may be the same as or similar to capturing the visual information 300 corresponding to a real image of the image 400. Hereinafter, for the purposes of description, it will be described that the image 400 is captured.

The preset type of gesture associated with the capturing function may be diverse.

For example, as illustrate in a first drawing of FIG. 15A, in a state in which the image 400 of the visual information (preview image received through the camera of the drone 1000) received from the drone 1000 is formed in a virtual region outside of the main body of the eyewear-type terminal 100, the control unit 180 may sense that the user's hand is opened 1300a on the image 400.

Thereafter as illustrated in a second drawing of FIG. 15A, when a gesture 1300b of closing the user's hand in the opened state is sensed, the control unit 180 may capture the image 400 of the visual information.

In another example, when a preset shape of a hand is sensed in the image 400 of the visual information, the control unit 180 may capture the image 400 of the visual information.

For example, the preset shape of hand may be a shape formed as the thumb and the index finger of any one hand of the user and the thumb and the index finger of the other hand are at a right angle in the image 400 or in the surrounding of the image 400. In addition, when various shapes of the hand are sensed, the control unit 180 may capture of the image 400 of the visual information. The captured image may be stored in the memory 170 of the eyewear-type terminal 100.

Meanwhile, the eyewear-type terminal 100 related to the present invention may perform panoramic photography on the basis of a user gesture associated with a panoramic photography function applied to the image 400 of the visual information.

The panoramic photography function refers to a function of capturing a preview image received by the camera and an image different to the preview image as a continuous single image (with elongated fields of view). In order to perform the panoramic photography, it is required for a terminal having a camera (for example, the eyewear-type terminal or the drone) to be moved or rotated in one direction.

The user gesture associated with the panoramic photography function may include various types of gestures. For example, as illustrated in first and second drawings of FIG. 15C, the user gesture associated with the panoramic photography function may be a gesture of moving any one of both hands in one direction in continuation to the gesture of graphing the image 400 with user's both hands.

As illustrated in the first drawing of FIG. 15C, after the gesture of grabbing the image 400 of visual information received from the drone 1000 with both hands is applied, when a gesture of moving any one hand (for example, the right hand), among the both hands, in one direction is applied in continuation to the gesture, the control unit 180 may execute the panoramic photography function. Also, on the basis of the gesture of moving any one of both hands in one direction in continuation to the gesture of grabbing the image 400 with both hands, the control unit 180 may move the drone 1000 in a direction corresponding to the one direction.

When the gesture of moving any one of both hands in one direction is applied in continuation to the gesture of graphing the image 400 with both hands, the control unit 180 may move the image 400 according to the gesture of moving the any one hand in one direction. Also, when the panoramic photography function is executed on the basis of the gesture, the control unit 180 may form an image 1340 guiding a panoramic photography state in a virtual region outside of the main body of the eyewear-type terminal 100.

While the gesture of moving any one of both hands in one direction is being applied in continuation to the gesture of grabbing the image 400 with both hands, the control unit 180 receives visual information transmitted from the drone 1000 while the drone 1000 is moving in a direction corresponding to the one direction. Thereafter, the control unit 180 continuously connects visual information items transmitted from the drone 1000 on the move to generate a single image.

Thereafter, when the gesture made with both hands is released, the control unit 180 may terminate the panoramic photography function. Also, when the gesture made with both hands is released, the control unit 180 may form the single image generated until the gesture made with both hands is released, as a panoramic capture image. The formed panoramic capture image may be an image illustrated in a fourth drawing of FIG. 15C, and may be stored in the memory 170 of the eyewear-type terminal 100.

Through such a configuration, in the present invention, the user interface for capturing a preview image received through the camera of the drone can be provided more conveniently.

Hereinafter, a method for controlling images of visual information corresponding to a preview image received through the camera 121 provided in the eyewear-type terminal 100 and a preview image received through the camera 1121 provided in the drone 1000, in the eyewear-type terminal related to the present invention will be described in detail with reference to the accompanying drawings.

FIGS. 16A, 16B, 16C and 16D are conceptual views illustrating a method for controlling an image of visual information transmitted from a drone and an image (virtual image) of a preview image received from a camera provided in a eyewear-type terminal.

Figure 17A:
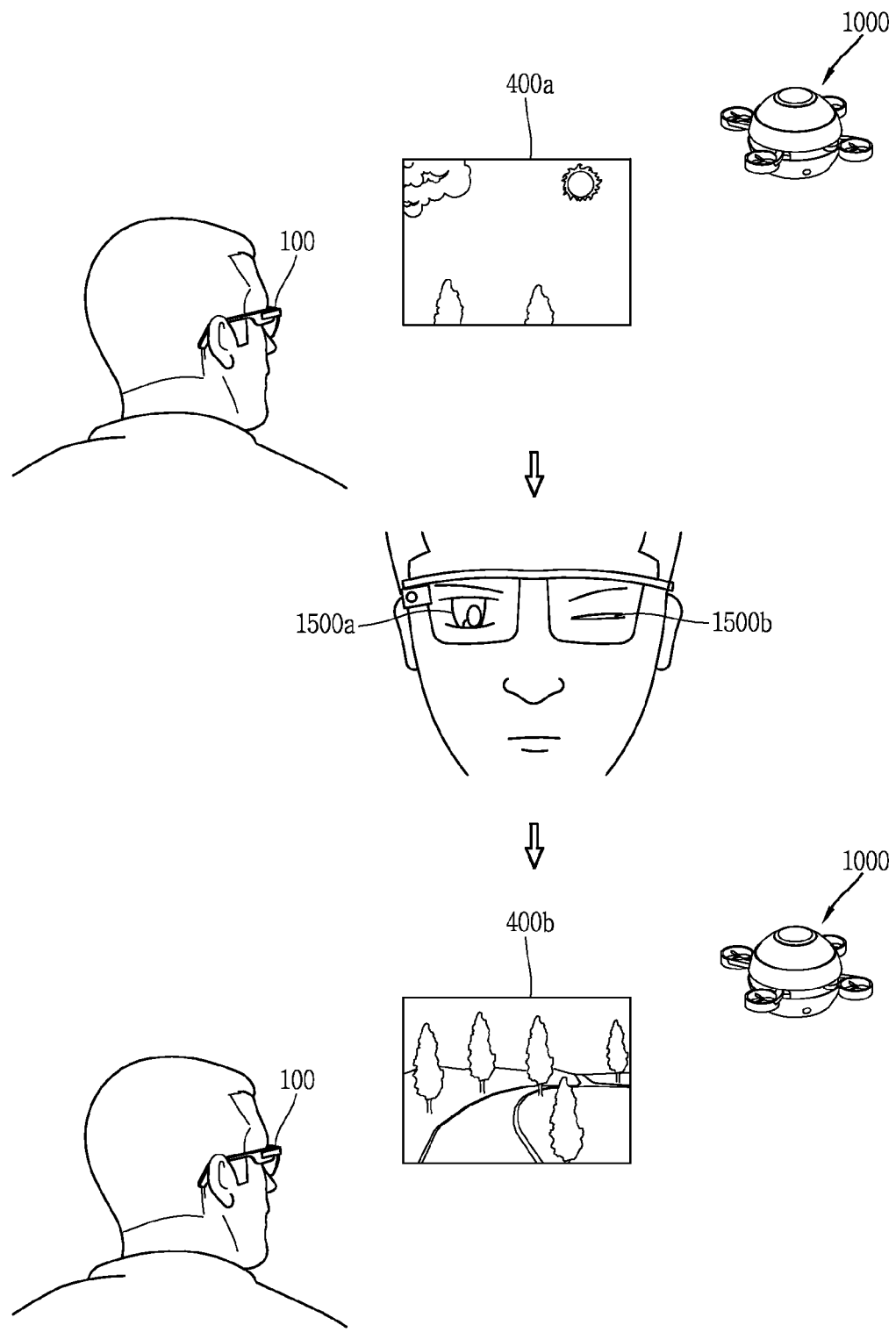
FIGS. 17A and 17B are conceptual views illustrating a method for controlling an image of visual information transmitted from a drone and an image (virtual image) of a preview image received from a camera provided in a eyewear-type terminal according to another embodiment of the present disclosure.
Figure 17B:
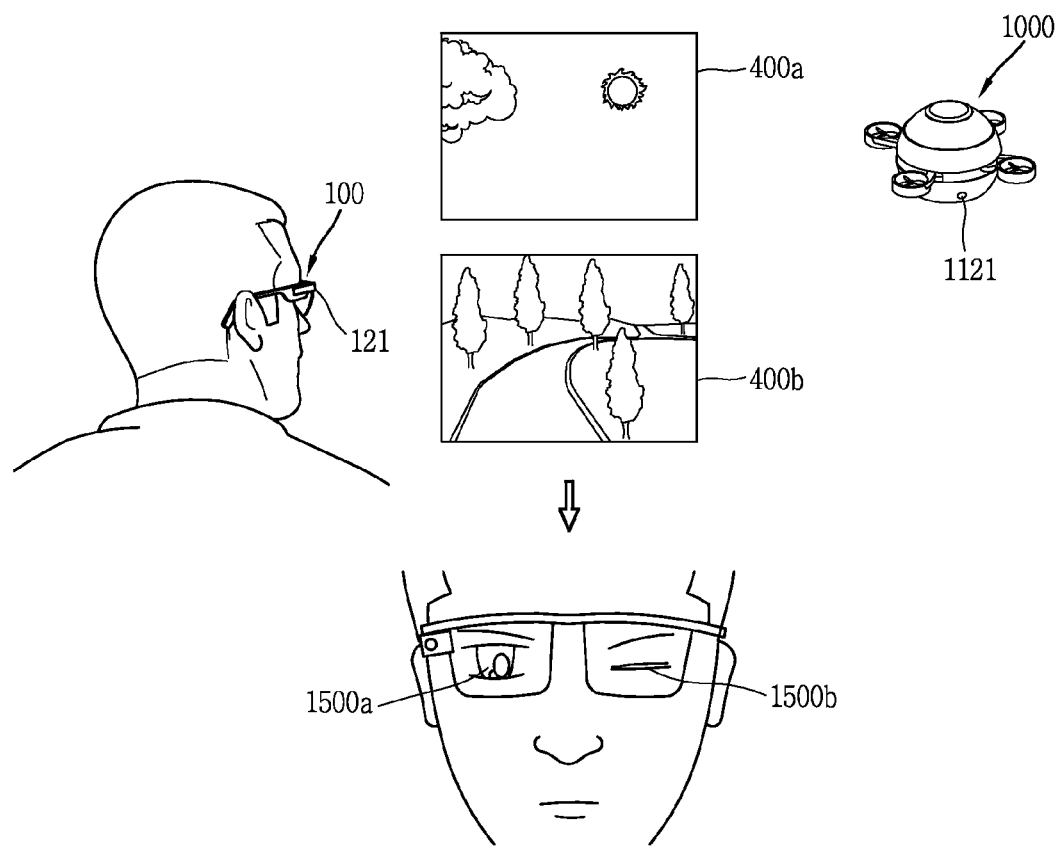

FIGS. 17A and 17B are conceptual views illustrating a method for controlling an image of visual information transmitted from a drone and an image (virtual image) of a preview image received from a camera provided in a eyewear-type terminal according to another embodiment of the present disclosure.

The control unit 180 may control the display unit 151 to output a preview image received through the camera 121 provided in the eyewear-type terminal 100. also, the control unit 180 may control the optical unit 130 to form the image (virtual image) of the preview image in a virtual region outside of the main body of the eyewear-type terminal.

Here, the control unit 180 may control the display unit 151 and the optical unit 130 to form an image of visual information received from the drone 1000 and the image (virtual image) of the preview image together in a virtual region outside of the main body of the eyewear-type terminal.

Figure 16A:
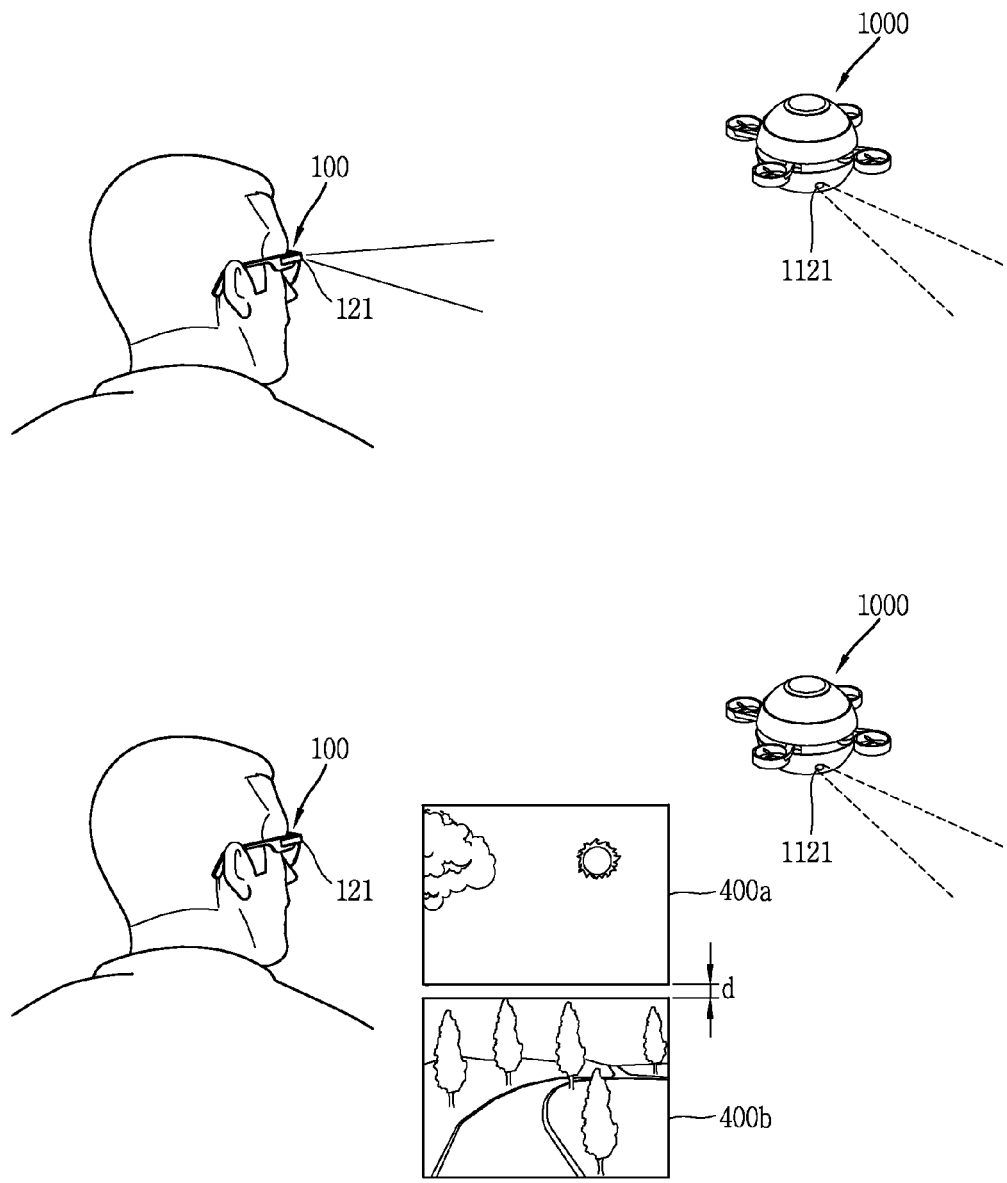
FIGS. 16A, 16B, 16C and 16D are conceptual views illustrating a method for controlling an image of visual information transmitted from a drone and an image (virtual image) of a preview image received from a camera provided in a eyewear-type terminal.
Figure 16B:
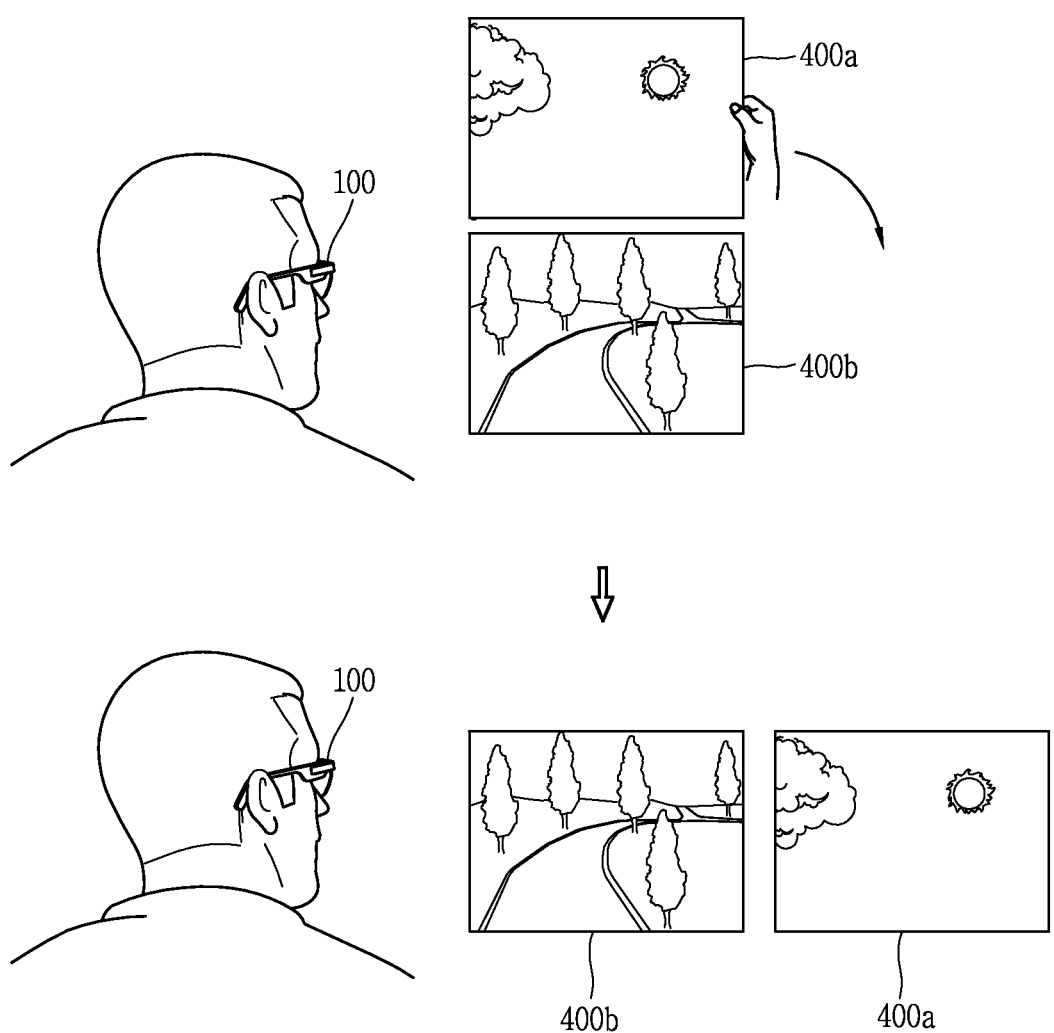

For example, as illustrated in FIG. 16A, when the visual information corresponding to the preview image received through the camera 1121 provided in the drone 1000 is received from the drone 1000, the control unit 180 may form an image 400a of the visual information in a virtual region outside of the main body of the eyewear-type terminal 100.

Also, as illustrated in FIG. 16A, when the camera 121 provided in the eyewear-type terminal 100 is activated on the basis of a user request, the control unit 180 may receive a preview image through the camera 121 and form an image 400b of the received preview image in a virtual region outside of the main body of the eyewear-type terminal 100.

Here, the image 400a of the visual information and the image 400b of the preview image may be formed together in the virtual region outside of the main body of the eyewear-type terminal 100, and may be formed on the basis of a user request.

The image 400a of the visual information and the image 400b of the preview image may be formed to be spaced apart from each other by a preset distance d.

That is, the image 400a of the visual information may correspond to an image received through the camera 1121 of the drone 1000, and the image 400b of the preview image may correspond to an image received through the camera 121 of the eyewear-type terminal 100.

When a preset type of gesture is applied to the images 400a and 400b, the control unit 180 may change a display position of at least one of the images or may move at least one of the images. In detail, on the basis of a preset type of gesture applied to at least one of the image 400a of the visual information and the image 400b of the preview image, the control unit 180 may move at least one of the images.

For example, the preset type of gesture may be a gesture applied in continuation to the gesture of grabbing at least one of the images. As illustrated in a first drawing of FIG. 16B, when a gesture of moving the image 400a of the visual information, among the image 400a of the visual information and the image 400b of the preview image, in one direction is applied in continuation to the gesture of grabbing the image 400a of visual information, the control unit 180 may move the image 400a of the visual information in the one direction. When the preset type of gesture applied to the image 400a of the visual information is released, the control unit 180 may position (display or form) the image 400a of the visual information in a point corresponding to a point from which the preset type of gesture was released as illustrated in a second drawing of FIG. 16B.

Here, when the image 400a of the visual information and the image 400b of the preview image come into contact according to the movement, the control unit 180 may capture the image 400a of the visual information and the image 400b of the preview image.

Here, when the image 400a of the visual information and the image 400b of the preview image come into contact according to the movement, the control unit 180 may capture the image 400a of the visual information and the image 400b of the preview image in contact with each other, as a single image.

Figure 16C:
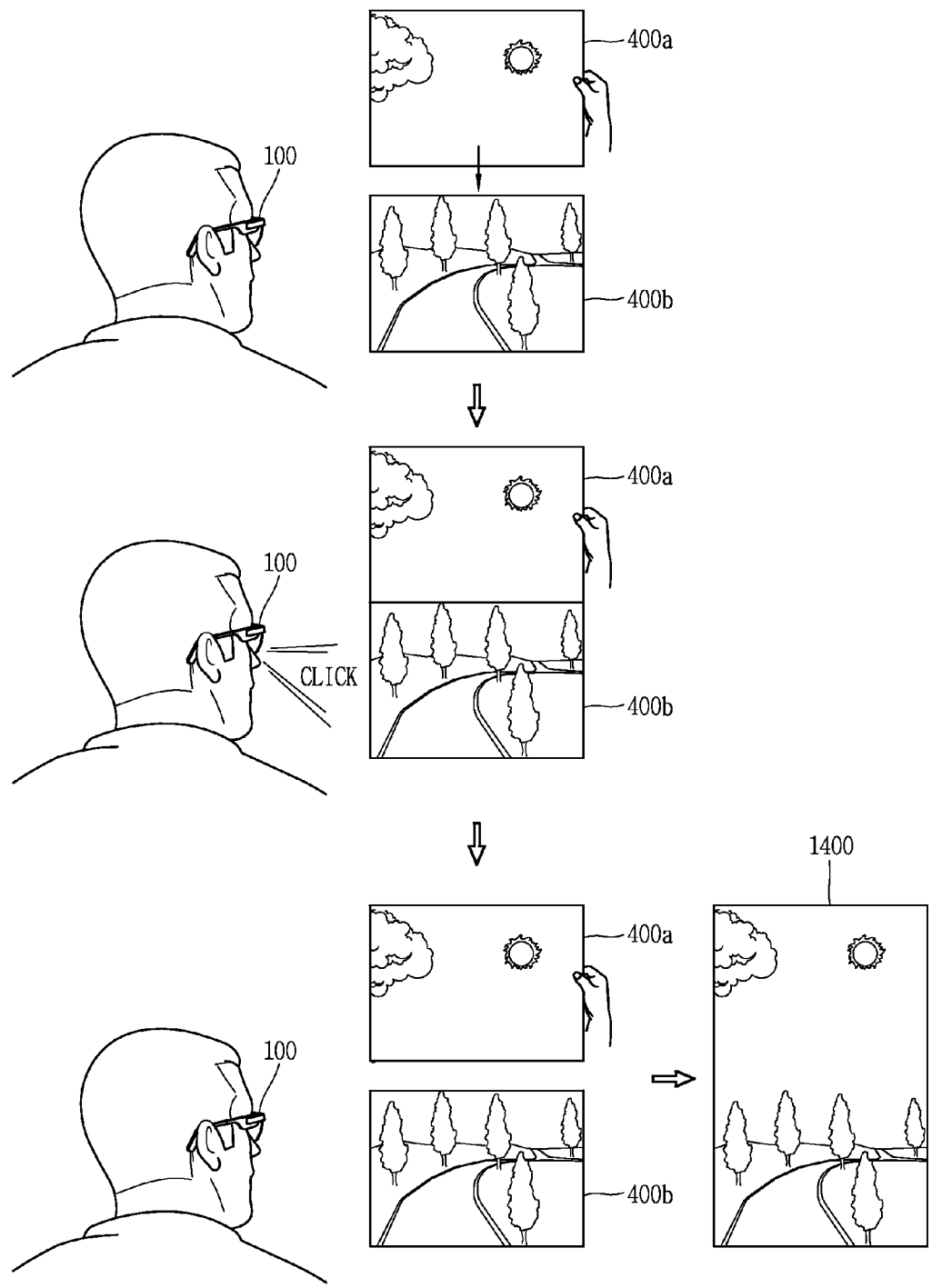

For example, as illustrated in a first drawing of FIG. 16C, in a state in which the image 400a of the visual information and the image 400b of the preview image are formed together, when a preset type of gesture (for example, a gesture of moving the image 400a of the visual information in one direction in continuation to the gesture of grabbing the image 400a of the visual information) is applied to the image 400a of the visual information, the control unit 180 may move the image 400a of the visual information.

Thereafter, as illustrated in a second drawing of FIG. 16C, when the image 400a of the visual information and the image 400b of the preview image come into contact with each other according to the movement, the control unit 180 may capture the image 400a of the visual information and the image 400b of the preview image, as a single image 1400 as illustrated in a fourth drawing of FIG. 16C.

After the capturing is performed, when the preset type of gesture is released, the control unit 180 may restore the image (for example, the image 400a of the visual information) which has been moved by the preset type of gesture to a point at which the image 400a of the visual information was positioned before the preset type of gesture was applied, as illustrated in the third drawing of FIG. 16C.

Meanwhile, when the image 400a of the visual information and the image 400b of the preview image are in contact with each other, the control unit 180 may capture at least one of the image 400*a* of the visual information and the image 400*b* of the preview image.

Meanwhile, even through the image 400*a* of the visual information and the image 400*b* of the preview image are in contact with each other by the preset type of gesture, the control unit 180 may provide control to perform capturing when a preset condition is satisfied.

The preset condition for performing capturing may be, for example, a condition in which continuity (or a conformity degree) of a portion 1410 where the image 400*a* of the visual information and the image 400*b* of the preview image are in contact with each other is equal to or greater than a preset threshold value.

Figure 16D:
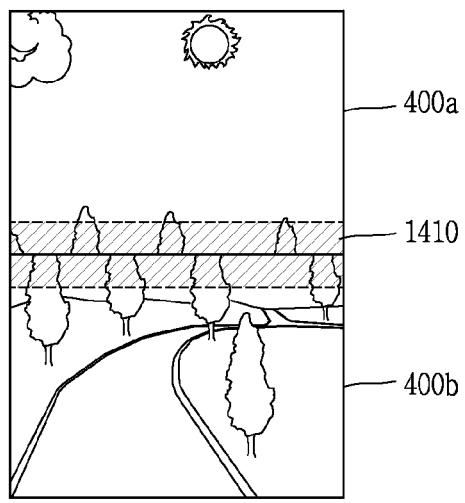
Figure 16D:
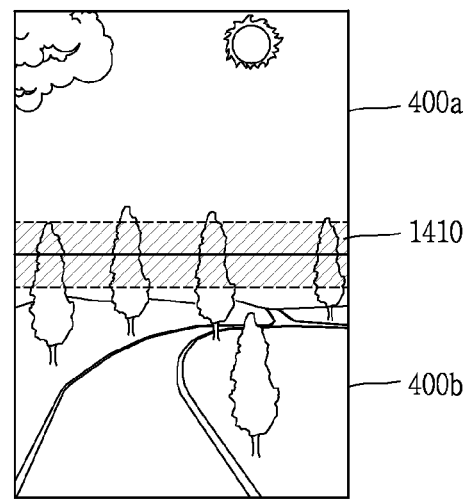

For example, as illustrated in a first drawing of FIG. 16D, when the portion 1410 in which the image 400*a* of the visual information and the image 400*b* of the preview image are in contact with each other is not of continuity (or the continuity of the portion 1410 is lower than the preset threshold value), the control unit 180 may not perform capturing even though the image 400*a* of the visual information and the image 400*b* of the preview image are in contact with each other.

Here, the control unit 180 may output notification information indicating that the contact portion 1410 is not of continuity, for example. In another example, the control unit 180 may control at least any one of drone 1000 transmitting the visual information, the camera 1121 of the drone 1000, and the camera 121 of the eyewear-type terminal 100 receiving the preview image to change at least one of the visual information and the preview image such that the continuity of the contact portion 1410 is equal to or greater than the preset threshold value.

As illustrated in a second drawing of FIG. 16D, in a case in which the image 400*a* of the visual information and the image 400*b* of the preview image (or in a case in which continuity of the portion 1410 is equal to or greater than the preset threshold value), the control unit 180 may capture the image 400*a* of the visual information and the image 400*b* of the preview image, as a single image 1400, on the basis of the contact between the image 400*a* of the visual information and the image 400*b* of the preview image.

Similarly, when continuity of the portion in which the image 400*a* of the visual information and the image 400*b* of the preview image are in contact with each other is equal to or greater than the preset threshold value, the control unit 180 may capture at least one of the image 400*a* of the visual information and the image 400*b* of the preview image, separately.

Through this configuration, an exemplary embodiment of the present disclosure may provide a UI/UX capable of performing capturing in various manners by using the preview image received through the camera 121 of the eyewear-type terminal 100, as well as capturing an image of visual information received from the drone 1000.

Meanwhile, even though the camera 121 of the eyewear-type terminal 100 is activated, a preview image is received through the camera 121, and visual information corresponding to the preview image received through the camera 1121 of the drone 1000 is transmitted from the drone 1000, the eyewear-type terminal 100 related to the present disclosure may form only an image corresponding to any one of the visual information and the preview image.

As illustrated in a first drawing of FIG. 17A, even when the camera 121 of the eyewear-type terminal 100 is in an activated state, the control unit 180 may form only the image 400*a* of visual information received from the drone 1000, in a virtual region outside of the main body of the eyewear-type terminal 100.

Thereafter, the control unit 180 may switch the image 400*a* of the visual information to the image 400*b* of the preview image received through the camera 121 of the eyewear-type terminal 100 in various manners.

For example, as illustrated in a second drawing of FIG. 17A, the sensing unit 140 may sense that user who wears the eyewear-type terminal 100 blinks his or her eye. As illustrated in a third drawing of FIG. 17A, the control unit 180 may switch the image 400*a* of the visual information into an image 400*b* of the preview image on the basis of the user's blinking.

Here, when user blinks his or her eye, it may mean that the user opens, closes, and subsequently opens again the eye.

In detail, when the user blinks any one of the left eye and the right eye, the control unit 180 may switch the image 400*a* of the visual information into the image 400*b* of the preview image, or may switch the image 400*b* of the preview image into the image 400*a* of the visual information. Also, when the user blinks any one of the left eye and the right eye, the control unit 180 may perform control to form the image 400*a* of the visual information and the image (virtual image) of the preview image 400*b* together in a virtual region outside of the main body of the eyewear-type terminal 100.

However, switching of the image 400*a* of the visual information and the image 400*b* of the preview image may be performed on the basis of various schemes, rather than being limited to the case in which user blinks his or her eye. For example, when a drag gesture, a flick gesture, or a swipe gesture is applied to the image 400*a* of the visual information, the control unit 180 may switch the image 400*a* of the visual information into the image 400*b* of the preview image. Switching from the image 400*b* of the preview image to the image 400*a* of the visual information may also be performed in the same manner.

The drag gesture may be a gesture, starting from a first point of an image formed in a virtual region, continuously moves in one direction and is released from a second point different from the first point.

The flick gesture may be a drag gesture made within a preset period of time. That is, the flick gesture may be a drag gesture applied at a speed equal to or greater than a preset speed.

The swipe gesture may be a drag gesture applied in a horizontal direction or in a vertical direction.

Meanwhile, on the basis of user's blinking, the control unit 180 may capture at least one of the image 400*a* of the visual information and the image 400*b* of the preview image.

For example, referring to FIG. 17B, when the user's left eye 1500*b* blinks, the control unit 180 may capture the image 400*a* of the visual information, and when the user's right eye 1500*b* blinks, the control unit 180 may capture the image 400*b* of the preview image.

Also, when the user blinks both eyes, the control unit 180 may capture the image 400*a* of the visual information and the image 400*b* of the preview image together.

Meanwhile, the eyewear-type terminal 100 may output a captured image in various manners. Hereinafter, a method for outputting a captured image will be described with reference to the accompanying drawings.

Figure 18:
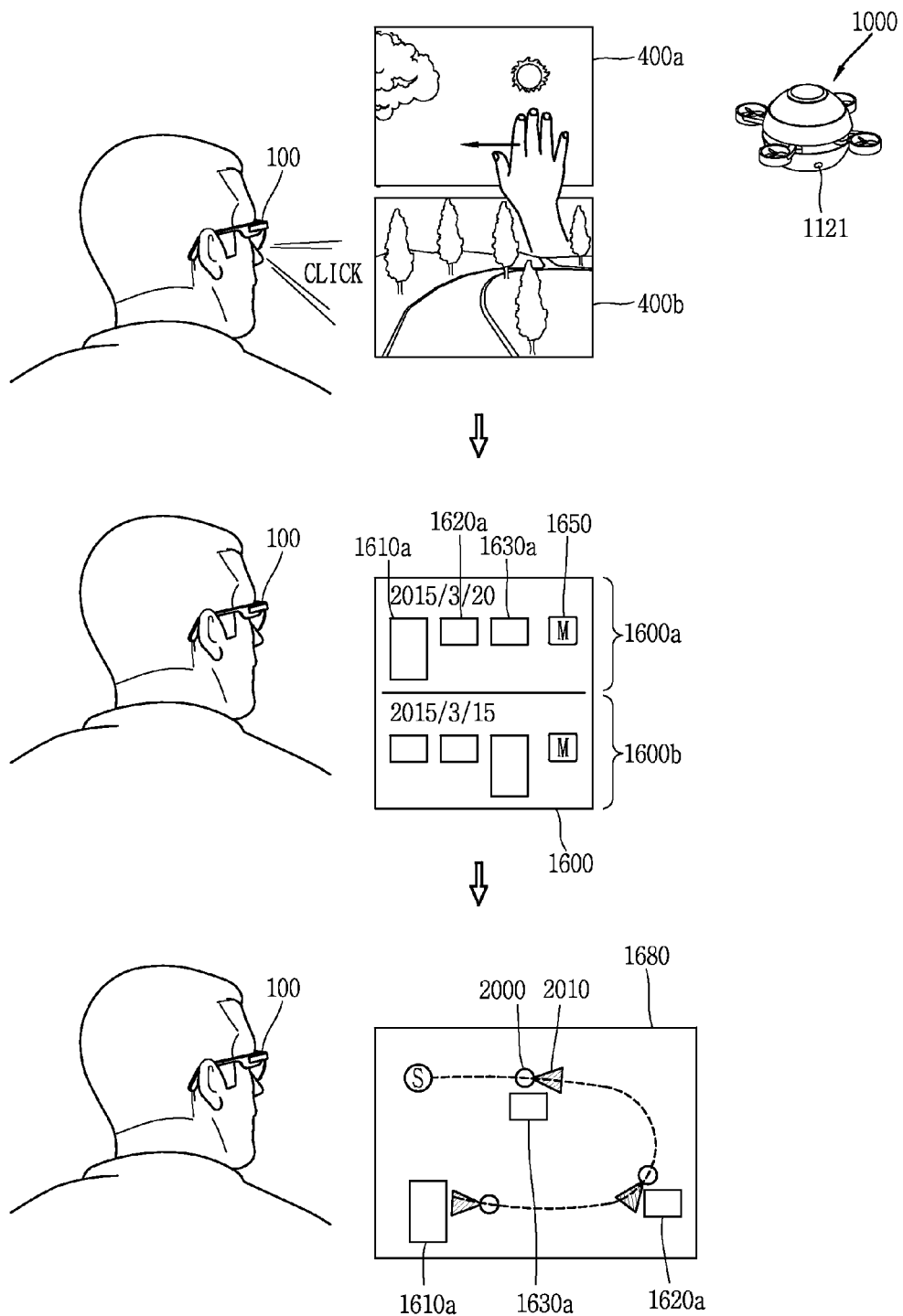
FIG. 18 is a conceptual view illustrating a method for checking a captured image according to an embodiment of the present disclosure.

FIG. 18 is a conceptual view illustrating a method for checking a captured image according to an embodiment of the present disclosure.

When a preset type of gesture is applied to an image formed in a virtual region outside of the main body of the eyewear-type terminal 100, the eyewear-type terminal 100 related to the present disclosure may form an image of screen information allowing for checking a captured image, in the virtual region.

The preset type of gesture may be at least one of a drag gesture, a flick gesture, and a swipe gesture applied to at least one of the image 400a of the visual information and the image 400b of the preview image.

For example, when a flick gesture is applied to both the image 400a of the visual information and the image 400b of the preview image, in a virtual region outside of the main body of the eyewear-type terminal 100 as illustrated in a first drawing of FIG. 18, the control unit 180 may switch the image 400a of the visual information and the image 400b of the preview image to an image (virtual image) 1600 of screen information allowing for checking a captured image as illustrated in a second drawing of FIG. 18.

The image (virtual image) 1600 of the screen information allowing for checking the captured image may include a captured image (or a thumbnail of the captured image), captured weather information, and whether the captured image is a captured image of an image of visual information transmitted from the drone 1000 or whether the captured image is a captured image (virtual image) of a preview image received through the camera 121 of the eyewear-type terminal 100. Also, the image 1600 of the screen information may include captured images classified according to dates, each time of flying of the drone 1000, images of visual information, images of preview images.

The second drawing of FIG. 18 illustrates the image (virtual image) 1600 of screen information in which captured images of virtual images of the visual information transmitted from the drone 1000 whenever the drone 1000 flies are classified. Each of the captured images may include location information of the drone 1000 when captured, information regarding a direction in which the camera of the drone 1000 faces when captured, and the like.

Meanwhile, the image (virtual image) 1600 of the screen information may further include an image 1650 of an icon associated with a function of outputting an image of map information.

When a touch gesture applied to the image 1650 of the icon is sensed, the control unit 180 may switch the image 1600 of the screen information into the image 1680 of map information.

As illustrated in a third drawing of FIG. 18, the image 1680 of the map information may include map information previously stored in the memory 170 or map information received from an external device (or an external server), a drone icon 2000, an indicator 2010 guiding a direction in which the camera of the drone is oriented when captured, and captured images 1610a, 1620a, and 1630a.

The drone icon 2000, the indicator 2010 guiding a direction in which the camera of the drone is oriented when a corresponding image is captured, and the captured images may be associated with each other. On the basis of the location information of the drone 1000 when captured and the information regarding the direction in which the camera of the drone 1000 is oriented when captured, included in each of the captured images, the control unit 180 may display the drone icon 2000, the indicator 2010 guiding a direction in which the camera of the drone is oriented, and at least one of the captured images, in the image 1680 of the map information.

Also, the control unit 180 may further display information regarding a point from which the drone starts to fly, a flying path of the drone 1000, and the like, in the image 1680 of the map information.

Through this configuration, the present disclosure may provide the eyewear-type terminal capable of checking a captured image conveniently and by intuition.

Meanwhile, the eyewear-type terminal 100 related to the present disclosure may control the drone 1000 through various methods as well as the method of using an image formed in a virtual region outside of the man body of the eyewear-type terminal 100.

Hereinafter, a method for controlling a drone by using the eyewear-type terminal 100 will be described in detail with reference to the accompanying drawings.

FIGS. 19A, 19B, 19C, and 19D are conceptual views illustrating a method for controlling a drone by using a eyewear-type terminal according to an embodiment of the present disclosure.

The eyewear-type terminal 100 related to the present disclosure may control the drone 1000 on the basis of at least one of the user input unit 123 and a movement of the eyewear-type terminal 100.

The sensing unit 140 may sense a movement of the eyewear-type terminal 100. Sensing of movement of the eyewear-type terminal 100 may be understood as sensing a movement of a user's head that wears the eyewear-type terminal 100.

Figure 19A:
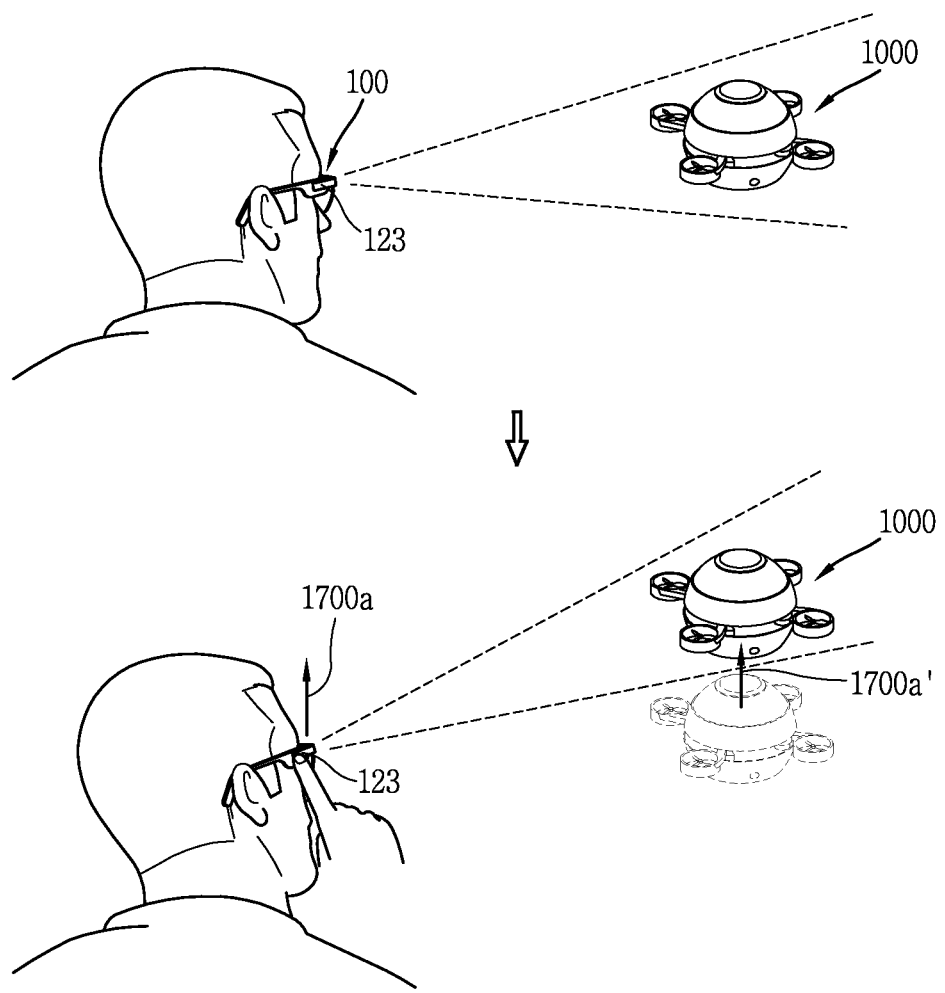
FIGS. 19A, 19B, 19C, and 19D are conceptual views illustrating a method for controlling a drone by using a eyewear-type terminal according to an embodiment of the present disclosure.

For example, as illustrated in FIG. 19A, in a state in which the camera 121 is disposed to face the drone 1000, when a touch is applied to the user input unit 123, the control unit 180 may transmit a control signal to the drone 1000.

The control signal may include a signal for connecting the eyewear-type terminal 100 and the drone 1000 and a signal for controlling a movement of the drone 1000 and controlling the camera 1121 provided in the drone 1000.

A state in which the camera 121 is disposed to face the drone 1000 may refer to a state in which a preview image received through the camera 121 includes an image corresponding to the drone 1000.

In a state in which the camera 121 is disposed to face the drone 1000 and a touch is applied to the user input unit 123, when it is sensed that the eyewear-type terminal 100 moves, the control unit 180 may control the drone 1000 to be moved to correspond to the movement of the eyewear-type terminal 100.

For example, as illustrated in FIG. 19A, in a state in which a touch is applied to the user input unit 123, when the eyewear-type terminal 100 is moved in one direction 1700a, the drone 1000 may be moved in a direction 1700a' corresponding to the one direction 1700a.

Meanwhile, the control unit 180 may control the drone 1000 to be moved differently according to types of touches applied too the user input unit 123.

Figure 19B:
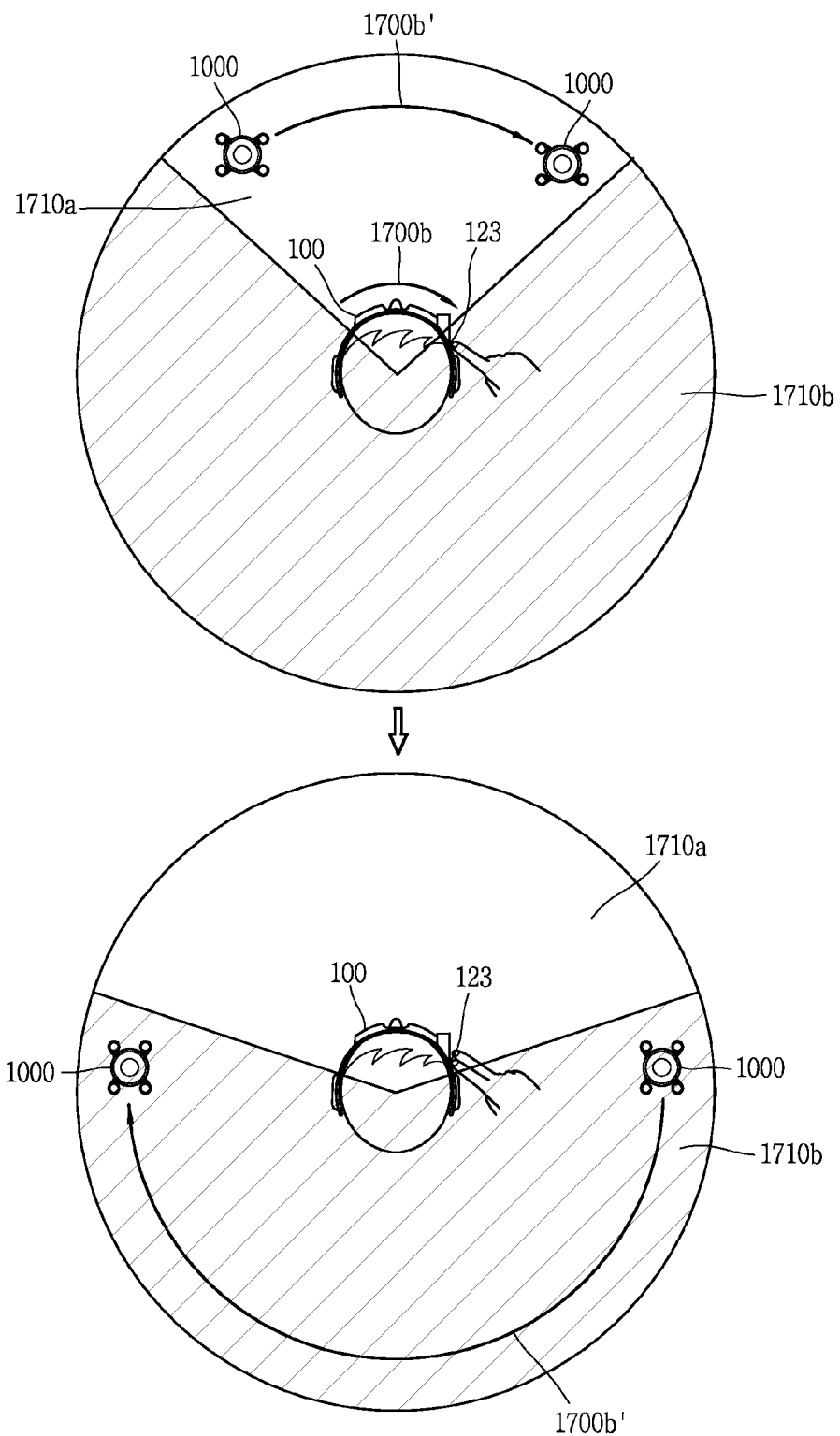

For example, as illustrated in a first drawing of FIG. 19B, in a state in which the camera 121 of the eyewear-type terminal 100 is disposed to face the drone 1000, when the eyewear-type terminal 100 is moved (1700b) while a first type of touch (for example, a touch applied to a point) applied to the user input unit 123 is maintained, the drone 1000 may be moved (1700b') to correspond to the movement 1700b of the eyewear-type terminal 100.

Here, in a state in which the first type of touch is maintained, when a second type of touch (for example, touches applied to at least two points) different from the first type of touch is applied, even though the eyewear-type terminal 100 is not moved, the control unit 180 may control the drone 1000 to be moved (1700*b*') to correspond to the movement 1700*b* of the eyewear-type terminal 100 sensed in a state in which the first type of touch is maintained as illustrated in a second drawing of FIG. 19B.

In detail, a range in which the user's head wearing the eyewear-type terminal 100 is movable may be divided into a first range 1710*a* and a second range 1710*b* different from the first range 1710*a* in a state in which the user does not move his or her body. The first range 1710*a* is a range in which the eyewear-type terminal 100 may be oriented, that is, a range (visual field) that can be included in a preview image received through the camera 121 of the eyewear-type terminal 100, and the second range 1710*b* may be a range in which the eyewear-type terminal 100 may not be oriented.

That is, in the first range 1710*a*, the drone 1000 may be moved to correspond to a movement of the eyewear-type terminal 100 in a state in which a first type of touch applied to the user input unit 123 of the eyewear-type terminal 100 is maintained.

When the drone 1000 being moved enters the second range 1710*b*, beyond the first range 1710*a* (namely, when the drone 1000 moves out of the range in which the camera 121 of the eyewear-type terminal 100 is oriented), the control unit 180 may control the drone 1000 to be continuously moved to correspond to the movement of the eyewear-type terminal 100 in a state in which the first type of touch is maintained on the basis of the second type of touch different from the first type of touch is applied to the user input unit 123.

Meanwhile, in a state in which the camera 121 of the eyewear-type terminal 100 faces the drone 1000 and in a state in which a second type of touch, rather than a first type of touch, is maintained, when a movement of the eyewear-type terminal 100 is sensed, the drone 1000 may be controlled to be moved in a different manner. For example, in a state in which the camera 121 of the eyewear-type terminal 100 faces the drone 1000, when the eyewear-type terminal 100 is moved at a first speed in one direction in a state in which touches applied to at least two points of the user input unit 123 are maintained, the drone 1000 may be controlled to be moved at a second speed, which is n times the first speed, in a direction corresponding to the one direction. The n-fold speed may be determined on the basis of the number of touch points maintained on the user input unit 123.

Meanwhile, the control unit 180 may control the drone 1000 on the basis of various types of touches applied to the user input unit 123.

Figure 19C:
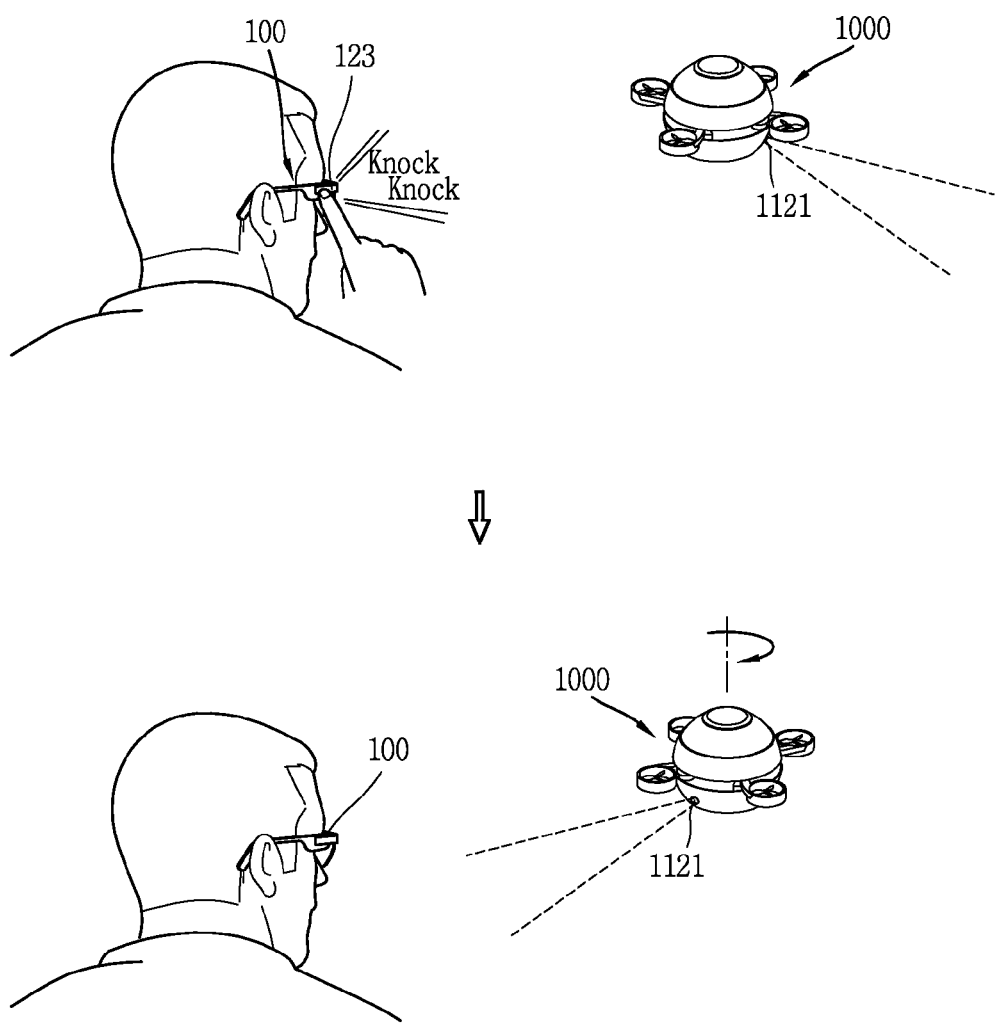

For example, in a state in which the drone 1000 flies with the camera 1121 provided therein oriented in one direction, when a preset type of touches (for example, double touches (two touches) applied within a reference time) is applied to the user input unit 123 of the eyewear-type terminal 100 as illustrated in the first drawing of FIG. 19C, the control unit 180 may rotate the drone 1000 to be oriented in a direction different from the one direction as illustrated in the second drawing of FIG. 19C. Here, the different direction may be a direction opposite to the one direction, for example.

In another example, on the basis of a drag touch applied to the user input unit of the eyewear-type terminal 100, the control unit 180 may move the drone 1000.

Figure 19D:
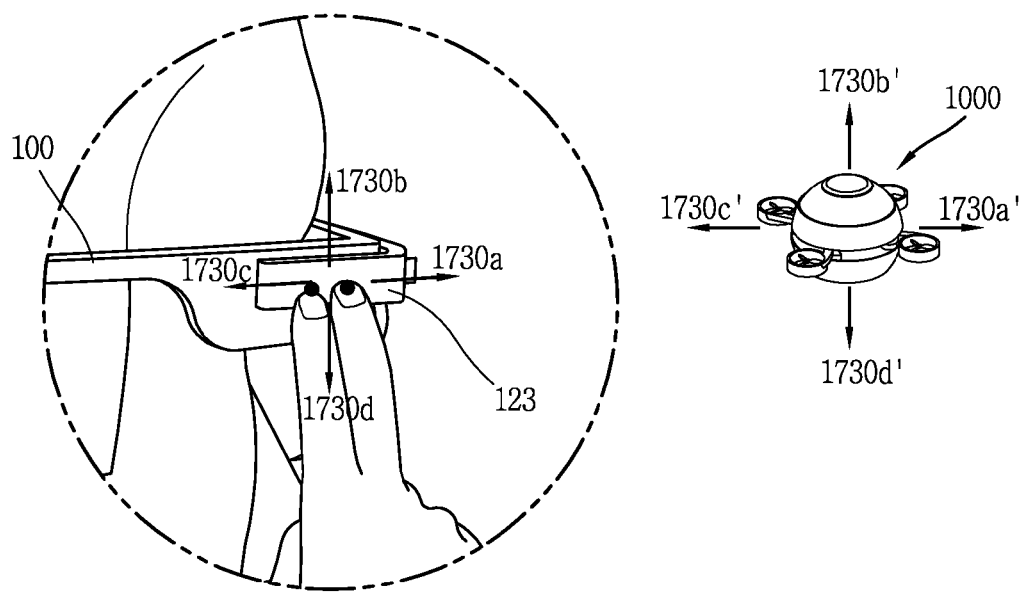

For example, as illustrated in FIG. 19D, when a drag touch is applied to the user input unit 123 in one direction, the control unit 180 may move the drone 1000 in a direction corresponding to the one direction.

When a drag touch applied in a direction 1730*a* toward a front side of the user (that is, to the front side of the eyewear-type terminal 100) in continuation to the touch applied to one point of the user input unit 123, the control unit 180 may move the drone 1000 in a direction toward the front side 1730*a*' of the drone 1000 in which the camera 1121 is provided. In a case in which the drag touch is applied in an upward direction 1730*b*, in a backward direction 1730*c*, and in a downward direction 1730*d*, the drone 1000 may be moved in an upward direction 1730*b*, in a backward direction 1730*c*', and in a downward direction 1730*d*' with respect to the front side of the drone 1000 on which the camera 1121 is provided. In a case in which when the drag touch is applied in a direction (that is, in a diagonal direction) between any two directions among the forward direction, the upward direction, the backward direction, and the downward direction, the drone 1000 may be moved in a direction corresponding to the direction between any two directions.

Here, the control unit 180 may control the drone 1000 to be moved at different speeds according to the number of touch points to which the drag touch is applied. For example, when a drag touch is applied in continuation to a touch applied to one point of the user input unit 123, the control unit 180 may move the drone 1000 at a first speed, and when a drag touch is applied in continuation to touches applied to at least two points of the user input unit 123, the control unit 180 may move the drone 1000 at a second speed different from the first speed.

For example, when a drag touch is applied by one finger at a specific speed, the control unit 180 may move the drone 1000 at a speed corresponding (proportional) to the specific speed, and when drag touches are applied by two fingers at the specific speed, the control unit 180 may move the drone 1000 at a speed double the speed corresponding to the specific speed.

Through this configuration, in the present disclosure, the drone 1000 may be controlled to be moved at various speeds according to types of touches applied to the user input unit 123, and the drone 1000 may be moved on the basis of a movement of the eyewear-type terminal 100 sensed in a state in which a touch applied to the user input unit 123 is maintained.

Meanwhile, in the eyewear-type terminal 100 related to the present disclosure, at least one image formed in a virtual region outside of the main body of the eyewear-type terminal 100 may be controlled on the basis of at least one of the user input unit 123 and a movement of the eyewear-type terminal 100.

Hereinafter, a method for controlling at least one image formed in a virtual region outside of the main body of the eyewear-type terminal 100 on the basis of at least one of the user input unit 123 and a movement of the eyewear-type terminal 100 will be described in detail.

Figure 20:
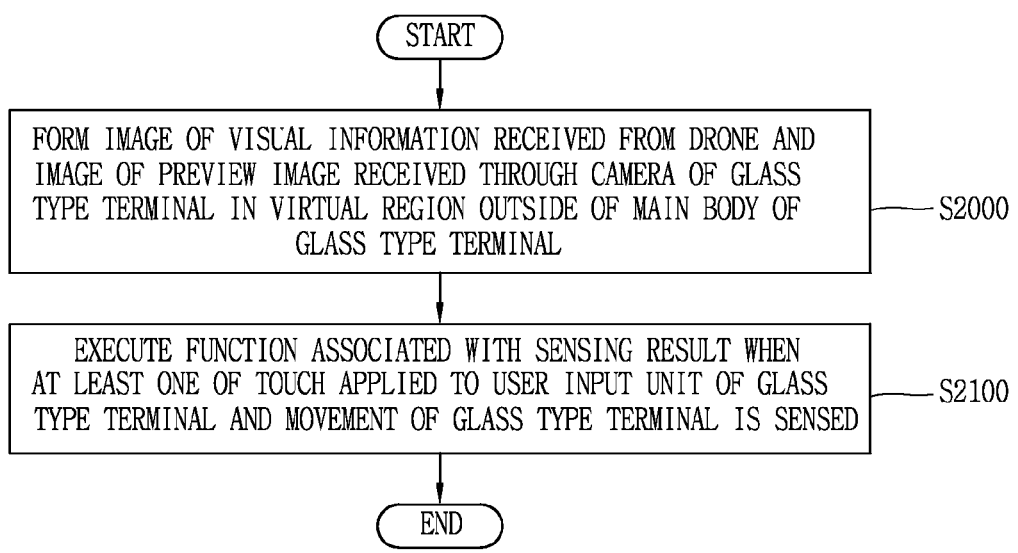
FIG. 20 is a flow chart illustrating a method for controlling an image of visual information transmitted from a drone and an image of a preview image received from a camera provided in the eyewear-type terminal by using the eyewear-type terminal according to an embodiment of the present disclosure.
Figure 21A:
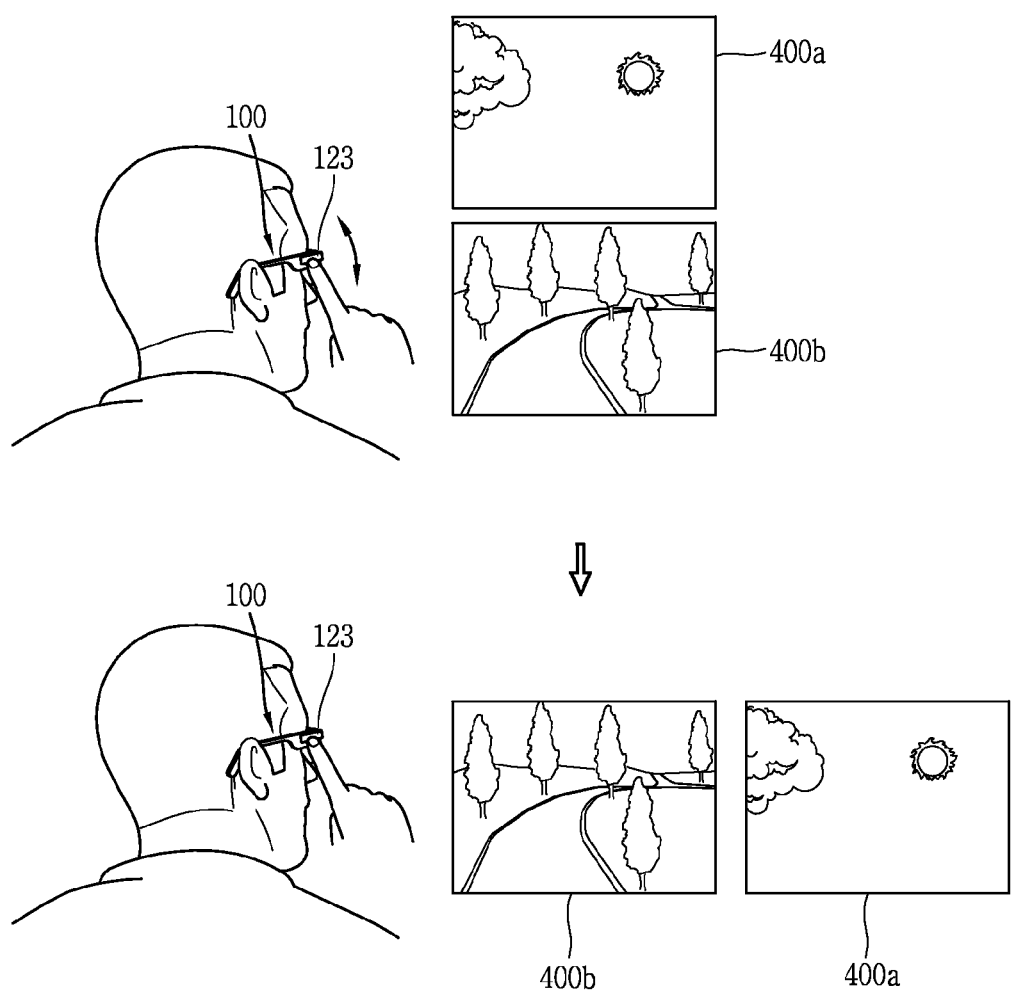
FIGS. 21A, 21B, and 21C are conceptual views illustrating the control method illustrated in FIG. 20.
Figure 21B:
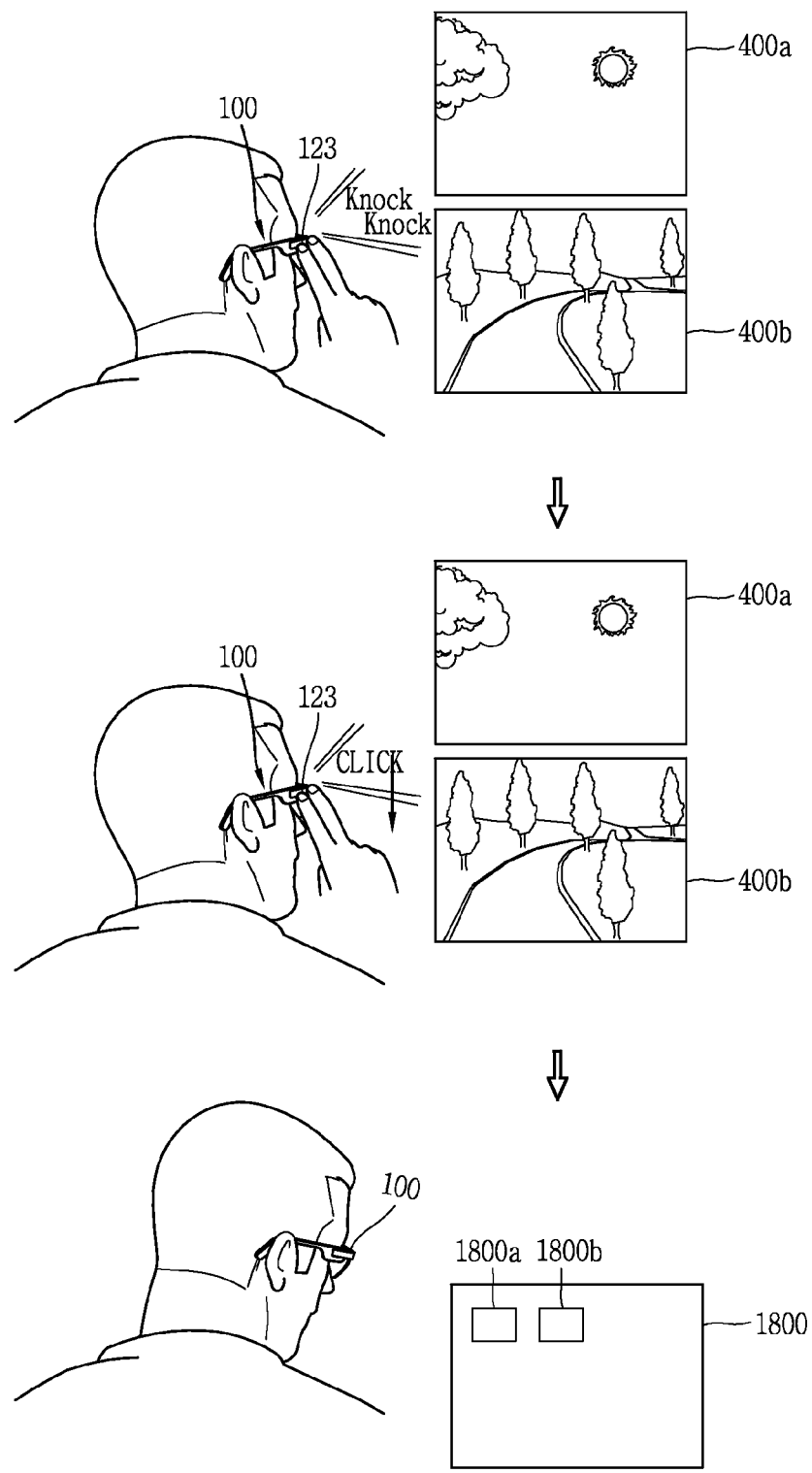
Figure 21C:
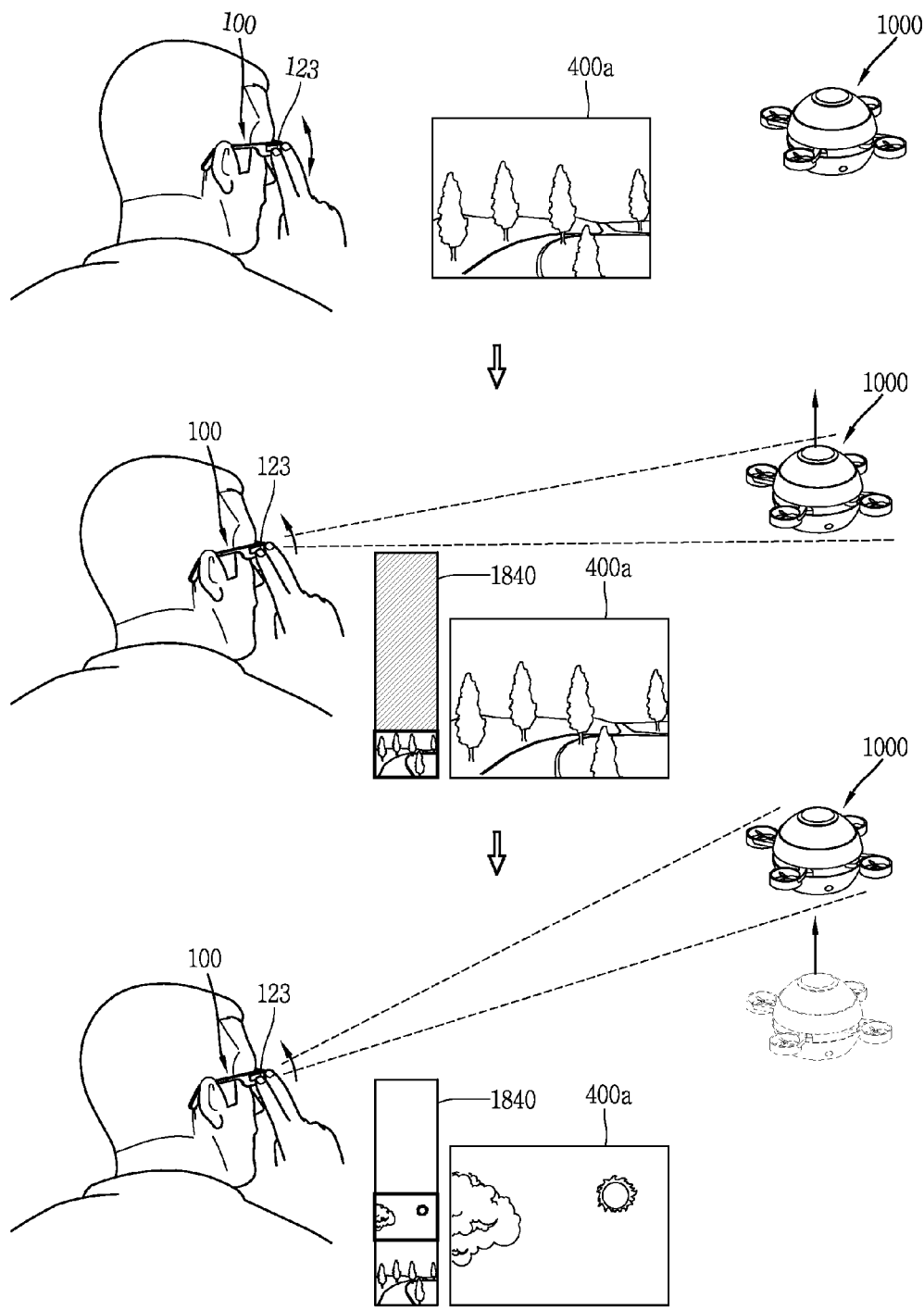

FIG. 20 is a flow chart illustrating a method for controlling an image of visual information transmitted from a drone and an image (virtual image) of a preview image received from the camera provided in the eyewear-type terminal by using the eyewear-type terminal according to an embodiment of the present disclosure, and FIGS. 21A, 21B, and 21C are conceptual views illustrating the control method illustrated in FIG. 20.

Referring to FIG. 20, in the present disclosure, as described above with reference to FIGS. 16A through 16D, an image of visual information received from the drone 1000 and an image (virtual image) of a preview image received through the camera of the eyewear-type terminal 100 are formed in a virtual region outside of the main body of the eyewear-type terminal 100 in step S2000.

For example, as illustrated in the first drawing of FIG. 21A, an image 400a of visual information transmitted from the drone 1000 and an image 400b of a preview image received through the camera 121 of the eyewear-type terminal 100 may be formed in a virtual region outside of the main body of the eyewear-type terminal 100. Also, without being limited thereto, only any one of the image 400 of the visual information and the image 400b of the preview image may be formed in the virtual region.

Thereafter, in the present disclosure, when at least one of a touch applied to the user input unit of the eyewear-type terminal 100 and a movement of the eyewear-type terminal 100 is sensed, a function associated with the sensing result is performed in step S2100.

Here, the touch may include various types of touches. For example, the touch may include a touch (for example, a single touch) applied to one point and touches (for example, multi-touch) applied to at least two points. Also, the touch may include a touch applied for a period of time shorter than a preset period of time (for example, a short touch, two touches (for example, double touches) applied within a preset period of time, and a touch applied for a period of time longer than the preset period of time (for example, a long touch). Also, the touch may be implemented in the form of any combination of the single touch, the multi-touch, the short touch, the double touch, and the long touch.

The control unit 180 may sense at least one of the touch and a movement of the eyewear-type terminal 100.

Here, on the basis of the sensed touch, the control unit 180 may perform a function associated with the sensed touch, and on the basis of the sensed movement, the control unit 180 may perform a function associated with the sensed movement. Also, in a case in which both the touch and the movement are sensed together (or in a case in which the movement is sensed while the touch is being maintained), the control unit 180 may perform a function associated with the sensing result.

The associated function may include various types of functions. For example, the associated function may include a function of changing a display position (or a display scheme) of images formed in the virtual region outside of the eyewear-type terminal 100, a function of capturing at least one of the visual information received from the drone 1000 and the preview image received through the camera of the eyewear-type terminal 100, and a function of controlling a movement of the drone 1000 or the camera provided in the drone 1000.

For example, in a state in which a touch applied to the user input unit 123 of the eyewear-type terminal 100 is maintained, when a preset type of movement of the eyewear-type terminal 100 is sensed, the control unit 180 may change display positions of the images 400a and 400b.

As illustrated in the first drawing of FIG. 21A, in a state in which a touch applied to the user input unit 123 is maintained, when it is sensed that the eyewear-type terminal 100 is moved by a distance equal to or greater than a preset distance and then returned, the control unit 180 may change display positions of the images 400 and 400b as illustrated in the second drawing of FIG. 21A. For example, in a state in which the images 400a and 400b are formed to be spaced apart from one another vertically and in a state in which the touch applied to the user input unit 123 is maintained, when it is sensed that the eyewear-type terminal 100 is moved by a distance equal to or greater than the preset distance and then returned, the control unit 180 may change display positions of the images 400a and 400b such that they are formed to be spaced apart from one another horizontally.

Meanwhile, when a preset type of touch is applied to the user input unit 123, the control unit 180 may capture at least one of the image 400a of the visual information and the image 400b of the preview image. For example, in a state in which at least one of the image 400a of the visual information and the image 400b of the preview image is formed in the virtual region outside of the main body of the eyewear-type terminal 100 as illustrated in the first drawing of FIG. 21B, when a preset type of touches (for example, touches applied to at least two points within a preset period of time at least once) are applied to the user input unit 123, at least one of the image 400a of the visual information and the image 400b of the preview image may be captured as illustrated in the second drawing of FIG. 21B.

The control unit 180 may form images of screen information allowing for checking the images captured in various manners in a virtual region outside of the main body of the eyewear-type terminal 100. For example, in a state in which the touch applied to the user input unit 123 is maintained, when it is sensed that the eyewear-type terminal 100 is moved in a preset direction (for example, in a downward direction) as illustrated in the second drawing of FIG. 21B, the control unit 180 may form an image 1800 of screen information allowing for checking captured images, in a virtual region outside of the main body of the eyewear-type terminal 100 as illustrated in the third drawing of FIG. 21B.

As illustrated in FIG. 18, the image 1800 of the screen information may include captured images (or thumbnails of the captured images) 1800a and 1800b, captured weather information, and information indicating whether the image of the visual information transmitted from the drone 1000 has been captured or whether the image (virtual image) of the preview image received through the camera 121 of the eyewear-type terminal 100 has been captured. Also, in the image 1600 of the screen information, dates, each flight of the drone 1000, captured images of the image of the visual information, and captured images of the image (virtual image) of the preview image are classified and displayed.

Meanwhile, the eyewear-type terminal 100 related to the present disclosure may perform various functions on the basis of the user input unit 123 and a movement of the eyewear-type terminal 100. For example, the eyewear-type terminal 100 may perform a panoramic image capturing function.

A touch applied to the user input unit 123 and a movement of the eyewear-type terminal 100 to perform the panoramic image capturing function may be defined in various manners. For example, as illustrated in the first drawing of FIG. 21C, in a state in which a preset type of touch (for example, a touch applied to at least two points) applied to the user input unit 123 is maintained, when the eyewear-type terminal 100 is moved in a preset direction (for example, upward direction, downward direction, leftward direction, and rightward direction), the control unit 180 may execute the panoramic image capturing function.

In this case, an image 1840 guiding that the panoramic image capturing function is being executed may be further formed in a virtual region outside of the main body of the eyewear-type terminal 100. Also, in a state in which the preset type of touch applied to the user input unit 123 is maintained, when the eyewear-type terminal 100 is moved in a preset direction 1810a, the control unit 180 may control the drone 1000 to be moved in a direction 1810a' corresponding to the preset direction.

Thereafter, as illustrated in the third drawing of FIG. 21C, the panoramic image capturing function is executed while the preset type of touch is being maintained, and when the preset type of touch is released, an image captured while the preset type of touch has been maintained may be captured as a single image.

In detail, in a state in which the preset type of touch applied to the user input unit 123 is maintained, while the eyewear-type terminal 100 is being moved in the preset direction, the control unit 180 receives visual information transmitted from the drone 1000 while on the move in a direction corresponding to the preset direction. Thereafter, the control unit 180 continuously connects the pieces of visual information transmitted from the drone 1000 while on the move to generate a single image.

Thereafter, when the preset type of touch is released, the control unit 180 may terminate the panoramic image capturing function. Also, when the preset type of touch is released, the control unit 180 may form images generated until when the preset type of touch was released, as a single panoramic captured image. The formed panoramic captured image may be stored in the memory 170 of the eyewear-type terminal 100.

Meanwhile, the contents described above is not limited to the eyewear-type terminal. The contents related to the present disclosure may also be inferred and applied to a mobile terminal in the same or similar manner. For example, in a case in which the eyewear-type terminal 100 related to the present disclosure is a mobile terminal, visual information received from the drone may be output on the display unit of the mobile terminal. Thereafter, when it is sensed that the mobile terminal moves in one direction, the control unit 180 of the mobile terminal may control the drone 1000 in a direction corresponding to the one direction. According to a movement of the mobile terminal in a state in which a preset type of touch applied to the display unit of the mobile terminal is maintained, the drone 1000 may be controlled in various manners.

As described above, according to the present disclosure, the eyewear-type terminal of the present disclosure may control a movement of the drone or the camera provided in the drone on the basis of a user gesture with respect to an image of visual information transmitted from the drone. Thus, in the present disclosure, an optimized UI/UX allowing the user to control the drone by intuition may be provided.

In addition, in a state in which an image of the visual information transmitted from the drone is formed in a virtual region, the drone may be controlled on the basis of a gesture of grabbing the image formed in the virtual region and a gesture in continuation thereof. Accordingly, the present disclosure may provide a new interface allowing the user to control the drone by using a gesture of manipulating the image like a handle or a joystick, while viewing the image of the visual information transmitted from the drone.

In addition, the visual information and the preview image may be captured by making a preset gesture with respect to an image of the visual information received from the drone and the image (virtual image) of the preview image received through the camera provided in the eyewear-type terminal. Thus, the present disclosure may provide an optimized UI/UX allowing the user to capture at least one of the visual information and the preview image through at least one of the image of the visual information and the image (virtual image) of the preview image more conveniently and by intuition.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An eyewear-type terminal comprising:
  a communication unit configured to communicate with a drone;
  a display configured to output visual information received from the drone;
  an optical unit comprising at least one lens and configured to form a virtual image of the visual information at an external virtual region that is formed outside of the terminal such that the virtual image is visible only to a user wearing the terminal;
  a sensor configured to sense a user gesture applied with respect to the virtual image; and
  a controller configured to:
    control the drone based on the sensed user gesture; and
    control movement of the drone based on the sensed user gesture that is applied subsequently to a gesture of grabbing the virtual image such that:
      the drone is moved when a manner of the gesture of grabbing the virtual image is a first manner; and
      the drone is rotated when the manner of the gesture of grabbing the virtual image is a second manner.

2. The terminal of claim 1, wherein the controller is further configured to control at least one of a movement of the drone or a camera of the drone in response to a preset user gesture applied with respect to the virtual image.

3. The terminal of claim 2, wherein the controller is further configured to:
  control the movement of the drone when the preset user gesture is a first user gesture; and
  control the camera when the preset user gesture is a second user gesture.

4. The terminal of claim 3, wherein:
the first user gesture is a gesture that is applied subsequently to a gesture of grabbing the virtual image; and
the controller is further configured to cause the drone to move in response to the subsequently applied gesture.

5. The terminal of claim 4, wherein when the first user gesture is applied in a state in which the virtual image is displayed in a first display manner, the virtual image is displayed in a second display manner.

6. The terminal of claim 5, wherein the virtual image displayed in the second display manner is restored to be displayed in the first display manner when the first user gesture is released.

7. The terminal of claim 3, wherein:
the second user gesture comprises a pinch-in gesture or a pinch-out gesture applied with respect to the virtual image; and
the controller is further configured to control the camera to execute a zoom-out function or a zoom-in function in response to the pinch-in gesture or the pinch-out gesture.

8. The terminal of claim 7, wherein the controller is further configured to cause the drone to move when the pinch-out gesture is applied to be moved out of the virtual image.

9. The terminal of claim 1, further comprising a camera, wherein:
the controller is further configured to cause the display to display a preview image received via the camera; and
the optical unit is further configured to form an image of the preview image in addition to the virtual image of the visual information.

10. The terminal of claim 9, wherein the image of the preview image and the virtual image of the visual information are formed to be spaced apart from one another.

11. The terminal of claim 9, wherein when a preset type of gesture is applied to at least one of the image of the preview image or the virtual image of the visual information, the controller is further configured to cause the at least one of the image of the preview image or the virtual image of the visual information to move.

12. The terminal of claim 11, wherein when the image of the preview image and the virtual image of the visual information come into contact with each other due to the movement, the controller is further configured to capture the image of the preview image and the virtual image of the visual information.

13. An eyewear-type terminal comprising:
a communication unit configured to communicate with a drone;
a display configured to output visual information received from the drone;
an optical unit comprising at least one lens and configured to form a virtual image of the visual information at an external virtual region such that the virtual image is visible only to a user wearing the terminal;
a sensor configured to sense a user gesture applied with respect to the virtual image; and
a controller configured to:
control movement of the drone when the sensed user gesture is a first user gesture that is applied subsequently to a gesture of grabbing the virtual image, causing the drone to move in response to the subsequently applied gesture, wherein the drone is moved in a different manner according to a manner of the gesture of grabbing the virtual image; and
control a camera of the drone when the sensed user gesture is a second user gesture.

14. A method for controlling an eyewear-type terminal, the method comprising:
outputting visual information received from a drone via a display of the terminal;
forming a virtual image of the visual information, by an optical unit comprising at least one lens, in an external virtual region that is formed outside of the terminal such that the virtual image is visible only to a user wearing the terminal;
controlling the drone based on a user gesture applied with respect to the virtual image; and
controlling movement of the drone based on the user gesture that is applied subsequently to a gesture of grabbing the virtual image such that:
the drone is moved when a manner of the gesture of grabbing the virtual image is a first manner; and
the drone is rotated when the manner of the gesture of grabbing the virtual image is a second manner.

15. The method of claim 14, wherein:
the controlling of the drone comprises controlling at least one of a movement of the drone or a camera of the drone in response to a preset user gesture applied with respect to the virtual image;
the movement of the drone is controlled when the preset user gesture is a first user gesture; and
the camera is controlled when the preset user gesture is a second user gesture.

16. The method of claim 15, wherein:
the first user gesture is a gesture that is applied subsequently to the gesture of grabbing the virtual image; and
the controller is further configured to cause the drone to move in response to the subsequently applied gesture.

17. The method of claim 15, wherein:
the second user gesture comprises a pinch-in gesture or a pinch-out gesture applied with respect to the virtual image; and
the controller is further configured to control the camera to execute a zoom-out function or a zoom-in function in response to the pinch-in gesture or the pinch-out gesture.

18. The method of claim 14, further comprising:
forming an image of a preview image received via a camera of the terminal in addition to the virtual image of the visual information,
wherein at least one of the image of the preview image or the virtual image of the visual information is moved in response to a preset type of gesture applied to the at least one of the image of the preview image or the virtual image of the visual information.

19. The method of claim 18, further comprising:
capturing the image of preview image and the virtual image of the visual information when the image of the preview image and the virtual image of the visual information come into contact with each other due to the movement.

* * * * *